United States Patent Office 3,281,330
Patented Oct. 25, 1966

3,281,330
MICROBIOLOGICAL PROCESS FOR THE OXYGENATION OF CYCLOALKANES
Gunther S. Fonken, Charleston Township, Kalamazoo County, Milton E. Herr, Kalamazoo Township, Kalamazoo County, and Herbert C. Murray, Barry Township, Barry County, Mich., assignors to The Upjohn Company, Kalamazoo, Mich., a corporation of Delaware
No Drawing. Filed Mar. 20, 1964, Ser. No. 353,608
16 Claims. (Cl. 195—51)

This application is a continuation-in-part of copending application Serial No. 175,298, filed February 23, 1962, and now abandoned.

This invention relates to a novel process for the oxygenation of cycloalkanes and derivatives thereof and is more particularly concerned with the introduction of oxygen by microbiological means into the saturated hydrocarbon ring of cycloalkanes and derivatives thereof.

In its broadest aspect, the present invention is concerned with a microbiological process of general applicability for the introduction of oxygen into the saturated hydrocarbon ring of cycloalkanes and derivatives. Said process comprises subjecting a non-fused cycloalkane, wherein the cycloalkane ring thereof is fully saturated and contains at least one tertiary carbon atom, to the oxygenating activity of a species of microorganism of Subphylum 2 of Phylum III.

Said process, which will be described in detail hereinafter, results in the introduction of a hydroxy group or keto group in various positions in the cycloalkane ring of the substrate and gives rise to a class of compounds many of which were hitherto unknown or could only be prepared with difficulty by chemical methods.

The term "non-fused cycloalkane, wherein the cycloalkane ring thereof is fully saturated and contains at least one tertiary carbon atom" means a compound having a non-fused fully saturated hydrocarbon ring which ring contains at least one "non-interfering" substitutent attached to one or more carbon atoms thereof. The term "non-fused cycloalkane" means that the cycloalkane ring does not share two adjacent carbon atoms with a second ring, i.e., the cycloalkane is not an ortho-fused ring system; see The Ring Index, Patterson, Capell and Walker, Second Edition, p. x and xi, American Chemical Society, 1960.

The non-interfering substituent or substituents which can be attached to the cycloalkane ring are those substituents which do not interfere with the microbiological oxygenation process of the invention, i.e., substituents which are not toxic or detrimental to the propagation of the microorganism or to the enzyme system thereof employed in the microbiological process of the invention and which do not interfere in any other way with the process of the invention.

Illustrative of the non-interfering substituents which can be attached to the ring of the cycloalkane employed as substrate in the process of the invention are: hydroxy; functionally substituted hydroxy groups such as lower-alkoxy, aralkoxy, aryloxy, carbamoyloxy, (lower-alkyl)-carbamoyloxy, di-(lower-alkyl)carbamoyloxy, arylcarbamoyloxy and acyloxy; keto; functionally substituted keto such as cyclic alkylene ketals, oximino, hydrazono, phenylhydrazono, dinitrophenylhydrazono, semicarbazono, thiosemicarbazono groups; amino and functional derivatives thereof such as acylamino, heterocyclic amino, monoalkylamino, dialkylamino, carbalkoxyamino, carbaralkoxyamino and carbaryloxyamino; lower-alkyl; cycloalkyl; cycloalkyl substituted by at least one substituent selected from the class consisting of heterocyclic amino, hydroxy, keto and functionally substituted hydroxy and keto as hereinbefore defined; aryl; aralkyl; lower-alkylsulfonyl; cycloalkylsulfonyl; arylsulfonyl; halogen, acylaminoalkyl; hydroxyalkyl; esterified hydroxyalkl; carboxamido and carboxamidoalkyl wherein the nitrogen atom is unsubstituted or is substituted by one or more lower-alkyl, cycloalkyl, aralkyl or aryl groups; lower-alkylsulfonylureido, aralkylsulfonylureido and arylsulfonylureido.

The term "lower-alkoxy" means alkoxy containing from 1 to 8 carbon atoms, inclusive, such as methoxy, ethoxy, propoxy, butoxy, pentyloxy, hexyloxy, heptyloxy, octyloxy and isomeric forms thereof. The term "aralkoxy" means aralkoxy containing from 7 to 13 carbon atoms, inclusive, such as benzyloxy, phenethyloxy, phenylpropyloxy, benzhydryloxy and the like. The term "aryloxy" means aryloxy containing from 6 to 12 carbon atoms, inclusive, such as phenoxy, tolyloxy, xylyloxy, naphthyloxy, diphenylyloxy and the like. The term "acyloxy" means hydroxy wherein the hydrogen is substituted by the acyl radical of an organic acid preferably selected from the class consisting of hydrocarbon carboxylic acids and hydrocarbon sulfonic acids each containing from 1 to 12 carbon atoms, inclusive. Examples of acids from which such acyl groups are derived are: saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopenylpropionic acids, and the like; and aliphatic and aromatic sulfonic acids such as methanesulfonic, ethanesulfonic, propanesulfonic, butanesulfonic, pentanesulfonic, hexanesulfonic, nonanesulfonic, dodecanesulfonic, 2-propanesulfonic, 2-butanesulfonic, 2-pentanesulfonic, 2-octanesulfonic, tertiarybutanesulfonic cyclopentanesulfonic, cyclohexanesulfonic, phenylmethanesulfonic, phenylethanesulfonic, benzenesulfonic, o-toluenesulfonic, p-toluenesulfonic, o-bromobenzenesulfonic, p-bromobenzenesulfonic, o-chlorobenzenesulfonic, p-chlorobenzenesulfonic, o-, m-, p-nitrobenzenesulfonic, o-methoxybenzenesulfonic, p-methoxybenzenesulfonic, and the like.

The term "cyclic alkylene ketal" means a group having the formula

wherein A is alkylene from 2 to 8 carbon atoms, inclusive, wherein the attaching oxygen to carbon bonds are separated by a chain of at least two and not more than three carbon atoms, The term "acylamino" means an amino group substituted by the acyl radical of an organic carboxylic acid preferably selected from the group consisting of hydrocarbon carboxylic and hydrocarbon sulfonic acids containing from 1 to 12 carbon atoms, inclusive, as hereinbefore defined and exemplified.

The term "heterocyclic amino" means a saturated 5 to 9 ring atom heterocyclic amino radical and is inclusive of pyrrolidino, alkylpyrrolidino such as 2-methylpyrrolidino, 2,2-dimethylpyrrolidino, and the like, piperidino, alkylpiperidino such as 2-methylpiperidino, 3-methylpiperidino, 4-methylpiperidino and the like, piperazino, alkylpiperazino such as -methylpiperazino, 3-methylpiperazino, 4-methylpiperazino and the like, morpholino, alkylmorpholino such as 2-methylmorpholino, 3-methylmorpholino and the like, hexamethyleneimino, homomorpholino, homopiperidino, homopiperazino, thiamorpholino, octamethyleneimino, and the like.

The term "monoalkylamino" means amino substituted by lower-alkyl, i.e., alkyl containing from 1 to 8 carbon atoms, inclusive, such as methyl, ethyl, propyl, butyl, pentyl, hexyl, heptyl, octyl, and isomeric forms thereof. The term "dialkylamino" means amino substituted by two lower-alkyl groups as defined above.

The term "cycloalkyl" means the residue of a cycloalkane containing from 5 to 15 carbon atoms, inclusive, such as cyclopentyl, cyclooctyl, cyclododecyl, cyclotetradecyl, and the like. The term "aryl" means an aryl radical containing from 6 to 12 carbon atoms, inclusive, such as phenyl, tolyl, xylyl, naphthyl, biphenylyl, and the like. The term "aralkyl" means an aralkyl radical containing from 7 to 13 carbon atoms, inclusive, such as benzyl, phenethyl, phenylpropyl, benzhydryl, and the like. The term "lower-alkylsulfonyl" means the radical —SO$_2$-alkyl wherein "alkyl" is lower-alkyl as hereinbefore defined. The term "cycloalkylsulfonyl" means the radical —SO$_2$-cycloalkyl wherein cycloalkyl is as hereinbefore defined. The terms "carbalkoxyamino," "carbaralkoxyamino" and "carbaryloxyamino" mean the group

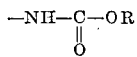

wherein R is lower-alkyl, aralkyl or aryl respectively and lower-alkyl, aralkyl and aryl have the meaning defined above.

The term "acylaminoalkyl" means lower-alkyl, as hereinbefore defined, substituted by an acylamino group as hereinbefore defined. The term "hydroxyalkyl" means lower-alkyl, as hereinbefore defined, substituted by at least one hydroxy group, such as hydroxymethyl, 2-hydroxyethyl, 2-hydroxypropyl, 3-hydroxybutyl, and the like. The term "carboxyamidoalkyl" means lower-alkyl, as hereinbefore defined, substituted by a carboxamide group such as carboxamidomethyl, 2-carboxamidoethyl, 3-carboxamidobutyl, 5-carboxamidopentyl, 3-carboxamidohexyl, and the like.

The terms "lower alkylsulfonylureido," "aralkylsulfonylureido" and "arylsulfonyluredio" mean the group

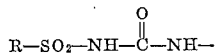

wherein R is lower-alkyl, aralkyl, and aryl as defined above.

The microorganisms employed in the process of this invention are those which are classified under the heading Subphylum 2 of Phylum III, which latter is commonly called Thallophyta. This system of classification is that commonly employed in the art and is set forth by Frobisher; Fundamentals of Microbiology, Sixth Edition, 1957, Saunders Company, Philadelphia at page 10. This aforesaid Subphylum 2 of Phylum III embraces five classes, namely, Phycomycetes, Ascomycetes, Basidiomycetes, Deuteromycetes (Fungi imperfecti) and Schizomycetes. Table I below sets forth representative genera and orders falling within these classes of microorganisms. While all species of microorganisms falling within the five classes of Subphylum 2 can be employed in the process of this invention, it is preferred to employ species of microorganism falling within the orders: Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonadales and Actinomycetales. Among the families of the above listed orders, it is preferred to employ in the practice of this invention species of microorganisms falling within the families Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Pseudomonadaceae, Mycobacteriaceae, Actinomycetaceae, and Streptomycetaceae. Of the genera within the above listed families it is preferred to employ species of microorganisms of the genera: Absidia, Circinella, Gongronella, Rhizopus, Cunninghamella, Eurotium, Gloniopsis, Glonium, Hysterium, Mytilidion, Calonectria, Gibberella, Hypomyces, Dermatea, Cenagium, Adelopus, Chaetomium, Endothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia and Streptomyces.

TABLE I

Phycomycetes:
Entomophthorales: Conidiobolus, Delacroixia
Mucorales: Absidia, Blakeslea, Circinella, Chatetocladium, Cunninghamella, Helicostylum, Gongronella, Mucor, Parasitella, Phycomyces, Rhizopus
Saprolegniales: Achlyla Ascomycetes:
Endomycetales: Asocybe, Byssochlamys, Cephaloascus, Endomyces, Endomycopsis, Petasospora
Eurotiales: Ctenomyces, Carpenteles, Eidamella, Emericillopsis, Eurotium, Microascus, Penicilliopsis, Talaromyces
Dothideales: Acrospermum, Capnodium, Chaetothyrum, Cymadothea, Dangeardiella, Dothidea, Rhopographus, Scorias
Helotiales: Allophylaria, Cenangium, Corynella, Dermea, Godronia, Pezizella
Hemisphaeriales: Schizothyrina, Schizothyrium
Hypocreales: Calonectria, Calostilbe, Claviceps, Cordyceps, Crenonectria, Epichloe, Gibberella, Hypocrea, Hypomyces, Loramyces, Melanospora, Nectria, Nectriella, Neocosmospora, Ophionectria, Sphaerostilbe
Hysteriales: Farlowiella, Gloniella, Gloniopsis, Glonium Hysterium, Lophium, Mytilidion, Ostreion
Myriangiales: Dothiora, Elsinoe
Pezizales: Ascobolus, Discomycetella, Morchella, Patella, Pyronema, Sowerbyella, Wolfina
Phacidiales: Coccopeziza, Colpoma, Clithirs, Phacidiella, Phacidium, Sphaerothyrium
Sphaeriales: Adelopus, Chaetomium, Chaetomidium, Clathrospora, Didymella, Endothia, Glomerella, Guignardia, Mycosphaerella, Physalospora, Xylaria, Subbaromyces
Taphrinales: Protomyces, Taphridium Taphrina Basidiomycetes:
Agaricales: Aleurodiscus, Alnicola, Boletus, Clavaria, Coprinus, Clitocybe, Collybia, Coniophora, Corticium, Deconica, Entaloma, Fomes, Hygrophorus, Lintinellus, Lentinus, Panaeolus, Paxillus, Peniophora, Pholiota, Pleurotus, Plicatura, Polyporus, Poria Psalliota, Schizophyllum, Sparassis, Stereum, Tricholoma, Trametes
Lycoperdales: Bovista, Calvatia, Geastrum, Lycoperdon
Nidulariales: Crucibulum, Cyathus, Nidula, Sphaerobolus
Phallales: Mutinus, Phallus, Simblum
Sclerodermatales: Gastrosporium, Lycogalopsis, Phellorinia, Sphaerobolus, Tulostoma
Tremellales: Auricularia, Ceratobasidium, Calocera, Dacrymyces, Helicobasidium
Ustilaginales: Bryophytomyces, Cintractia, Entyloma, Farysia, Graphiola, Schizonella, Sorosporium, Tilletia, Tolyposporium, Urocystis, Ustilago Deuteromycetes:
Melanconiales: Actinonema, Allelchaeta, Colletotrichum, Cryptosporium, Entomosporium, Melanconium, Myxosporium, Pestalotia, Septomyxa, Steganosporium, Tuberculariella Moniliales: Acremonium, Aspergillus, Botrytis, Brachysporium, Cladosporium, Curvularia, Cylindrium, Cylindrocarpon, Dactylium, Fusarium, Gliocladium, Helicodendron, Helicosporium, Helminthosporium, Keratinomyces, Penicillium, Sepedonium, Sporotrichum, Trichothecium Mycelia Sterilia: Microxyphium, Papulospora, Rhizoctonia, Sclerotium Sphaeropsidales: Asochyta, Coniothyrium, Dendrophoma, Diplodia, Diplodina, Polyopeus, Sphaeropsis, Wojnowicia, Zythtia Schizomycetes:
Actinomycetales: Micrococcus, Mycobacterium, Mycococcus, Nocardia, Streptomyces
Pseudomonadales: Pseudomonas, Mycoplana, Protaminobacter
Eubacteriales: Aerobacter, Arthrobacter, Bacillus, Corynebacterium Cultures of a large number of species, falling within the group of microorganisms which can be employed in the process of the invention, are available from known sources such as the Northern Utilization Research and Development Branch, U.S. Department of Agriculture, Peoria, Illinois (NRRL), the American Type Culture Collection (ATCC), Washington, D.C., and Centraalbureau voor Schimmelcultures (CBS), Baarn, Holland or as otherwise indicated. The species listed in Table II, together with Culture Collection numbers, are typical of those which are available from the above sources and are representative of those which can be employed in the process of the invention.

TABLE II

Phycomycetes:
Achlya americana, ATCC 10977
Achlya bisexalis, ATCC 11397
Achlya crenulata, ATCC 11315, CBS
Absidia cylindrospora, ATCC 11516
Absidia cylindrospora, NRRL 2796
Absidia cylindrospora, var. rhizamotpha, NRRL 2815
Absidia pseudocylindrospora, NRRL 2770
Absidia glauca, ATCC 7852a, 7852b
Circinella angarensis, NRRL 2410
Circinella angarensis, NRRL 2628
Circinella spinosa, ATCC 9025, CBS
Cunninghamella blakesleeana, ATCC 8688a
Cunninghamella baineri, ATCC 6794b
Gongronella butleri, CBS
Gongronella urceolifera, CBS
Gongronella lacrispora, NRRL 2643
Mucor griseocyanus, ATCC 1207a
Rhizopus arrhizus, ATCC 11145
Rhizopus nigricans, ATCC 6227b Ascomycetes:

Adelopus nudus, CBS
Cenangium abietis, CBS
Dermea balsama, CBS
Dermea libocedri, CBS
Eurotium echinulatum, CBS
Calonetctria decora, CBS
Clithris quercina, CBS
Gibberella saubinettii, CBS
Hypomyces haematococcus, CBS
Chaetomium globosum, ATCC 6205
Gloniopsis brevisaccata, CBS
Glonium clavisporum, CBS
Glonium stellatum, CBS
Hysterium angustatum, CBS
Hysterium insidens, CBS
Mytilidion australe, CBS
Mytilidion hastenii, CBS
Mytilidion tortile, CBS
Endothia parasitica, ATCC 9414
Guignardia bidwelli, ATCC 9559, 9560

Basidiomycetes:
Alnicola escharoides, CBS
Boletus luteus, CBS
Boletus sp, Peck 168 (Ohio State Univ.)
Coprinus narcoticus, CBS
Corticium sasakkii, NRRL 2705
Corticium microsclerotia, NRRL 2727
Clavaria stricta, CBS
Deconica atrorufa, CBS
Deconica coprophila, CBS
Cyathus poeppigii, CBS
Cyathus olla, CBS
Pleurotus passeckerianus, ATCC 9416
Pholiota adiposa, ATCC 9393
Poria ambigua, ATCC 9408
Sphaerobolus stellatus, CBS Deuteromycetes:
Alternaria tenuis, ATCC 6663
Aspergillus nidulans, ATCC 11267
Aspergillus niger, ATCC 9027
Aspergillus niger, ATCC 9142
Aspergillus niger, ATCC 10579
Aspergillus niger, ATCC 8740
Aspergillus proliferans, CBS
Aspergillus ruber, ATCC 9481
Aspergillus versicolor, ATCC 9577
Brachysporium oryzae, ATCC 11571, CBS
Cladosporium resinae, NRRL 2778
Curvularia lunata, ATCC 12017
Curvularia pallescens, ATCC 12017, NRRL 2381
Cylindrium suaveolens, CBS
Cylindrocarpon didymum, CBS
Cylindrocarpon radicicola, ATCC 11811
Fusarium culmorum, ATCC 12656
Helicodendron tubulosum, CBS, ATCC 7808
Helicosporium lumbricopsis, CBS
Helicosporium phragmitis, CBS
Helminthosporium carbonum, ATCC 9627
Keratinomyces ajelloi, CBS
Penicillium atrovenetum, CBS
Penicillium aurantio-virens, ATCC 10413, NRRL 2138
Penicillium patulum, ATCC 9260, 10120 NRRL 994
Rhizoctonia solani, ATCC 6221, 10154, 10157, 10159, 10163, etc.
Sepedonium ampullosporum, CBS
Sporotrichum sulfurescens, ATCC 7159
Trichothecium roseum, ATCC 8685, NRRL 1665
Ascochyta linicola, NRRL 2923, CBS
Diplodia natalensis, ATCC 9055
Septomyxa affinis, ATCC 6737
Wojnowicia graminis, CBS
Zythia resinae, CBS Schizomycetes:

Mycobacterium rhodochrous, ATCC 999, 4273, 4276
Micrococcus flavoroseus, ATCC 397
Micrococcus cerolyticus, ATCC 12559
Micrococcus cinnabareus, ATCC 11890
Micrococcus rubens, ATCC 186
Nocardia corallina, CBS, ATCC 4273, 2161
Nocardia erythropolis, CBS, ATCC 4277
Nocardia gardneri, ATCC 9604
Nocardia restrictus, CBS
Aerobacter aerogenes, ATCC 8724
Streptomyces roseochromogenus, ATCC 3347
Streptomyces argenteolus, ATCC 11009
Streptomyces olivaceous, ATCC 12019
Streptomyces mediocidicus, ATCC 13279
Streptomyces mediocinicus, ATCC 13278
Pseudomonas aeruginosa, ATCC 8689
Pseudomonas fluorescens, ATCC 949
Corynebacterium simplex, ATCC 6946

The operational conditions and reaction procedures of this invention are advantageously those known in the art of bioconversion as illustrated in Murray et al., U.S. Patents 2,602,769 and 2,735,800.

In the practice of this invention, the bioconversion can be effected by a growing or resting culture of the microorganism or by spores, washed cells or enzymes of the microorganism.

Culture of the selected species of microorganism for the purpose and practice of this invention is in or on a medium favorable to development of the microorganism. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available carbon can also be provided by sources normally used in bioconversions such as carbohydrates, e.g., glucose, fructose, sucrose, lactose, maltose, dextrines and starches; meat extracts, peptones, amino acids, proteins, fatty acids, glycerol, whey, and the like. These materials can be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25 to 32° C. is preferred for growth of the microorganism but higher or lower temperatures within a relatively wide range are suitable.

The substrate can be added to the culture during the growth period of the microorganism as a single feed or by gradual addition during the conversion period, or it can be added to the medium before or after sterilization or inoculation, making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism, for example, by dissolving the substrate when it is a solid, in an organic solvent and mixing the solution thoroughly with the medium or by adding to the medium finely comminuted particles of the substrate, e.g., micronized particles, preferably 90% by weight smaller than 20 microns, either as a dry powder or, preferably for mechanical reasons, as an aqueous suspension. In preparing the aqueous suspension, the use of dispersing or suspending agents is advantageous.

The temperature during the fermentation can be the same as that found suitable for growth of the microorganism. It need be maintained only within such a range as supports life, active growth or the enzyme activity of the microorganism; the range of 20 to 35° C. is preferred. A pH of about 4 to 6 is generally preferred for growth of the microorganism during the bioconversion but for acid-sensitive substrates, and for microorganisms of the class Schizomycetes, the pH should be about 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography or thin-film chromatography [Heftman, Chromatography (1961) Reinhold Publishing Co., New York, New York].

Alternatively, the oxygenation of the selected substrate can be effected under aerobic conditions by subjecting the substrate to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophys. Acta, 58, 131–133 (1962). Oxygenation can be effected with spores in accordance with the general process disclosed in U.S. Patents 3,031,379 and 3,031,382. The separation of washed cells from the fermentation medium is well known in the art, see for example U.S. Patent 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate, under aerobic fermentation conditions.

After completion of the fermentation, the resulting oxygenated cycloalkanes are recovered from the fermentation beer by conventional methods. For example, the whole beer can be extracted with a water-immiscible organic solvent, e.g., methylene chloride, chloroform, carbon tetrachloride, ethylene chloride, trichloroethylene, ether, amyl acetate, benzene, and the like, or the fermentation liquor and mycelia can be separated by conventional methods such as centrifugation or filtration, and then separately extracted with suitable solvents. The mycelia can be extracted with either water-miscible or water-immiscible solvents, e.g., acetone, alcohol, etc., or, in cases where little or no product is contained in the mycelia it can be merely washed with water and the wash water added to the beer filtrate. The beer free of mycelia can then be extracted with water-immiscible solvents, such as those listed above. The extracts are combined, dried over a drying agent, such as anhydrous sodium sulfate, and the solvent removed by conventional methods, such as evaporation or distillation at atmospheric or reduced pressure. The oxygenated products thus obtained can be isolated and purified by conventional methods, e.g., recrystallization, chromatography, distillation in the case of liquids, and the like.

The hydroxylated compounds obtained from the bioconversion can be oxidized chemically in accordance with methods known in the art for oxidizing secondary hydroxy groups to ketones, for example, Fieser and Fieser, National Products Related to Phenanthrene, 3rd Ed., pages 127–129, Reinhold Publishing Corp., New York, New York. For example, the selected hydroxy compound or mixture thereof is dissolved in an inert organic solvent, such as, acetone, benzene, methylene chloride, t-butanol, and the like, and then oxidized with aqueous chromic acid, potassium permanganate, t-butyl hypochlorite and like oxidizing agents to produce the corresponding keto compound or compounds.

It is sometimes advantageous to oxidize the mixture of compounds obtained from the bioconversion without attempting to separate the mixture into its various components in order to obtain a mixture of the keto compounds which are in some instances more easily separated and purified.

Shown below are representative examples of non-fused cycloalkanes which can be employed as substrates in the process of the invention. Also shown are the principal oxygenated products obtained by subjecting the named substrates to the oxygenating activity of a species of Subphylum 2 of Phylum III using the procedures set forth above and in Examples 1–100, hereinafter, and more particularly as described in Examples 25, 27 and 30.

TABLE III

| Substrate | Principal Products |
|---|---|
| Cycloalkanols and functional derivatives thereof: | |
| Cyclopentanol | Cyclopentane-1,3-diol. |
| Cyclopentyl N-phenylurethane. | 3-hydroxycyclopentyl N-phenylurethane. |
| Cyclopentyl N-methylurethane. | 3-hydroxycyclopentyl N-methylurethane. |
| Propoxycyclopentane | 3-propoxycyclopentanol. |
| Cyclohexanol | Cyclohexane-1,4-diol. |
| | Cyclohexane-1,3-diol. |
| Cyclohexyl N-phenylurethane. | 4-hydroxycyclohexyl N-phenylurethane. |
| | 3-hydroxycyclohexyl N-phenylurethane. |
| Methoxycyclohexane | 4-methoxycyclohexanol. |
| | 3-methoxycyclohexanol. |
| Phenoxycyclohexane | 4-phenoxycyclohexanol. |
| | 3-phenoxycyclohexanol. |
| Cycloheptanol | Cycloheptane-1,4-diol. |
| Cycloheptyl N-methylurethane. | 4-hydroxycycloheptyl N-phenylurethane. |
| Ethoxycycloheptane | 4-ethoxycycloheptanol. |
| Cyclooctanol | Cyclooctane-1,4-diol. |
| | Cyclooctane-1,5-diol. |
| Cyclooctyl N-ethylurethane. | 5-hydroxycyclooctyl N-ethylurethane. |
| | 4-hydroxycyclooctyl N-ethylurethane. |
| Benzyloxycyclooctane | 5-benzyloxycyclooctanol. |
| | 4-benzyloxycyclooctanol. |
| Cyclononanol | Cyclononane-1,4-diol. |
| | Cyclononane-1,5-diol. |
| Cyclononyl N-propylurethane. | 4-hydroxycyclononyl N-propylurethane. |
| | 5-hydroxycyclononyl N-propylurethane. |
| Cyclodecanol | Cyclodecane-1,5-diol. |
| | Cyclodecane-1,6-diol. |
| p-Tolyloxycyclodecane | 6-p-tolyloxycyclodecanol. |
| | 5-p-tolyloxycyclodecanol. |
| Cycloundecanol | Cycloundecane-1,5-diol. |
| | Cycloundecane-1,6-diol. |
| | Cycloundecane-1,5-dione. |
| | Cycloundecane-1,6-dione. |
| | 5-hydroxycycloundecanone. |
| | 6-hydrocycloundecanone. |
| Acetoxycyclododecane | Cyclododecane-1,5-diol. |
| | Cyclododecane-1,6-diol. |
| | Cyclododecane-1,7-diol. |
| | Cyclododecane-1,5-dione. |
| | Cyclododecane-1,6-dione. |
| | Cyclododecane-1,7-dione. |
| | 7-hydroxy cylododecanone. |
| | 6-hydroxycyclododecanone. |
| Cyclopentandecanol | Cyclopentadecane-1,6-diol. |
| | Cyclopentadecane-1,7-diol. |
| | Cyclopentadecane-1,8-diol. |
| | Cyclopentadecane-1,6-dione. |
| | Cyclopentadecane-1,7-dione. |
| | Cyclopentadecane-1,8-dione. |
| | 6-hydroxycyclopentadecanone. |
| | 7-hydroxycyclopentadecanone. |
| | 8-hydroxycyclopentadecanone. |
| 2-methylcyclopentanol | 2-methylcyclopentane-1,4-diol. |
| 2-methylcyclopentyl N-methylurethane. | 2-methyl-4-hydroxycyclopentyl N-methylurethane. |
| 3-methylcyclohexanol | 3-methylcyclohexane-1,4-diol. |
| 3-methylcyclohexyl N-phenylurethane. | 3-methyl-4-hydroxycyclohexyl N-phenylurethane. |
| 3-methyl-1-phenethoxycyclohexane. | 2-methyl-4-phenethoxycyclohexanol. |
| 2-chlorocyclohexanol | 2-chlorocyclohexane-1,4-diol. |
| 2-chloro-1-benzenesulfonyloxycyclohexane. | 2-chlorocyclohexane-1,4-diol. |
| 1-benzylcyclohexanol | 1-benzylcyclohexane-1,4-diol. |
| 1-benzylcyclohexyl N-phenylurethane. | 1-benzyl-4-hydroxycyclohexyl N-phenylurethane. |
| 2-butylcyclohexanol | 2-butylcyclohexane-1,4-diol. |
| 2-butylcyclohexanol butyrate. | 2-butylcyclohexane-1,4-diol. |
| 2-hydroxybicyclohexyl | 2,4'-dihydroxybicyclohexyl. |
| | 2,3'-dihydroxybicyclohexyl. |
| 4-hydroxybicyclohexyl | 4,4'-dihydroxybicyclohexyl. |
| | 4,4'-dioxobicyclohexyl. |
| | 4,1'-dihydroxybicyclohexyl. |
| | 4,2'-dihydroxybicyclohexyl. |
| 4-cyclopentylcyclohexanol | 4-(3-hydroxycyclopentyl)-cyclohexanol. |
| 2-bromocycloheptanol | 2-bromocycloheptane-1,4-diol. |
| 2-chlorocyclooctanol | 2-chloroocyclooctane-1,4-diol. |
| | 2-chlorocyclooctane-1,5-diol. |
| 1-cyclohexylcyclooctanol | 1-(4-hydroxycyclohexyl)-cyclooctanol. |
| 1,2-diphenylcyclooctanol | 1,2-diphenylcyclooctane-1,4-diol. |
| | 1,2-diphenylcyclooctane-1,5-diol. |
| 2-bromocyclodecanol | 2-bromocyclodecane-1,6-diol. |
| 1-methylcyclotridecanol | 1-methylcyclotridecane-1,7-diol. |
| | 1-methylcyclotridecane-1,6-diol. |
| | 1-methylcyclotridecane-1,5-diol. |

Table III—Continued

| Substrate | Principal Products |
|---|---|
| Cycloalkanones and functional derivatives thereof: | |
| Cyclopentanone | 3-hydroxycyclopentanone. |
| Cyclopentanone oxime | 3-hydroxycyclopentanone oxime. |
| Cyclopentanone hydrazone | 3-hydroxycyclopentanone hydrazone. |
| Cyclohexanone | 4-hydroxycyclohexanone. |
| Cyclohexanone oxime | 4-hydroxycyclohexanone oxime. |
| Cyclohexanone semicarbazone. | 4-hydroxycyclohexanone semicarbazone. |
| Cycloheptanone | 4-hydroxycycloheptanone. |
| Cycloheptanone oxime | 4-hydroxycycloheptanone oxime. |
| Cycloheptanone phenylhydrazone. | 4-hydroxycycloheptanone phenylhydrazone. |
| Cyclooctanone | 5-hydroxycyclooctanone. |
| | 4-hydroxycyclooctanone. |
| Cyclooctanone oxime | 5-hydroxycyclooctanone oxime. |
| | 4-hydroxycyclooctanone oxime. |
| Cyclooctanone thiosemicarbazone. | 5-hydroxycyclooctanone thiosemicarbazone. |
| | 4-hydroxycylooctanone thiosemicarbazone. |
| Cyclononanone | 5-hydroxycyclononanone. |
| | 4-hydroxycyclononanone. |
| | Cyclononane-1,5-dione. |
| | Cyclononane-1,4-dione. |
| Cyclodecanone | 6-hydroxycyclodecanone. |
| | 5-hydroxycyclodecanone. |
| Cycloundecanone | 6-hydroxycycloundecanone. |
| | 5-hydroxycycloundecanone. |
| | Cycloundecane-1,6-dione. |
| | Cycloundecane-1,5-dione. |
| Cyclododecanone | 7-hydroxycylododecanone. |
| | 6-hydroxycyclododecanone. |
| | 5-hydroxycyclododecanone. |
| | Cyclododecane-1,7-dione. |
| | Cyclododecane-1,6-dione. |
| | Cyclododecane-1,5-dione. |
| Cyclotridecanone | 7-hydroxycyclotridecanone. |
| | 6-hydroxycyclotridecanone. |
| | 5-hydroxycyclotridecanone. |
| | Cyclotridecane-1,7-dione. |
| | Cyclotridecane-1,6-dione. |
| | Cyclotridecane-1,5-dione. |
| Cyclotetradecanone | 7-hydroxycyclotetradecanone. |
| | 6-hydroxycyclotetradecanone. |
| | 8-hydroxycyclotetradecanone. |
| | Cyclotetradecane-1,7-dione. |
| | Cyclotetradecane-1,6-dione. |
| | Cyclotetradecane-1,8-dione. |
| Cyclopentadecanone | 8-hydroxycyclopentadecanone. |
| | 7-hydroxycyclopentadecanone. |
| | 6-hydroxycyclopentadecanone. |
| | Cyclopentadecane-1,8-dione. |
| | Cyclopentadecane-1,7-dione. |
| | Cyclopentadecane-1,6-dione. |
| 2-benzylcyclopentanone | 2-benzyl-4-hydroxycyclopentanone. |
| 2-bromocyclopentanone cyclic ethylene ketal. | 2-bromo-4-hydroxycyclopentanone cyclic ethylene ketal. |
| 2-butylcyclopentanone | 2-butyl-4-hydroxycyclopentanone. |
| 2-chlorocyclooctanone | 2-chloro-5-hydroxycyclooctanone. |
| | 2-chloro-4-hydroxycyclooctanone. |
| 2-dimethylaminocyclopentanone. | 2-dimethylamino-4-hydroxycyclopentanone. |
| 2-isopropylcyclopentanone hydrazone. | 2-isopropyl-4-hydroxycyclopentanone hydrazone. |
| 2-phenoxycyclopentanone oxime. | 2-phenoxy-4-hydroxycyclopentanone oxime. |
| 2-piperidinocyclopentanone | 2-piperidono-4-hydroxycyclopentanone. |
| 2-(1-pyrrolidinylmethyl)-cyclopentanone. | 2-(1-pyrrolidinylmethyl)-4-hydroxycyclopentanone. |
| 2-benzyloxycyclohexanone cyclic ethylene ketal. | 2-benzyloxy-4-hydroxycyclohexanone cyclic ethylene ketal. |
| 2-bromocyclohexanone semicarbazone. | 2-bromo-4-hydroxycyclohexanone semicarbazone. |
| (Oxygenated cycloalkyl) substituted cycloalkanes and functional derivatives thereof: | |
| 2-cyclohexylcyclopentanone | 2-(4-hydroxycyclohexyl)-cyclopentanone. |
| 4-oxobicyclohexyl | 4-oxo-4'-hydroxybicyclohexyl. |
| 2-oxobicyclopentyl | 2-(3-hydroxycyclopentyl)-cyclopentanone. |
| 3-oxobicyclohexyl oxime | 3-oxo-4'-hydroxybicyclohexyl oxime. |
| 2-chloro-4-cyclopentylcyclohexanone. | 2-chloro-4-(3-hydroxycyclopentyl)-cyclohexanone. |
| 2-(p-chlorophenyl) cyclohexanone. | 4-hydroxy-2-(p-chlorophenyl)-cyclohexanone. |
| 2-oxobicyclohexyl | 2-oxo-4'-hydroxybicyclohexyl. |
| | 2-oxo-3'-hydroxybicyclohexyl. |
| 2-(cyclohexylmethyl)-cyclohexanone. | 2-(4-hydroxycyclohexylmethyl)-cyclohexanone. |
| 2-(cyclohexyloxy)-cyclohexanone. | 2-(4-hydroxycyclohexyloxy)-cyclohexanone. |
| 2-cyclopentylcyclohexanone | 2-(3-hydroxycyclopentyl)-cyclohexanone. |
| 2-cyclopentylcyclohexanone oxime. | 2-(3-hydroxycyclopentyl)-cyclohexanone oxime. |
| 2,6-dicyclohexylcyclohexanone | 2-cyclohexyl-6-(4-hydroxycyclohexyl) cyclohexanone. |
| 4-piperidinobicyclohexyl | 4-piperidino-4'-hydroxybicyclohexyl. |
| 4-oxobicyclohexyl cyclic trimethylene ketal. | 4-oxo-4'-hydroxybicyclohexyl cyclic trimethylene ketal. |
| 3-oxobicyclohexyl phenylhydrazone. | 3-oxo-4'-hydroxybicyclohexyl phenylhydrazone. |

Table III—Continued

| Substrate | Principal Products |
|---|---|
| 2-acetoxybicyclohexyl | 2,3'-dihydroxybicyclohexyl. |
| | 2,4'-dihydroxybicyclohexyl. |
| 4-cyclohexylcycloheptanone | 4-(4-hydroxycyclohexyl)-cycloheptanone. |
| 4-cyclohexylcycloheptanol | 4-(4'-hydroxycyclohexyl)-cycloheptanol. |
| 4-cyclohexylcycloheptanol N-methylurethane | 4-(4'-hydroxycyclohexyl)-cycloheptanol N-methylurethane. |
| 2-cyclopentylcycloheptanone | 2-(3-hydroxycyclopentyl)-cycloheptanone. |
| 2-cyclopentylcycloheptanone semicarbazone | 2-(3-hydroxycyclopentyl)-cycloheptanone semicarbazone. |
| 2-cyclopentylcycloheptanol acetate | 2-(3-hydroxycyclopentyl)-cycloheptanol. |
| Aminocycloalkanes: | |
| Dimethylaminocycloheptane | 4-dimethylaminocycloheptanol. |
| N-cycloheptyl-N-methylaniline | N-(4-hydroxycyloheptyl)-N-methylaniline. |
| N-benzyl-N-methylcyclohexylamine | N-benzyl-N-methyl-4-hydroxycyclohexylamine. |
| N,N-dibutylcyclohexylamine | N,N-dibutyl-4-hydroxycyclohexylamine. |
| 4-cyclopentyl-N,N-dimethylcyclohexylamine | 4-(3-hydroxycyclopentyl)-N,N-dimethyl cyclohexylamine. |
| N,N-dimethylcyclononylamine | N,N-dimethyl-4 and 5-hydroxycyclononylamine. |
| N,N-dimethylcycloundecylamine | N,N-dimethyl-5 and 6-hydroxycycloundecylamine. |
| N,N-dimethylcyclododecylamine | N,N-dimethyl-5, 6, and 7-hydroxycyclododecylamine. |
| Pyrrolidinocyclohexane | 4-pyrrolidoinocyclohexanol. |
| 2,5-dimethylpyrrolidinocyclohexane | 4-(2,5-dimethylpyrrolidino)-cyclohexanol. |
| Pyrrolidinocyclopentane | 3-pyrrolidinocyclopentanol. |
| Piperidinocyclohexane | 4-piperidinocyclohexanol. |
| 2,5-dimethylpiperidinocyclohexane | 4-(2,5-dimethylpiperidino)-cyclohexanol. |
| Piperidinocyclopentane | 3-piperidinocyclopentanol. |
| Morpholinocyclohexane | 4-morpholinocyclohexanol. |
| N-methyl-N-cyclopentylacetamide | N-methyl-N-(3-hydroxycyclopentyl) acetamide. |
| N-cyclododecylacetamide | N-(7-oxocyclododecyl) acetamide. |
| | N-(6-oxocyclododecyl) acetamide. |
| | N-(5-oxocyclododecyl) acetamide. |
| | N-(7-hydroxycyclododecyl) acetamide. |
| | N-(6-hydroxycyclododecyl) acetamide. |
| | N-(5-hydroxycyclododecyl) acetamide. |
| N,N-dicyclohexylacetamide | N-cyclohexyl-N-(4-hydroxycyclohexyl) acetamide. |
| | N-cyclohexyl-N-(3-hydroxycyclohexyl) acetamide. |
| N-cyclohexyl-p-toluenesulfonamide | N-(4-hydroxycyclohexyl)-p-toluenesulfonamide. |
| N-cycloheptylbenzenesulfonamide | N-(4-hydroxycycloheptyl)-benzenesulfonamide. |
| Benzyl N-cyclohexylcarbamate | Benzyl 4-hydroxycyclohexylcarbamate. |
| Benzyl cycloheptylcarbamate | Benzyl 4-hydroxycycloheptylcarbanate. |
| Hydrocarbon substituted cycloalkanes: | |
| Benzylcyclopentane | 3-benzylcyclopentanol. |
| Cyclohexylcyclopentane | 4-(3-hydroxycyclopentyl)-cyclohexanol. |
| Cyclopentylcyclopentane | 3,3'-dihydroxybicyclopentyl. |
| 1,3-dicyclopentylcyclopentane | 1,3-bis(3-hydroxycyclopentyl)-cyclopentane. |
| α-Naphthylcyclopentane | 3-(α-naphthyl) cyclopentanol. |
| β-Naphthylcyclopentane | 3-(β-naphthyl) cyclopentanol. |
| Benzylcyclohexane | 4-benzylcyclohexanol. |
| 1,2-diphenylcyclohexane | 1,2-diphenylcyclohexan-4-ol. |
| 2-methylcyclopentylcyclohexane | 4-(3-hydroxy-5-methylcyclopentyl)-cyclohexanol. |
| α-Naphthylcycloheptane | 4-(α-naphthyl) cycloheptanol. |
| β-Naphthylcycloheptane | 4-(β-naphthyl) cycloheptanol. |
| Benzylcyclooctane | 4- and 5-benzylcyclooctanol. |
| Bicyclooctyl | 4,4'-dihydroxybicyclooctyl. |
| | 5,5'-dihydroxybicyclooctyl. |
| | 4,5'-dihydroxybicyclooctyl. |
| Phenylcyclooctane | 4- and 5-phenylcyclooctanol. |
| P-nitrophenylcyclohexane | 4-(p-nitrophenyl) cyclohexanol. |
| Hydrocarbonsulfonyl substituted cycloalkanes: | |
| Methylsulfonylcyclohexane | 3 and 4-methylsulfonylcyclohexanol. |
| Phenylsulfonylcyclohexane | 3 and 4-phenylsulfonylcyclohexanol. |
| p-Tolylsulfonylcyclohexane | 3 and 4-(p-toluenesulfonyl)-cyclohexanol. |
| Diphenylmethylsulfonylcyclohexane | 3 and 4-(diphenylmethylsulfonyl) cyclohexanol. |
| Ethylsulfonylcyclopentane | 3-ethylsulfonylcyclopentanol. |
| Cyclohexyl sulfone | 4-hydroxycyclohexyl cyclohexyl sulfone. |
| | 3-hydroxycyclohexyl cyclohexyl sulfone. |
| Cyclohexyl cycloheptylsulfone | 4-hydroxycycloheptyl cyclohexyl sulfone. |
| | 4-oxocycloheptyl cyclohexyl sulfone. |
| Cyclopentyl sulfone | 3-hydrocyclopentyl cyclopentyl sulfone. |
| Cyclohexyl cyclopentyl sulfone | 4-hydroxycyclohexyl cyclopentyl sulfone. |
| | 3-hydroxycyclohexyl cyclopentyl sulfone. |
| | 3-hydroxycyclopentyl cyclohexyl sulfone. |
| Hydroxyalkyl cycloalkanes and esters therof: | |
| Hydroxymethylcyclohexane | 4-hydroxymethylcyclohexanol. |
| Cyclohexylmethyl N-methylcarbamate | 4-hydroxycyclohexylmethyl N-methylcarbamate. |
| | 3-hydroxycyclohexylmethyl N-methylcarbamate. |
| 2-cyclohexylethanol | 2-(4-hydroxycyclohexyl) ethanol. |
| Cycloheptaneethanol | 4-hydroxycycloheptaneethanol. |
| Cycloheptanemethanol | 4-hydroxycycloheptanemethanol. |
| Cyclopentaneethanol | 3-hydroxycyclopentaneethanol. |
| Cyclopentanemethanol | 3-hydroxycyclopentanemethanol. |
| Cyclopentane-α-methylmethanol | 3-hydroxycyclopentane-α-methylmethanol. |
| 2-methylcyclopentanemethanol carbanilate | 4-hydroxy-2-methylcyclopentanemethanol carbanilate. |
| Cyclooctanemethanol | 5-hydroxycyclooctanemethanol. |
| | 4-hydroxycyclooctanemethanol. |
| Cyclooctaneethanol | 5-hydroxycyclooctaneethanol. |
| | 4-hydroxycyclooctaneethanol. |
| Cyclooctanemethanol carbanilate | 5-hydroxycyclooctanemethanol carbanilate. |
| | 4-hydroxycyclooctanemethanol carbanilate. |
| Cyclooctaneethanol carbanilate | 5-hydroxycyclooctaneethanol carbanilate. |
| | 4-hydroxycyclooctaneethanol carbanilate. |
| Cyclodecanemethanol acetate | 6-hydroxycyclodecanemethanol. |
| Cycloundecanemethanol | 6-hydroxycycloundecanemethanol. |
| | 5-hydrocycloundecanemethanol. |
| Cyclododecanemethanol N-methylurethane | 7-hydroxycyclododecanemethanol N-methylurethane. |
| | 6-hydrocyclododecanemethanol N-methylurethane. |
| | 5-hydroxycyclododecanemethanol N-methylurethane. |
| Cyclotridecanemethanol | 7-hydroxycyclotridecanemethanol. |
| | 6-hydroxycyclotridecanemethanol. |
| | 5-hydroxycyclotridecanemethanol. |
| Cyclotetradecanemethanol | 7-hydroxycyclotetradecanemethanol. |
| | 6-hydroxycyclotetradecanemethanol. |
| | 8-hydroxycyclotetradecanemethanol. |
| Acylaminoalkylcycloalkanes: | |
| N-(cycloheptanemethyl) benzamide | N-(4-hydroxycycloheptanethyl)-benzamide. |
| N-methyl-N-(cycloheptaneethyl)-p-toluenesulfonamide | N-methyl-N-(4-hydroxycycloheptaneethyl)-p-toluenesulfonamide. |
| N-(cyclopentyaneethyl) acetamide | N-(3-hydroxycyclopentaneethyl)-acetamide. |
| N-(α-methylcyclopentaneethyl)-acetamide | N-(α-methyl-3-hydroxycyclopentaneethyl) acetamide. |
| N-(cyclopentanemethyl) butyramide | N-(3-hydroxycyclopentanemethyl)-butyramide. |
| N-(α-methylcyclopentanemethyl)-propionamide | N-(α-methyl-3-hydroxycyclopentanemethyl)-propionamide. |
| N-(2-methylcyclopentanemethyl)-cyclobutanecarboxamide | N-(2-methyl-3-hydroxycyclopentanemethyl)-cyclobutanecarboxamide. |
| N-(2-ethylcyclopentanemethyl)-cyclopentanecarboxamide | N-(2-ethyl-3-hydroxycyclopentanemethyl) cyclopentanecarboxamide. |
| Carboxamidocycloalkanes and carboxamidoalkylcycloalkanes: | |
| Cycloundecane carboxamide | 6-hydroxycycloundecane carboxamide. |
| | 5-hydroxycycloundecane carboxamide. |
| Cyclononane carboxanilide | 5-hydroxycyclononane carboxanilide. |
| | 4-hydroxycyclononane carboxanilide. |
| Cyclononane carboxamide | 5-hydroxycyclononane carboxamide. |
| | 4-hydroxycyclononane carboxamide. |
| N-methylcyclononane carboxamide | N-methyl-5-hydroxycyclononane carboxamide. |
| | N-methyl-4-hydroxycyclononane carboxamide. |
| N,N-dimethylcyclononane carboxamide | N,N-dimethyl-5-hydroxycyclononane carboxamide. |
| | N,N-dimethyl-4-hydroxycyclononane carboxamide. |
| Cyclodecane carboxanilide | 6-hydrocyclodecane carboxanilide. |
| | 5-hydroxycyclodecane carboxanilide. |
| Cyclodecane carboxamide | 6-hydroxycyclodecane carboxamide. |
| | 5-hydroxycyclodecane carboxamide. |
| N-methylcyclodecane carboxamide | N-methyl-6-hydroxycyclodecane carboxamide. |
| | N-methyl-5-hydroxycyclodecane carboxamide. |
| N,N-dimethylcyclodecane carboxamide | N,N-dimethyl-6-hydroxycyclodecane carboxamide. |
| | N,N-dimethyl-5-hydroxycyclodecane carboxamide. |
| Cycloheptane carboxamide | 4-hydroxycycloheptane carboxamide. |

Table III—Continued

| Substrate | Principal Products |
|---|---|
| Cyclohexane carboxamide | 4-hydroxycyclohexane carboxamide. |
| 2-methylcyclohexane carboxamide. | 4-hydroxy-2-methylcyclohexane carboxamide. |
| N,N-diethylcyclohexane carboxamide. | N,N-diethyl-4-hydroxycyclohexane carboxamide. |
| N-methylcyclohexane carboxamide. | N-methyl-4-hydroxycyclohexane carboxamide. |
| N-cyclohexylcyclohexane carboxamide. | N-cyclohexyl-4-hydroxycyclohexane carboxamide. |
| N-phenylcyclohexane carboxamide. | N-phenyl-4-hydroxycyclohexane carboxamide. |
| N-benzylcyclohexane carboxamide. | N-benzyl-4-hydroxycyclohexane carboxamide. |
| 2-methycyclopentanepropionamide. | 4-hydroxy-2-methylcyclopentane-propionamide. |
| Cyclopentanecarboxamide | 3-hydroxycyclopentane carboxamide. |
| 1-methylcyclopentanecarboxamide. | 1-methyl-3-hydroxycyclopentane carboxamide. |
| 2-methylcyclopentane-carboxamide. | 2-methyl-4-hydroxycyclopentane carboxamide. |
| N,N-dimethylcyclopentane-carpoxamide. | N,N-dimethyl-3-hydroxycyclopentane carboxamide. |
| N-phenylcyclopentane-carboxamide. | N-phenyl-3-hydroxycyclopentane carboxamide. |
| Cyclooctanecarboxamide | 5-hydroxycyclooctane carboxamide. |
| | 4-hydroxycyclooctane carboxamide. |
| N-phenylcyclooctane-carboxamide. | N-phenyl-5-hydroxycyclooctane carboxamide. |
| | N-phenyl-4-hydrocyclooctane carboxamide. |
| α-Cyanocyclooctaneacetamide. | α-Cyano-4-hydroxycyclooctane acetamide. |
| α-Cyclohexyl-α-phenylacetonitrile | α-4-hydroxycyclohexyl-α-phenyl-acetonitrile. |
| | α-3-hydroxycyclohexyl-α-phenyl-acetonitrile. |
| Hydrocarbon substituted sulfonylureidocycloalkanes: | |
| 1-(p-tolylsulfonyl)-3-cyclopentylurea. | 1-(p-tolylsulfonyl)-3-(hydroxycyclopentyl) urea. |
| 1-(p-acetylbenzenesulfonyl)-3-cyclohexylurea. | 1-(p-acetylbenzenesulfonyl)-3-(4-hydroxycylohexyl) urea. |
| | 1-(p-acetylbenzenesulfonyl)-3-(3-hydroxycyclohexyl) urea. |
| 1-(p-tolylsulfonyl)-3-cycloheptylurea. | 1-(p-tolylsulfonyl)-3-(4-hydroxycycloheptyl) urea. |
| | 1-(p-tolylsulfonyl)-3-(3-hydroxycycloheptyl) urea. |
| | 1-(p-tolylsulfonyl)-3-(4-oxocycloheptyl)urea. |
| | 1-(p-tolylsulfonyl)-3-(3-oxocycloheptyl) urea. |
| 1-(p-tolylsulfonyl) cyclododecyl urea. | 1(p-tolylsulfonyl)-3-(7-hydroxycyclododecyl) urea. |
| | 1-(p-tolylsulfonyl)-3-(6-hydroxycyclododecyl) urea. |
| | 1-(p-tolylsulfonyl)-3-(5-hydroxycyclododecyl) urea. |

While the process of the invention is of general applicability and can be employed for the oxygenation of any non-fused cycloalkane which has at least one "non-interfering" substituent in the cycloalkane ring, the process of the invention is of particular value for the introduction of oxygen into the cycloalkane ring of a compound having the formula:

(I)

wherein A is the residue of a cycloalkane ring containing from 5 to 15 carbon atoms, inclusive, $R^1$ and $R^2$ taken individually are selected from the group consisting of hydrogen; hydroxy; aryl from 6 to 12 carbon atoms, inclusive; aryl from 6 to 12 carbon atoms, inclusive, substituted by at least one radical selected from the group consisting of lower-alkoxy containing from 1 to 8 carbon atoms, inclusive, as hereinbefore defined, carbamoyloxy, (lower-alkyl)carbamoyloxy, di-(lower-alkyl)carbamoyloxy and arylcarbamoylaryl, wherein the lower-alkyl substituents contain from 1 to 8 carbon atoms, inclusive, and the aryl substituent contains from 6 to 12 carbon atoms, inclusive, as hereinbefore defined; cycloalkyl from 5 to 15 carbon atoms, inclusive, as hereinbefore defined; cycloalkyl from 5 to 15 carbon atoms, inclusive, substituted by at least one substituent selected from the class consisting of 5 to 9 ring atom heterocyclic amino, hydroxy, keto and functionally substituted keto and hydroxy as hereinbefore defined; acylamino wherein the acyl radical is derived from acids selected from the class consisting of hydrocarbon carboxylic acids containing from 1 to 12 carbon atoms, inclusive, and hydrocarbon sulfonic acids containing from 1 to 12 carbon atoms, inclusive, hereinbefore defined; cycloalkylsulfonyl wherein the cycloalkyl substituent contains from 5 to 15 carbon atoms, inclusive;

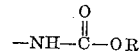

wherein R is selected from the group consisting of lower-alkyl containing from 1 to 8 carbon atoms, inclusive, aralkyl containing from 7 to 13 carbon atoms, inclusive, and aryl containing from 6 to 12 carbon atoms, inclusive; $-C_nH_{2n}-R^3$ wherein $C_nH_{2n}$ is alkylene containing from 1 to 6 carbon atoms, inclusive, and $R^3$ is selected from the group consisting of hydroxy, carbamoyloxy, (lower-alkyl)carbamoyloxy, di-(lower-alkyl)carbamoyloxy and arylcarbamoyloxy wherein the lower-alkyl and aryl substituents have the meanings given above;

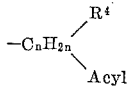

wherein $C_nH_{2n}$ has the meaning given above, Acyl is an acyl radical having the meaning given above and $R^4$ is selected from the group consisting of hydrogen, lower-alkyl containing from 1 to 8 carbon atoms, inclusive, aralkyl containing from 7 to 13 carbon atoms, inclusive, and aryl containing from 6 to 12 carbon atoms, inclusive;

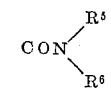

wherein $R^5$ and $R^6$ are selected from the group consisting of hydrogen, lower alkyl of 1 to 8 carbon atoms, inclusive, aralkyl of 7 to 13 carbon atoms, inclusive, and aryl of 6 to 12 carbon atoms, inclusive;

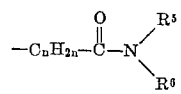

wherein $C_nH_{2n}$, $R^5$ and $R^6$ have the meanings given above; and arylsulfonylureido wherein aryl contains from 6 to 12 carbon atoms, inclusive; provided that $R^1$ and $R^2$ do not represent hydrogen simultaneously and $R^1$ and $R^2$ taken together represent carbonyl.

The above compounds when subjected to the process of the invention give rise to the corresponding compounds wherein the cycloalkane ring has been oxygenated by the introduction of a hydroxy or keto group. Where one or both of the substituents $R^1$ and $R^2$ contain a cycloalkane ring said ring may also be oxygenated during the process of the invention. The oxygenated compounds obtained by subjecting the compounds of the above Formula I to the process of the invention can be isolated, separated, and purified by the methods discussed above.

The process of the invention gives rise to oxygenated cycloalkanes, many of which are known, which have not hitherto been readily available by purely chemical methods of synthesis.

The compounds produced by the process of the invention, including those named in the Table III above and those prepared as described in Examples 1 through 100, are useful as insecticides, fungicides, protein denaturants, perfumery agents, insect repellants, high boiling solvents, plasticizers for synthetic resins, cross linking agents, pharmacologic agents for psychic control effects and as intermediates for dyes, urethane polymers and fibers.

The oxygenated cycloalkylsulfonylureas produced by the process of this invention are orally active antidiabetic agents useful for lowering blood sugar content in mammals, especially humans, to a safe level. For example, both 1-(p-tolylsulfonyl)-3-(4-hydroxycycloheptyl)urea and 1-(p-tolylsulfonyl)-3-(4-oxocycloheptyl)urea have a hypoglycemic activity of about 4 times that of tolbutamide in glucose-primed, fasted, intact rats. In addition, these novel compounds are useful in animal feeds and animal feed supplements in the manner disclosed in U.S. Patent 2,941,884. These novel compounds are also useful as wetting, emulsifying, and waterproofing agents in the paper and leather industries.

The oxygenated cycloalkanols, cycloalkanones and the functional derivatives thereof, e.g., the cycloalkanediols, cycloalkanediones, hydroxycycloalkanones, the diacyloxy-cycloalkanes and the acyloxycycloalkanones produced by the process of the invention including those set forth in the Table III above and in Examples 1 to 13, are central nervous system depressants and are useful as sedatives and general anesthetics in mammals, particularly in humans and animals. For example, they can be used as sedatives and anesthetics in the laboratory manipulation of experimental animals such as mice and rats. The oxygenated cycloalkanols and cycloalkanones produced by the process of the invention are also useful as perfumery agents and for the preparation of perfumery agents, being closely related to certain musk principles. They are also useful as plasticizers for cellulosic and vinyl polymers, and as intermediates in chemical synthesis. For use as plasticizers they can be used singly or in mixtures of the position isomers, for example, the mixture obtained from the bioconversion step can be purified by crystallization and used directly as a plasticizer.

As an example of their use as intermediates the oxygenated cycloalkanes produced by the process of the invention wherein the introduced oxygen substituent is keto (the compounds having attached hydroxy groups can be converted to keto by chemical oxygenation, e.g., using chromic acid) can be converted to lactams which can be hydrolyzed to amino acids in accordance with the procedures disclosed in U.S. Patents 2,579,851 and 2,569,114. For example, the ketones are converted to oximes by reacting them with hydroxylamine or a salt thereof. The oximes are then subjected to a Beckman rearrangement by treatment with sulfuric acid or the equivalent to produce lactams. The lactams thus produced are useful intermediates giving on hydrolysis amino acids. The lactams and amino acids thus obtained are useful for the manufacture of valuable products, for example, polyamides, as disclosed in U.S. Patent 2,579,851 supra.

The oxygenated cycloalkanes produced by the process of this invention having two or more hydroxy groups present are also useful for the preparation of urethane polymers by reacting for example, a selected dihydroxy-bicyclohexyl with a polyisocyanate, for example, in the manner disclosed in U.S. Patent 3,161,559, to give substantially non-porous, dense solid materials useful as coatings, castings, moldings and laminates, or useful low density, cellular products ranging from rigid foams to flexible spongy materials.

The cycloalkane compounds employed as substrates in the process of the invention are for the greater part known, see for example, Kolbegen et al., J. Agr. and Food Chem., 2, 864–870 (1954); Belgium Patent 612,973, German Patent 1,136,869 [C.A. 58, 10680a (1963)], British Patent 929,791 and U.S. Patent 3,005,022, or can be prepared by conventional methods such as those set forth below and in the preparations appended hereto. General methods for the preparation of the cycloalkanes employed as substrates in the process of the invention are set forth in Chemistry of Carbon Compounds, Edited by E. H. Rodd, volume IIA, Chapters I to VI, Elsevier Publishing Company, New York, 1953.

The lower-alkoxy phenylcycloalkanes employed as substrates can be prepared in accordance with the procedure described by Mentzer et al., Bully. Soc. Chim. France, 1948, 263–268, or by the Williamson ether synthesis, i.e., by reacting the appropriate alkyl halide with the sodium salt of the selected cycloalkylphenol such as cyclohexylphenol. The cycloalkylphenyl lower-alkylcarbamates and cycloalkylphenyl arylcarbamates can also be prepared by known methods, for example, by the reaction of a cycloalkylphenol, e.g., cyclohexylphenol with an isocyanate or a carbamic acid halide or by the reaction of a cycloalkylphenylchloroformate, e.g., cyclohexylphenylchloroformate with the appropriate alkyl or aryl amine.

The N-acyl derivatives of cycloalkylamines are prepared from cycloalkylamines and dicycloalkylamines by methods known in the art for converting amines to amides and carbamates. The dicycloalkylamines are conveniently prepared in the form of their hydrochlorides by the "Leuckart Reduction" (Organic Reactions, vol. 5, pp. 301–330, John Wiley and Sons, Inc., New York). The N-cycloalkylamides and N,N-dicycloalkylamides are prepared by reacting the selected cycloalkylamine or dicycloalkylamine with the anhydride or acid halide of a monobasic carboxylic acid or a monobasis aryl sulfonic acid, for example, those hereinbefore listed. The aryl or aralkyl N-cycloalkylcarbamates and aryl or aralkyl N,N-dicycloalkylcarbamates are prepared by reacting the selected cycloalkylamine or dicycloalkylamine with the appropriate aralkyloxy halide or carbaralkyloxy halide, such as, for example, carbobenzoxy chloride and phenylchloroformate.

The cycloalkyl arylsulfonyl ureas can be prepared by reacting the selected arylsulfonylurethane with the appropriate cycloalkylamine in accordance with the process disclosed by Marshall et al., J. Org. Chem., 23, 927 (1958), as hereinafter illustrated. The starting arylsulfonylurethanes, many of which are known, can be prepared as disclosed by Marshall et al.

The following preparations and examples are intended to illustrate the process of this invention as applied to representative and typical individual organisms. The following examples are for the purpose of illustrating the best mode contemplated of carrying out the invention and to supplement the foregoing disclosure of the invention with additional descriptions of the manner and process of carrying out the invention so as further to enable workers skilled in the art to do so.

PREPARATION 1

*3-hydroxybicyclohexyl*

A solution of 19.42 g. of 3-phenylcyclohex-2-enone in 200 ml. of 95% ethanol containing 2 ml. of concentrated hydrochloric acid was hydrogenated at 40 p.s.i. (guage) initial pressure over 5.65 g. of Adam's platinum catalyst. The mixture was filtered, the filtrate was evaporated and the residue was purified by chromatography and distillation at 112.5–115°/0.2 mm. to give 4.86 g. of 3-hydroxybicyclohexyl.

*Analysis.*—Calcd. for $C_{12}H_{22}O$: C, 79.06; H, 12.16. Found: C, 78.95; H, 11.80.

PREPARATION 2

*4-oxobicyclohexyl cyclic ethylene ketal*

Oxidation at 25–30° C. of 100 g. of 4-hydroxybicyclohexyl in about 1 l. of acetone with chromic acid gave 91.5 g. of crude 4-oxobicyclohexyl as a pale yellow oil. The crude ketone was converted to the cyclic ethylene ketal by stirring and refluxing for about three hours with a mixture of 200 ml. of ethylene glycol, 3.2 g. of p-toluenesulfonic acid monohydrate, and about 2 l. of benzene in an apparatus equipped with a water trap; the 4-oxobicyclohexyl cyclic ethylene ketal thus produced was recrystallized from methanol; yield 68.9 g., M.P. 47–49° C.

*Analysis.*—Calcd. for $C_{14}H_{24}O_2$: C, 74.95; H, 10.78. Found: C, 75.16; H, 10.61.

In the same manner, 3-hydroxybicyclohexyl and 2-hydroxybicyclohexyl are oxidized to 3-oxobicyclohexyl and 2-oxobicyclohexyl, respectively, and converted to 3-oxobicyclohexyl cyclic ethylene ketal and 2-oxobicyclohexyl cyclic ethylene ketal, respectively.

PREPARATION 3

*4-oxobicyclohexyl cyclic trimethylene ketal*

Crude 4-oxobicyclohexyl (25 g.) was converted to the cyclic trimethylene ketal by stirring and refluxing for about 48 hours with 20 ml. of propane-1,3-diol and 1 g. of p-toluenesulfonic acid monohydrate in 200 ml. of benzene in an apparatus equipped with a water trap. The ketal was isolated as an oil that crystallized. Recrystallization from ether afforded 4.13 g. of 4-oxobicyclohexyl cyclic trimethylene ketal, M.P. 50–54.5° C.; a sample recrystallized twice from methanol melted at 58.5–59° C.

*Analysis.*—Calcd. for $C_{15}H_{26}O_2$: C, 75.58; H, 11.00. Found: C, 75.83; H, 10.77.

In the same manner, substituting 3-oxobicyclohexyl or 2-oxobicyclohexyl for 4-oxobicyclohexyl is productive of the respective cyclic trimethylene ketals.

In the same manner, substitution of ethylene glycol or propane-1,3-diol in Preparations 1 and 2 by other glycols such as propane-1,2-diol, butane-2,3-diol, pentane-2,4-diol, 4-methylpentane-1,2-diol, hexane-1,3-diol, heptane-1,2-diol, heptane-3,4-diol and octane-1,3-diol is productive of the corresponding cyclic alkylene ketals.

PREPARATION 4

*4-oxobicyclohexyl oxime*

The crude 4-oxobicyclohexyl obtained by the chromic acid oxidation of 25 g. of 4-hydroxybicyclohexyl was dissolved in a mixture of 125 ml. each of ethanol and pyridine, and refluxed for two hours with 25 g. of hydroxylamine hydrochloride. Evaporation of the solvent, and recrystallization of the residue from aqueous methanol gave 21.7 g. of 4-oxobicyclohexyl oxime, M.P. 100–107°.

In the same manner, substitution of 3-hydroxybicyclohexyl or 2-hydroxybicyclohexyl for 4-hydroxybicyclohexyl results in the preparation of 3-oxobicyclohexyl oxime and 2-oxobicyclohexyl oxime, respectively.

PREPARATION 5

*4-piperidinobicyclohexyl and the hydrochloride thereof*

Piperidine (49.5 ml.) was added slowly to 19.9 ml. of 98+% formic acid with stirring and external cooling; 45 g. of 4-oxobicyclohexyl was added and the mixture was refluxed for 5 hours and then allowed to stand at room temperature for about 12 hours. The precipitate which separated was recovered by filtration, washed with water and dissolved in acetone. The solution was concentrated until the product started to precipitate from solution; the mixture was then chilled and 4-piperidinobicyclohexyl was recovered by filtration, washed with cold acetone, and air dried; yield 20 g., M.P. 145–146° C.

*Analysis.*—Calcd. for $C_{17}H_{31}N$: C, 81.85; H, 12.53; N, 5.62. Found: C, 81.84; H, 12.42; N, 5.88.

The acetone mother liquors were evaporated to dryness, and the residue was combined with the filtrate and aqueous wash from the first filtration above and acidified with about 50 ml. of concentrated hydrochloric acid. The acidified mixture was extracted several times with ether, boiled to remove dissolved ether, heated under reflux for about 5 hours, and allowed to stand at room temperature for about 14 hours. The 4-piperidinobicyclohexyl hydrochloride which separated was recovered by filtration, washed with cold water and ether, and dried; yield, 20.56 g., M.P. 278–280° C.

*Analysis.*—Calcd. for $C_{17}H_{31}N \cdot HCl$: C, 71.41; H, 11.28; Cl, 12.40. Found: C, 71.35; H, 11.21; Cl, 12.47.

In the same manner substitution of 3-oxobicyclohexyl or 2-oxobicyclohexyl for the 4-isomer is productive of 3-piperidinobicyclohexyl and 2-piperidinobicyclohexyl, respectively, and their hydrochlorides.

PREPARATION 6

*4-morpholinobicyclohexyl and the hydrochloride thereof*

Following the procedure described in Preparation 5, 29.0 ml. of morpholine, 12.5 ml. of formic acid and 30.0 g. of 4-oxobicyclohexyl were heated under reflux for 5 hours and allowed to stand at room temperature for about 12 hours. The crystals which separated were recovered, washed with water, and recrystallized from acetone; yield, 9.50 g. of 4-morpholinobicyclohexyl, M.P. 133° C.

*Analysis.*—Calcd. for $C_{16}H_{29}NO$: C, 76.44; H, 11.63; N, 5.57. Found: C, 76.55; H, 11.63; N, 5.57.

The filtrates from above were combined, treated with about 30 ml. of concentrated hydrochloric acid, and the mixture was processed as in Preparation 5 to produce 9.04 g. of 4-morpholinobicyclohexyl hydrochloride. A portion of this salt was dissolved in water, and the free base was precipitated by the addition of N sodium hydroxide. Recrystallization from aqueous acetone gave a 4-morpholinobicyclohexyl, M.P. 57° C., which was isomeric with the material melting at 133° C. isolated above.

*Analysis.*—Calcd. for $C_{16}H_{29}NO$: C, 76.44; H, 11.63; N, 5.57. Found: C, 75.92; H, 11.15; N, 5.58.

In the same manner, substitution of 3-oxobicyclohexyl and 2-oxobicyclohexyl for 4-oxobicyclohexyl is productive of 3-morpholinobicyclohexyl and 2-morpholinobicyclohexyl, respectively, and their hydrochlorides.

In the same manner, other heterocyclic amino bicyclohexyls and their hydrochlorides can be prepared by substituting other heterocyclic amines in place of piperidine or morpholine in Preparation 5 or 6. Such substitution is productive, for example, of 4-pyrrolidinobicyclohexyl
4-thiomorpholinobicyclohexyl
2-piperazinobicyclohexyl
4-(4-methyl-1-piperazinyl)bicyclohexyl
3-(4-propionyl-1-piperazinyl)bicyclohexyl
2-(4-butyryl-1-piperazinyl)bicyclohexyl and the like, and their hydrochloride salts.

PREPARATION 7

*Cycloheptanethiol*

An autoclave was charged with 60 g. of cycloheptanone, 35 g. of sulfur and 5 g. of finely divided pyrophoric iron (prepared by extracting the aluminum from a finely powdered alloy of iron and aluminum with sodium hydroxide solution as disclosed in U.S. Patent 2,402,683). The autoclave was then charged with hydrogen to a pressure of 2000 lbs./sq. in and heated to 100° C. for ½ hr. to convert the iron to the active sulfide catalyst. The temperature was then raised to 150° C. A rapid reaction resulted and hydrogen was added from time to time to maintain the total pressure within the range of from 1000 to 2000 lbs./sq. in. When the absorption of hydrogen ceased, the autoclave was cooled and the reaction mixture was filtered to remove the catalyst. Distillation of the filtrate gave an 80% yield of cycloheptanethiol.

In the same manner, the cycloalkyl mercaptans containing from 5 to 15 carbon atoms in the cycloalkyl ring can be prepared by substituting the appropriate cycloalkanone for cycloheptanone in Preparation 7. The following are products representative:

cyclooctanethiol,
cyclononanethiol,
cyclodecanethiol,
cycloundecanethiol,
cyclododecanethiol,
cyclotridecanethiol,
cyclotetradecanethiol, and
cyclopentadecanethiol.

PREPARATION 8

*Cycloheptylohexyl sulfide*

A mixture of 22.9 g. (0.26 mole) of cycloheptene and 26 ml. (ca. 26 g., 0.26 mole) of cyclohexanethiol was irradiated with ultraviolet light until the reaction was complete, about 5½ days. The mixture was distilled through a 4″ Vigreux column, and the cycloheptylcyclohexyl sulfide (30 g.) was collected; B.P. 109–112°/0.4–05 torr. A center cut, B.P. 110°/0.4 torr was submitted for analysis.

*Analysis.*—Calcd. for $C_{13}H_{24}S$: C, 73.53; H, 11.39; S, 15.07. Found: C, 73.53; H, 10.81; S, 15.35.

In the same manner, other dicycloalkyl sulfides can be prepared by reacting a cycloalkene containing from 5 to 15 carbon atoms, inclusive, and a cycloalkanethiol containing from 5 to 15 carbon atoms, inclusive. The following sulfides obtained in this manner are representative:

cycloheptyl sulfide,
cyclopentyl cyclooctyl sulfide,
cyclohexyl cyclooctyl sulfide,
cyclooctyl sulfide,
cyclohexyl cyclododecyl sulfide,
cyclohexyl cyclopentadecyl sulfide,
cyclononyl cyclododecyl sulfide, and
cyclopentadecyl cyclotetradecyl sulfide.

PREPARATION 9

Cycloheptyl cyclohexyl sulfone

To a solution of 30 g. of cycloheptyl cyclohexyl sulfide in about 300 ml. of acetic acid, 60 ml. of 30% hydrogen peroxide was added slowly with stirring. The mixture was left at room temperature overnight, poured into 1 l. of water, and the resultant precipitate was filtered and washed thoroughly with water. The crude, air-dried product (32.4 g., M.P. 78–80°) was recrystallized from 95% ethanol giving 13.3 g. of cycloheptyl cyclohexyl sulfone, M.P. 85.5–87° C.

In the same manner, other dicycloalkyl sulfones of Formula I can be prepared by substituting the appropriate dicycloalkyl sulfide for cycloheptyl cyclohexyl sulfide. For example, the dicycloalkyl sulfides, prepared and listed in the last paragraph of Preparation 8, can be converted to the following sulfones:

cycloheptyl sulfone,
cyclopentyl cyclooctyl sulfone,
cyclohexyl cyclooctyl sulfone,
cyclooctyl sulfone,
cyclohexyl cyclododecyl sulfone,
cyclohexyl cyclopentadecyl sulfone,
cyclononyl cyclodecyl sulfone, and
cyclotetradecyl cyclopentadecyl sulfone.

PREPARATION 10

General procedure for the preparation of dicycloalkylamine hydrochlorides by the Leuckart reaction The amine was added to 98+% formic acid in a round bottom flask while cooling with tap water; the ketone was then added directly to the still warm mixture. Boiling pellets were added to control the evolution of generated carbon dioxide, and the mixture was heated at reflux for about 5 hours. Dilution with water and acidification of the cooled mixture with hydrochloric acid and extraction of the cooled mixture with several volumes of ether removed unreacted ketone. The aqueous acid solution was boiled to remove dissolved ether and then heated at reflux for 1–4 hours to hydrolyze any formates of either unreacted starting materials or products. The hydrochloride salts separated directly from the cooled mixture and were recovered by filtration.

Following the above procedures, the following amine hydrochlorides were prepared:

Cyclohexylamine (57 ml.), cyclopentanone (67 ml.), and formic acid (24 ml.) produced 50.38 g. of cyclohexylcyclopentylamine hydrochloride, M.P. 271° C.

*Analysis.*—Calcd. for $C_{11}H_{21}N \cdot HCl$: C, 64.84; H, 10.89; Cl, 17.40. Found: C, 64.83; H, 11.03; Cl, 17.40.

Cyclohexylamine (112 ml.), cycloheptanone (59 ml.), and formic acid (37.7 ml.) produced 76 g. of cycloheptylcyclohexylamine hydrochloride, M.P. 264° C.

*Analysis.*—Calcd. for $C_{13}H_{25}N \cdot HCl$: C, 67.35; H, 11.31; Cl, 15.30. Found: C, 66.99; H, 11.08; Cl, 15.41.

Cyclohexylamine (12 ml.), cyclooctanone (15.7 g.) and formic acid (3.75 ml.) produced 13.0 g. of cyclohexylcyclooctylamine hydrochloride, M.P. 218° C.

*Analysis.*—Calcd. for $C_{14}H_{27}N \cdot HCl$: C, 68.40; H, 11.48; N, 5.70; Cl, 14.43. Found: C, 68.78; H, 11.69; N, 5.60; Cl, 14.51.

Cycloheptylamine (64 ml.), cycloheptanone (89 ml.) and formic acid (18.8 ml.) produced 80.8 g. of dicycloheptylamine hydrochloride, M.P. 230° C.

*Analysis.*—Calcd. for $C_{14}H_{27}N \cdot HCl$: C, 68.40; H, 11.48; Cl, 14.42. Found: C, 68.53; H, 11.13; Cl, 14.52.

Cyclododecylamine (15.0 g.), cyclohexanone (12.75 ml.), and formic acid (3.08 ml.) produced 25.95 g. of cyclododecylcyclohexylamine hydrochloride, M.P. 268° C.

*Analysis.*—Calcd. for $C_{18}H_{35}N \cdot HCl$: C, 71.59; H, 12.02; Cl, 11.74. Found: C, 72.29; H, 12.19; Cl; 11.61.

In the same manner, other dicycloalkylamine hydrochlorides, where the cycloalkyl radical contains from 5 to 15 carbon atoms, inclusive, can be prepared starting with the appropriate cycloalkylamine and cycloalkanone. The following additional conversions are representative:

cycloheptylamine + cyclopentadecanone to give cycloheptylcyclopentadecylamine hydrochloride,
cyclododecylamine + cyclodecanone to give cyclodedcylcyclododecylamine hydrochloride,
cyclopentylamine + cyclopentadecanone to give cyclopentadecylcyclopentylamine hydrochloride and the like.

PREPARATION 11

General procedure for the preparation of N-cycloalkylamides and N,N-dicycloalkylamides The N-cycloalkylamides and N,N-dicycloalkylamides of Formula I are prepared by cautiously reacting a cycloalkylamine or dicycloalkylamine with an acid anhydride or acid halide of a monobasic organic carboxylic acid such as those previously listed. The reaction mixture is then diluted with water and the resulting product thus obtained is recovered by conventional methods; if the product is an oil, by extraction with a suitable water-immiscible organic solvent such as methylene chloride; if the product is a solid, by filtration or centrifugation. The products thus obtained can be further purified by chromatography and/or crystallization from a suitable organic solvent such as acetone, Skellysolve B isomeric hexanes (hereinafter referred to as Skellysolve B), methylene chloride, methanol, ethanol, ether, combinations thereof and the like.

The following are illustrative:

Cyclooctylamine + acetic anhydride gave N-cyclooctylacetamide, M.P. 47–49.5° C.;

Cyclodecylamine + acetic anhydride gave N-cyclodecylacetamide, M.P. 65–66° C.;

*Analysis.*—Calcd. for $C_{12}H_{23}NO$: C, 73.04; H, 11.75; N, 7.10. Found: C, 72.68; H, 11.04; N, 6.93.

Cyclododecylamine + acetic anhydride gave N-cyclododecylacetamide, M.P. 144–144.5° C.;

*Analysis.*—Calcd. for $C_{14}H_{27}NO$: C, 74.61; H, 12.08; N, 6.22. Found: C, 74.63; H, 11.96; N, 6.06.

Cyclopentadecylamine + acetic anhydride gave N-cyclopentadecylacetamide, M.P. 129–130° C.;

*Analysis.*—Calcd. for $C_{16}H_{33}NO$: C, 76.35; H, 12.43; N, 5.24. Found: C, 76.21; H, 12.36; N, 4.84.

Cyclohexylamine + propionic anhydride gave N-cyclohexylpropionamide, M.P. 88–90° C.;

*Analysis.*—Calcd. for $C_9H_{17}NO$: C, 69.63; H, 11.04; N, 9.02. Found: C, 69.55; H, 11.05; N, 8.85.

Cyclohexylamine + butyric anhydride gave N-cyclohexylbutyramide, M.P. 60–63° C.;

*Analysis.*—Calcd. for $C_{10}H_{19}NO$: C, 70.96; H, 11.32; N, 8.28. Found: C, 70.82; H, 11.37; N, 8.19.

Cyclododecylamine + propionyl chloride gave N-cyclododecylpropionamide, M.P. 169–170° C.;

*Analysis.*—Calcd. for $C_{15}H_{29}NO$: C, 75.25; H, 12.21; N, 5.85. Found: C, 75.00; H, 12.53; N, 5.65.

Cyclohexylamine + cyclopropanecarboxylic acid gave N - cyclohexylcyclopropanecarboxamide, M.P. 139–140° C.;

*Analysis.*—Calcd. for $C_{10}H_{17}NO$: C, 71.81; H, 10.25; N, 8.38. Found: C, 71.66; H, 10.16; N, 8.10.

Cyclohexylamine + cyclobutanecarboxylic acid chloride gave N-cyclohexylcyclobutanecarboxamide, M.P. 114–115° C.;

*Analysis.*—Calcd. for $C_{11}H_{19}NO$: C, 72.88; H, 10.57; N, 7.73. Found: C, 72.44; H, 10.60; N, 7.86.

Cyclohexylamine + cyclopentanecarboxylic acid chloride gave N-cyclohexylcyclopentanecarboxylamide, M.P. 157–159° C.;

*Analysis.*—Calcd. for $C_{12}H_{21}NO$: C, 73.79; H, 10.84; N, 7.17. Found: C, 73.58; H, 10.90; N. 7.22.

Cyclohexylamine + cyclohexanecarbonyl chloride gave N-cyclohexylcyclohexanecarboxamide, M.P. 170–173° C.;

*Analysis.*—Calcd. for $C_{13}H_{23}NO$: C, 74.59; H, 11.08; N, 6.69. Found: C, 74.80; H, 11.27; N, 6.76.

Cyclohexylamine + cyclohexylacethylchloride gave N,α-dicyclohexylacetamide, M.P. 166–167° C.;

Cyclohexylamine + benzoyl chloride gave N-cyclohexylbenzamide, M.P. 149–150° C.;

*Analysis.*—Calcd. for $C_{13}H_{17}NO$: C, 76.81; H, 8.43; N, 6.89. Found: C, 76.40; H, 8.31; N, 6.74.

Cycloheptylamine + benzoyl chloride gave N-cycloheptylbenzamide, M.P. 132–133° C.;

*Analysis.*—Calcd. for $C_{14}H_{19}NO$: C, 77.38; H, 8.81; N, 6.45. Found: C, 77.33; H, 9.11; N, 6.59.

Dicyclohexylamine + benzoyl chloride gave N,N-dicyclohexylbenzamide, M.P. 92.5–100.5° C.

PREPARATION 12

N,N-dicycloalkylamides

Forty-one grams of cyclohexylcyclopentylamine hydrochloride suspended in 300 ml. of water was stirred with 100 ml. of 50% sodium hydroxide solution, and the free base was extracted with ether. The extract was washed once with water, dried over anhydrous sodium sulfate, and the solvent was removed to give the free base, which was dissolved in about 250 ml. of pyridine and treated with about 50 ml. of acetic anhydride at steam bath temperature for one hour and allowed to stand at room temperature for about 18 hours. The mixture was then stirred with about 750 ml. of water, made strongly acidic with concentrated hydrochloric acid, adjusted to pH 6 with 50% sodium hydroxide and extracted with ether. The extract was washed with dilute hydrochloric acid, dilute sodium hydroxide, water and dried over anhydrous sodium sulfate. The solvent was removed to yield 37.5 g. of N-cyclohexyl-N-cyclopentylacetamide, M.P. 53–54° C.

*Analysis.*—Calcd. for $C_{13}H_{23}NO$: C, 74.59; H, 11.07; N, 6.69. Found: C, 74.70; H, 11.18; N, 6.66.

Following the procedure of Preparation 12 the following amine hydrochlorides were converted to the corresponding acetamides.

Cycloheptylcyclohexylamine hydrochloride to N-cycloheptyl-N-cyclohexylacetamide, M.P. 48–49° C.;

*Analysis.*—Calcd. for $C_{15}H_{27}NO$: C, 75.89; H, 11.47; N, 5.90. Found: C, 75.92; H, 11.46; N, 5.90.

Cyclohexylcyclooctylamine hydrochloride to N-cyclohexyl-N-cyclooctylacetamide as an oil. The infrared spectrum was consistent with the structure.

Cyclohexylcyclododecylamine hydrochloride to N-cyclohexyl-N-cyclododecylacetamide, M.P. 93–94° C.;

*Analysis.*—Calcd. for $C_{20}H_{37}NO$: C, 78.11; H, 12.13; N, 4.56. Found: C, 77.95; H, 12.14; N, 4.50.

Dicycloheptylamine hydrochloride to N,N-dicycloheptylacetamide, M.P. 63–64° C.;

*Analysis.*—Calcd. for $C_{16}H_{29}NO$: C, 76.44; H, 11.63; N, 5.57. Found: C, 76.19; H, 11.67; N, 5.75.

In the same manner other N,N-dicycloalkylacetamide starting materials can be prepared from the appropriate dicycloalkylamine hydrochloride in accordance with the procedure of Preparation 12 for example, the following conversions are representative:

N - cycloheptyl-N-cyclopentadecylacetamide from cycloheptylcyclopentadecylamine hydrochloride;
N-cyclodecyl-N-cyclododecylacetamide from cyclodecylclododecylamine hydrochloride;
N-cyclopentadecyl-N-cyclopentylacetamide from cyclopentadecylcyclopentylamine hydrochloride,
and the like.

Other N,N-dicycloalkylamide starting materials can be prepared in accordance with the general procedures of Preparation 12 substituting the appropriate monobasic organic carboxylic acid anhydride or acid halide, for example, those of the acids previously listed, in place of acetic anhydride to obtain the corresponding dicycloalkylamides. The following products are representative:

N-cyclohexyl-N-cyclopentylpropionamide,
N-cycloheptyl-N-cyclohexylbutyramide,
N-cyclohexyl-N-cyclooctylisovaleramide,
N-cyclohexyl-N-cyclododecyltrimethylacetamide,
N,N-dicycloheptylchloroacetamide,
N-cycloheptyl-N-cyclopentadecyl-β-cyclopentylpropionamide,
N-cyclododecyl-N-cyclododecylbenzamide,
N-cyclopentadecyl-N-cyclopentylphenylacetamide,
and the like.

PREPARATION 13

N-cyclohexyl-p-toluenesulfonamide

Shaking a mixture of 9.92 g. of cyclohexylamine, 18.0 g. of p-toluenesulfonyl chloride, and 100 ml. of 2 N sodium hydroxide and crystallizing the crude product from aqueous acetone gave 21.20 g. of N-cyclohexyl-p-toluenesulfonamide, M.P. 86–87° C.

*Analysis.*—Calcd. for $C_{13}H_{19}NO_2S$: C, 61.62; H, 7.56; N, 5.53; S, 12.66. Found: C, 61.47; H, 7.79; N, 5.32; S, 12.89.

PREPARATION 14

N-cycloheptyl-p-toluenesulfonamide

Shaking a mixture of 25.0 ml. of cycloheptylamine, 40.0 g. of p-toluenesulfonylchloride, and 200 ml. of 2 N sodium hydroxide solution and crystallizing the crude product from methanol-water gave 48.05 g. of N-cycloheptyl-p-toluenesulfonamide, M.P. 63–64° C.

*Analysis.*—Calcd. for $C_{14}H_{21}NO_2S$: C, 62.88; H, 7.99; N, 5.24; S, 11.99. Found: C, 62.46; H, 8.04; N, 5.10; S, 12.21.

PREPARATION 15

N-cyclooctyl-p-toluenesulfonamide

Shaking 12.7 g. of cyclooctylamine, 18.0 g. of p-toluenesulfonyl chloride, and 100 ml. of 2 N sodium hydroxide and crystallizing the crude product from aqueous methanol there was obtained 23.6 g. of N-cyclooctyl-p-toluenesulfonamide, M.P. 66–67° C.

*Analysis.*—Calcd. for $C_{15}H_{23}NO_2S$: N, 4.98; S, 11.38. Found: N, 4.68; S, 11.49.

PREPARATION 16

N-cycloalkyl and N,N-dicycloalkylarylsulfonamides

Substituting benzene sulfonyl chloride for p-toluenesulfonyl chloride in Preparations 4–6 is productive of N-cyclohexylbenzenesulfonamide, N-cycloheptylbenzenesulfonamide, and N-cyclooctylbenzenesulfonamide, respectively.

Other N-cycloalkylarylsulfonamide and N,N-dicycloalkylarylsulfonamide starting materials are prepared by reacting the appropriate cycloalkylamine or dicycloalkylamine with the appropriate arylsulfonylhalide in accordance with the procedures of Preparations 13–15. The following conversions are representative:

cyclononylamine to N-cyclononylbenzene sulfonamide,
cyclodecylamine to N-cyclodecylamine-p-toluenesulfonamide,
cyclotridecylamine to N-cyclotridecylbenzenesulfonamide,
cyclopentadecylamine to N-cyclopentadecyl-p-toluenesulfonamide,
dicyclohexylamine to N,N-dicyclohexyl-p-toluenesulfonamide,
cyclohexylcyclopentylamine to N-cyclohexyl-N-cyclopentylbenzenesulfonamide,
cyclopentylamine to N-cyclopentyl-p-toluenesulfonamide, and
cycloheptylcyclopentadecylamine to N-cycloheptyl-N-cyclopentadecylbenzenesulfonamide.

PREPARATION 17

Benzyl cyclohexylcarbamate

A solution of 9.92 g. of cyclohexylamine in 50 ml. of pyridine was stirred and chilled to −15° C. Fifteen milliliters of carbobenzoxy chloride was added slowly over a period of about 5 minutes, and the mixture was stirred at −15° C. for 30 minutes and finally at 25° C. for 15 minutes. The mixture was diluted with 100 ml. of water, stirred, and allowed to stand for 60 hours. The resulting colid was recovered by filtration and washed with water. This material was stirred with 75 ml. of acetone and filtered. The filtrate was boiled and diluted with water to the turbidity point and then chilled to give 7.04 g. of benzyl cyclohexylcarbamate, M.P. 90–91° C.

*Analysis.*—Calcd. for $C_{14}H_{19}NO_2$: C, 72.07; H, 8.21; N, 6.01. Found: C, 71.77; H, 8.05; N, 6.35.

PREPARATION 18

Benzyl cycloheptylcarbamate

A solution of 33.9 g. of cycloheptylamine in 150 ml. of pyridine was chilled and stirred in a bath at −15° C. and 56.3 g. of carbobenzoxy chloride was added over a period of about 5 minutes. The mixture was stirred at −15° C. for about 15 minutes, at 25° C. for about 30 minutes and then diluted with 350 ml. of water. Concentrated hydrochloric acid (100 ml.) was added and the mixture was extracted with ether. The ether extract was filtered, washed with dilute hydrochloric acid, water, 5% sodium bicarbonate solution, water, and dried over anhydrous sodium sulfate. The solvent was removed, and the residue was dissolved in 150 ml. of methylene chloride and chromatographed on Florisil synthetic magnesium silicate (hereinafter referred to as Florisil) and eluted with Skellysolve B containing increasing proportions of acetone from 0 to 30%. The appropriate fractions (determined by I.R.) gave 27.36 g. of benzylcycloheptylcarbamate. Recrystallization from Skellysolve B gave 19.00 g. of benzyl cycloheptylcarbamate, M.P. 56° C.

*Analysis.*—Calcd. for $C_{15}H_{21}NO_2$: C, 72.84; H, 8.56; N, 5.66. Found: C, 73.43; H, 8.52; N, 5.50.

PREPARATION 19

Benzyl cyclooctylcarbamate

Following the procedure of Preparation 17, a solution of 12.06 g. of cyclooctylamine in 50 ml. of pyridine was treated with 17 ml. of carbobenzoxy chloride to give 7.45 g. of benzyl cyclooctylcarbamate as an oil, identified by infrared analysis.

In the same manner, other cycloalkylamines and dicycloalkylamines are converted to their carbamates following the procedure of Preparations 17 and 18. The following conversions are representative:

cyclononylamine to benzyl cyclononylcarbamate,
cyclodecylamine to benzyl cyclodecylcarbamate,
cyclododecylamine to benzyl cyclododecylcarbamate,
cyclopentadecylamine to benzyl cyclopentadecylcarbamate,
dicyclohexylamine to benzyl dicyclohexylcarbamate, and
cyclohexylcyclopentylamine to benzyl cyclohexylcyclopentylcarbamate.

PREPARATION 20

1-(p-tolylsulfonyl)-3-cyclododecylurea

A mixture of 27.8 g. of methyl p-tolylsulfonylcarbamate and 18.3 g. of cyclododecylamine was heated at 135° C. After 15 minutes of liquefaction and frothing the mixture became solid. Heating was continued for 15 minutes, and the material was dissolved in boiling ethanol and allowed to crystallize, giving 26.2 g. of 1-(p-tolylsulfonyl)-3-cyclododecylurea, M.P. 177–178° C. which after recrystallization from 95% ethanol melted at 178.5–180° C.

*Analysis.*—Calcd. for $C_{20}H_{32}N_2O_3S$: C, 63.13; H, 8.48; N, 7.36; S, 8.41. Found: C, 63.80; H, 8.61; N, 7.29; S, 8.43.

EXAMPLE 1

Bioconversion of cyclododecanol

A medium was prepared of 20 g. of cornsteep liquor (60% solids) and 10 g. of commercial dextrose, diluted to 1 l. and adjusted to a pH of 4.85. 1 ml. of lard oil was added as an antifoam preventive. 100 ml. of this sterilized medium was inoculated with a 72-hour vegetative growth of one of the organisms listed in Table IV, below, and incubated for 24 hours at a temperature of about 28° C. using a rate of aeration of 0.5 l. per minute at 300 r.p.m. After 24 to 48 hours, or when a moderate to heavy growth of mycelium was apparent by visual observation, of agitation, a solution of 20 mg. of cyclododecanol in 1 ml. of N,N-dimethylformamide was added to the inoculated medium. After an additional 72-hour period of incubation, the beer and mycelium (the whole culture) was extracted 4 times with a volume of methylene chloride equal to about one-fourth the volume of the whole culture. The combined extracts were washed with one-fourth volume of distilled water and the solvent was removed by distillation to give a crude residue. The residue thus obtained was assayed by paper strip chromatography and found to consist of mixtures of dioxygenated cyclododecanes in the several oxidation states, namely, cyclododecane-1,5-dione,          cyclododecane-1,7-diol,
cyclododecane-1,6-dione,          5-hydroxycyclododecanone,
cyclododecane-1,7-dione,          6-hydroxycyclododecanone,
cyclododecane-1,5-diol,           and
cyclododecane-1,6-diol,           7-hydroxycyclododecanone.

The paper strip chromatography was carried out using the Bush B-3 system, in which the sheet is equilibrated overnight at 34° C. in the vapor from a mixed solvent composed of 667 ml. of Skellysolve C hexanes, 333 ml. of benzene, 800 ml. of methanol and 200 ml. of water, and developed with the nonpolar phase. The diones and hydroxy ketones are detected by spraying the developed sheet with 2,4-dinitrophenylhydrazine reagent, and the diols and hydroxyketones are detected by dipping the developed sheet in phosphomolybdic reagent [L. M. Reineke, Anal. Chem. 28, 1853–58 (1952)].

The crude residue in each of the experiments was dissolved in 1 ml. of acetone and oxidized at room temperature by the addition of a visible excess of Jones chromic acid reagent. The excess oxidant was destroyed by the addition of a few drops of isopropyl alcohol and the mixture evaporated to dryness. Water (2 ml.) was added, and the products were extracted with 2 ml. of methylene chloride. The extract was evaporated to dryness and the residue subjected to paper chromatography by the method described above and to gas-liquid (vapor phase) chromatography. Cyclododecane-1,5-dione, cyclododecane-1,6-dione and cyclododecane-1,7-dione were identified as constituents of the extract.

The gas-liquid chromatography was carried out by injecting 0.02 ml. of a 1:1 ethylene dichloride-methanol solution containing 1 mg. of sample into an injection port heated at 263° C. The column was packed with 5% of a methyl silicone polymer (General Electric SE·30) on 30–60 mesh fluorinated polymer (Haloport F). The temperature was programmed at 6.4° C./minute from 90° C. to 275° C. at a helium flow rate of 35–40 ml. per minute. The detection block temperature was 265° C.

The above experiments were repeated substituting in place of the corn steep liquor medium 100 ml. of a medium prepared of 50 g. of dried malt extract and 5 g. of commercial peptone diluted to 1 liter, the normal pH was about 6.5. Essentially identical results were obtained differing only in the relative amounts of each of the position isomeric cyclododecanediones formed.

Likewise the following microorganisms can be used in place of those tabulated below.

*Mucor microsporous*, ATCC 8541
*Rhizopus nigricans*, ATCC 6227b
*Curvularia pallescens*, NRRL 2381
*Aspergillus ochraceus*, NRRL 405-260-4718
*Aspergillus niger*, ATCC 8740
*Aspergillus candidus*, ATCC 1002
*Aspergillus oryzae*, ATCC 10196
*Aspergillus wentii*, ATCC 10583
*Penicillium camemberti*, ATCC 6985
*Penicillium brevi-compactum*, ATCC 9056
*Penicillium citrinum*, ATCC 10105
*Penicillium claviformae*, ATCC 10426
*Penicillium decumbens*, ATCC 10436
*Penicillium griseo-fulvum*, ATCC 11885
*Penicillium ochraceum*, ATCC 10474
*Penicillium rugulosum*, ATCC 10128
*Mycobacterium rhodochrous*, ATCC 999
*Micrococcus rubens*, ATCC 186
*Nocardia restrictus*, CBS
*Pseudomonas aeruginosa*, ATCC 8689 and the like.

TABLE IV

*Absidia glauca*, ATCC 7852a, 7852b
*Cunninghamella blakesleeana*, ATCC 8688a
*Mucor griseocyanus*, ATCC 1207a
*Rhizopus arrhizus*, ATCC 11145
*Byssochlamys fulva*, CBS
*Cephaloascus subcordata*, CBS
*Calonectria decora*, CBS
*Claviceps purpurea*, CBS
*Cordyceps miliaria*, CBS
*Creonectria rubricarpa*, ATCC 9551
*Giberalla saubinettii*, CBS
*Hypocrea rosellus*, CBS
*Loramyces junicola*, CBS
*Nectria cosmariospora*, CBS
*Adelopus balsamicola*, CBS
*Chaetomidium barbatum*, CBS
*Clathrospora perminada*, CBS
*Didymella applanata*, CBS
*Endothia parasitica*, CBS
*Glomerella fusariodes*, CBS
*Glomerella lycopersici*, CBS
*Guignardia bidwellii*, ATCC 9559
*Mycosphaerella ligulicola*, CBS
*Physalospora tucumanensis*, CBS
*Xylaria vaporaria*, CBS
*Clithris quercina*, CBS
*Allophylarea lythri*, ATCC 6492
*Dermea bicolor*, CBS
*Dermea libocedri*, CBS
*Morchella esculenta*, CBS
*Patella abundens*, CBS
*Pyronema confluens*, CBS
*Cintractia sorghi*, CBS
*Aleurodiscus amorphus*, CBS
*Alnicola escharoides*, CBS
*Boletus lutens*, CBS
*Boletus species*, Peck Strain 168 Ohio State
*Clavaria cristata*, CBS
*Clavaria ligula*, CBS
*Clitocybe tabescens*, CBS
*Collypia velutipes*, CBS
*Coniophora cerebella*, CBS
*Coprinus narcoticus*, CBS
*Corticium microsclerotia*, NRRL 2705
*Corticium sasakii*, NRRL 2727
*Deconia coprophilia*, CBS
*Entaloma sericeum*, CBS
*Fomes applanata*, CBS
*Hygrophorus protensis*, CBS
*Lentinellus ursinus*, ATCC 11779
*Panacolus campestris*, New York Botanical, Garden St. L. 371
*Paxillus acheruntius*, CBS
*Peniophora macrospora*, CBS
*Pholiota adiposa*, CBS
*Pholiota aegerita*, CBS
*Plicatura faginea*, CBS
*Polyporus hirsutus*, CBS
*Poria ambigua*, ATCC 9408
*Psalliota campestris*, CBS
*Schizophyllum commune*, CBS
*Sparassis crispa*, CBS
*Stereum fasciatum*, CBS
*Stereum rameale*, CBS
*Tricholoma inamoenum*, CBS
*Trametes hispida*, CBS
*Lycoperdon gemmatum*, CBS
*Sphaerobolus stellatus*, NRRL 2922
*Crucibulum vulgare*, CBS
*Cyathus olla*, CBS
*Cyathus poeppigi*, CBS
*Cyathus striatus*, CBS
*Ascochyta linicola*, NRRL 2923
*Coniothyrium tuckellii*, ATCC 11349
*Dendrophroma faginca*, CBS
*Diplodia natalensis*, ATCC 9055
*Diplodina coloradensis*, CBS
*Dendrophroma pleurospora*, CBS
*Polypopeus purpurius*, CBS
*Sphaeropsis visci*
*Endomosporium maculatum*, CBS
*Pestalotia guepini*, ATCC 11543
*Septomyxa affinis*, ATCC 6737
*Steganosporium piriforme*, CBS
*Aspergillus nidulans*, ATCC 11267
*Tricothecium roseum*, ATCC 8685
*Curvularia lunata*, ATCC 12017
*Cylindrocarpon didymum*, CBS
*Cylindrocarpon album*, CBS
*Helminthosporium carbonum*, ATCC 9627
*Penicillium atrovenetum*, CBS
*Penicillium patulum*, ATCC 9260
*Sepedonium ampullosporum*, NRRL 2877
*Sporotrichum bombycinum*, ATCC 7137
*Sporotrichum epigaeum*, ATCC 7145
*Sporotrichum sulfurescens*, ATCC 7159
*Papulospora polyspora*, CBS
*Rhizoctonia solani*, ATCC 10159

EXAMPLE 2

*Bioconversion of cyclododecanol*

A medium was prepared of 50 g. of dried malt extract and 5 g. of commercial peptone, diluted to 1 l., normal pH about 6.5. 1 ml. of lard oil was added as an antifoam preventive. 100 ml. of this sterilized medium was inoculated with a 72-hour vegetative growth of *Cylindrocarpon radicicola*, A.T.C.C. 11011, and incubated for 24 hours at a temperature of about 28° C. using a rate of aeration of 0.5 l. per minute at 300 r.p.m. After 24 to 48 hours, or when a moderate to heavy growth of mycelium was apparent by visual observation, of agitation, a solution of 20 mg. of cyclododecanol in 1 ml. of N,N-dimethylformamide was added to the inoculated medium. After an additional 72-hour period of incubation, the beer and mycelium (the whole culture) was extracted 4 times with a volume of methylene chloride equal to about one-fourth the volume of the whole culture. The combined extracts were washed with one-fourth volume of distilled water and the solvent was removed by distillation to give a crude residue. The residue thus obtained was assayed by paper strip chromatography by the process described in Example 1 and found to consist of mixtures of dioxygenated cyclododecanes in the several oxidation states, namely, cyclododecane-1,5-dione,        cyclododecane-1,7-diol,
cyclododecane-1,6-dione,        5-hydroxycyclododecanone,
cyclododecane-1,7-dione,        6-hydroxycyclododecanone,
cyclododecane-1,5-diol,         and
cyclododecane-1,6-diol,         7-hydroxycyclododecanone.

The crude residue thus obtained was dissolved in 1 ml. of acetone and oxidized at room temperature by the addition of a visible excess of Jones chromic acid reagent. The excess oxidant was destroyed by the addition of a few drops of isopropyl alcohol and the mixture evaporated to dryness. Water (2 ml.) was added, and the products were extracted with 2 ml. of methylene chloride. The extract was evaporated to dryness and the residue subjected to paper chromatography and gas-liquid (vapor phase) chromatography in accordance with the processes described in Example 1. Cyclododecane-1,5-dione, cyclododecane-1,6-dione and cyclododecane-1,7-dione were found to be present.

Example 3

Bioconversion of cyclododecanol

A medium was prepared of 50 g. of dried malt extract and 5 g. of commercial peptone, diluted to 1 l., normal pH about 6.5. 1 ml. of lard oil was added as an antifoam preventive. 100 ml. of this sterilized medium was inoculated with a 72-hour vegetative growth of *Chaetomium globosum*, A.T.C.C. 6205, and incubated for 24 hours at a temperature of about 28° C. using a rate of aeration of 0.5 l. per minute at 300 r.p.m. After 24 to 48 hours, or when a moderate to heavy growth of mycelium was apparent by visual observation, of agitation, a solution of 20 mg. of cyclododecanol in 1 ml. of N,N-dimethylformamide was added to the inoculated medium. After an additional 72-hour period of incubation, the beer and mycelium (the whole culture) was extracted 4 times with a volume of methylene chloride equal to about one-fourth the volume of the whole culture. The combined extracts were washed with one-fourth volume of distilled water and the solvent was removed by distillation to give a crude residue. The residue thus obtained was assayed by paper strip chromatography by the process described in Example 1 and found to consist of mixtures of dioxygenated cyclododecanes in the several oxidation states, namely, cyclododecane-1,5-dione,        cyclododecane-1,7-diol,
cyclododecane-1,6-dione,        5-hydroxycyclododecanone,
cyclododecane-1,7-dione,        6-hydroxycyclododecanone,
cyclododecane-1,5-diol,         and
cyclododecane-1,6-diol,         7-hydroxycyclododecanone.

The crude residue thus obtained was dissolved in 1 ml. of acetone and oxidized at room temperature by the addition of a visible excess of Jones chromic acid reagent. The excess oxidant was destroyed by the addition of a few drops of isopropyl alcohol and the mixture evaporated to dryness. Water (2 ml.) was added, and the products were extracted with 2 ml. of methylene chloride. The extract was evaporated to dryness and the residue subjected to paper chromatography and gas-liquid (vapor phase) chromatography in accordance with the processes described in Example 1. Cyclododecane-1,5-dione, cyclododecane-1,6-dione and cyclododecane-1,7-dione were found to be present.

Example 4

Bioconversion of cyclododecanol

A medium was prepared of 20 g. of cornsteep liquor (60 percent solids) and 10 g. of commercial dextrose, diluted to 1 l. and adjusted to a pH of 4.85. 1 ml. of lard oil was added as an antifoam preventive. 100 ml. of this sterilized medium was inoculated with a 72-hour vegetative growth of *Streptomyces argenteolus*, ATCC 11009, and incubated for 24 hrs. at a temperature of about 28° C. using a rate of aeration of 0.5 l. per minute at 300 r.p.m. After 24 to 48 hours, or when a moderate to heavy growth of mycelium was apparent by visual observation, of agitation, a solution of 20 mg. of cyclododecanol in 1 ml. of N,N-dimethylformamide was added to the inoculated medium. After an additional 72-hour period of incubation, the beer and mycelium (the whole culture) was extracted 4 times with a volume of methylene chloride equal to about one-fourth the volume of the whole culture. The combined extracts were washed with one-fourth volume of distilled water and the solvent was removed by distillation to give a crude residue. The residue thus obtained was assayed by paper strip chromatography by the process described in Example 1 and found to consist of mixtures of dioxygenated cyclododecanes in the several oxidation states, namely, cyclododecane-1,5-dione,        cyclododecane-1,7-diol,
cyclododecane-1,6-dione,        5-hydroxycyclododecanone,
cyclododecane-1,7-dione,        6-hydroxycyclododecanone,
cyclododecane-1,5-diol,         and
cyclododecane-1,6-diol,         7-hydroxycyclododecanone.

The crude residue thus obtained was dissolved in 1 ml. of acetone and oxidized at room temperature by the addition of a visible excess of Jones chromic acid reagent. The excess oxidant was destroyed by the addition of a few drops of isopropyl alcohol and the mixture evaporated to dryness. Water (2 ml.) was added, and the products were extracted with 2 ml. of methylene chloride. The extract was evaporated to dryness and the residue subjected to paper chromatography and gas-liquid (vapor phase) chromatography in accordance with the processes described in Example 1. Cyclododecane-1,5-dione, cyclododecane-1,6-dione and cyclododecane-1,7-dione were found to be present.

Example 5

Bioconversion of cyclododecanol

A medium was prepared of 20 g. of cornsteep liquor (60 percent solids) and 10 g. of commercial dextrose, diluted to 1 l. and adjusted to a pH of 4.85. 1 ml. of lard oil was added as an antifoam preventive. 100 ml. of this sterilized medium was inoculated with a 72-hour vegetative growth of *Pleurotus paseckerianus*, A.T.C.C. 9416, and incubated for 24 hours at a temperature of about 28° C. using a rate of reaation of 0.5 l. per minute at 300 r.p.m. After 24 to 48 hours, or when a moderate to heavy growth of mycelium was apparent by visual observation, of agitation, a solution of 20 mg. of cyclododecanol in 1 ml. of N,N-dimethylformamide was added to the inoculated medium. After an additional 72-hour period of incubation, the beer and mycelium (the whole culture) was extracted 4 times with a volume of methylene chloride equal to about one-fourth the volume of the whole culture. The combined extracts were washed with one-fourth volume of distilled water and the solvent was removed by distillation to give a crude residue. The residue thus obtained was assayed by paper strip chromatography by the process described in Example 1 and found to consist of mixtures of dioxygenated cyclododecanes in the several oxidation states, namely, cyclododecane-1,5-dione,
cyclododecane-1,6-dione,
cyclododecane-1,7-dione,
cyclododecane-1,5-diol,
cyclododecane-1,6-diol,
cyclododecane-1,7-diol,
5-hydroxycyclododecanone,
6-hydroxycyclododecanone, and
7-hydroxycyclododecanone.

The crude residue thus obtained was dissolved in 1 ml. of acetone and oxidized at room temperature by the addition of a visible excess of Jones chromic acid reagent. The excess oxidant was destroyed by the addition of a few drops of isopropyl alcohol and the mixture evaporated to dryness. Water (2 ml.) was added, and the products were extracted with 2 ml. of methylene chloride. The extract was evaporated to dryness and the residue subjected to paper chromatography and gas-liquid (vapor phase) chromatography in accordance with the processes described in Example 1. Cyclododecane-1,5-dione, cyclododecane-1,6-dione and cyclododecane-1,7-dione were found to be present.

EXAMPLE 6

*Bioconversion of cyclododecanol*

A medium was prepared of 20 g. of cornsteep liquor and 10 g. of commercial dextrose, diluted to 1 l. and adjusted to a pH of 4.85. 1 ml. of lard oil was added as an antifoam preventive. 10 l. of this sterilized medium was inoculated with a 72-hour vegetative growth of *Sporotrichum sulfurescens* A.T.C.C. 7159, and incubated for 24 hours at a temperature of about 28° C. using a rate of aeration of 0.5 l. per minute at 300 r.p.m. After 24 hours of agitation, a solution of 2.0 g. of cyclododecanol in 20 ml. of N,N-dimethylformamide was added to the inoculated medium. After an additional 72-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing cyclododecane-1,5-dione, cyclododecane-1,6-dione, cyclododecane-1,7-dione, 5-hydroxycyclododecanone, 6-hydroxycyclododecan, 7-hydroxycyclododecanone, cyclododecane-1,5-diol, cyclododecane-1,6-diol and cyclododecan-1,7-diol.

Chromatography of this residue thus obtained over a column of synthetic magnesium silicate (Florisil) (3.8 x 35 cm.) packed in Skellysolve B hexanes, taking 335 ml. eluate fractions (unless otherwise noted) gave the following result:

| Fraction | Eluting Solvent | Residue Wt., mg. |
| --- | --- | --- |
| 1 | Skellysolve B hexanes (1 liter) | 25 |
| 2 | 5% Acetone-Skellysolve B hexanes | 2 |
| 3 | 5% Acetone-Skellysolve B hexanes | 26 |
| 4 | 5% Acetone-Skellysolve B hexanes | 118 |
| 5 | 10% Acetone-Skellysolve B hexanes | 68 |
| 6 | 10% Acetone-Skellysolve B hexanes | 70 |
| 7 | 10% Acetone-Skellysolve B hexanes | 260 |
| 8 | 10% Acetone-Skellysolve B hexanes | 348 |
| 9 | 10% Acetone-Skellysolve B hexanes | 169 |
| 10 | 10% Acetone-Skellysolve B hexanes | 60 |
| 11 | 25% Acetone-Skellysolve B hexanes | 19 |
| 12 | 25% Acetone-Skellysolve B hexanes | 54 |
| 13 | 25% Acetone-Skellysolve B hexanes | 66 |
| 14 | 25% Acetone-Skellysolve B hexanes | 41 |
| 15 | 25% Acetone-Skellysolve B hexanes | 23 |
| 16 | 25% Acetone-Skellysolve B hexanes | 18 |
| 17 | Acetone | 56 |
| 18 | Acetone | 87 |
| 19 | Acetone | 13 |

Fraction 8 was recrystallized to give 0.14 g. of a mixture of 6-hydroxycyclododecanone and 7-hydroxycyclododecanone, of melting point 66–67°. The infrared spectrum showed absorption bands corresponding to the presence of hydroxyl and carbonyl functions in this material. The analytical sample crystallized from Skellysolve B hexanes: M.P. 68–69°.

*Analysis.*—Calcd. for $C_{12}H_{22}O_2$: C, 72.68; H, 11.18. Found: C, 73.00; H, 11.12.

Oxidation of the hydroxyketone mixture thus obtained in acetone with excess 2.67 M aqueous chromic acid (Jones reagent: prepared by dissolving 26.72 g. of chromium trioxide in 23.0 ml. of concentrated sulfuric acid and 100 ml. of water) gave a crystalline diketone mixture, sublimed at reduced pressure to give a mixture of 1,6- and 1,7-cyclododecanediones, M.P. 63–64°.

Fractions 4 and 5 from the above chromatogram contained the cyclododecanedione mixture, containing cyclododecane-1,5-dione, cyclododecane-1,6-dione and cyclododecane-1,7-dione, from which, by chromatography over a column of Florisil packed in Skellysolve B hexanes, the isomeric diones can be obtained separately in the manner described in the following examples.

In the same manner the other microorganisms named in Examples 1, 2, 3, 4 and 5, can be substituted in place of *Sporotrichum sulfurescens* to give the same products, differing only in the relative amounts of the position isomers produced.

EXAMPLE 7

*Bioconversion of cyclododecanol*

A medium was prepared of 20 g. of cornsteep liquor (60% solids) and 10 g. of commercial dextrose, diluted to 1 l. and adjusted to a pH of 4.85. 1 ml. of lard oil was added as an antifoam preventive. 100 l. of this sterilized medium was inoculated with a 72-hour vegetative growth of *Sporotrichum sulfurescens* A.T.C.C. 7159, and incubated for 24 hours at a temperature of about 25° C. using a rate of aeration of 0.5 l. per minute at 300 r.p.m. After 24 hours of agitation, a solution of 20.0 g. of cyclododecanol in 200 ml. of N,N-dimethylformamide was added to the inoculated medium. After an additional 72-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing the same bioconversion products listed in Example 6 above.

This crude residue was then dissolved in 100 ml. of acetone and oxidized with excess chromic acid (Jones reagent) (about 30 ml.) at 35–40° C. The reaction mixture was stirred for about 10 minutes and then the excess chromic acid was destroyed by adding 10 ml. of isopropanol. The reaction mixture was then diluted with 250 ml. of water and extracted with three 150 ml. portions of methylene chloride and then with four 100 ml. portions of methylene chloride. The combined extracts were washed with 150 ml. of water, dried over anhydrous sodium sulfate and the solvent removed by distillation under reduced pressure to give about 20 g. of a semi-crystalline residue containing cyclododecane-1,5-dione, cyclododecane-1,6-dione and cyclododecane-1,7-dione.

The residue thus obtained was dissolved in benzene and chromatographed over a 7.5 x 35 cm. column of synthetic magnesium silicate (Florisil). Elution was with 2 liter portions of solvent as follows:

| Fraction | Solvent | Residue Wt., mg. |
|---|---|---|
| 1 | Skellysolve B hexanes | 26 |
| 2 | Skellysolve B hexanes | 0 |
| 3 | 2% Acetone-Skellysolve B hexanes | 1 |
| 4 | 2% Acetone-Skellysolve B hexanes | 2,853 |
| 5 | 5% Acetone-Skellysolve B hexanes | 5,149 |
| 6 | 5% Acetone-Skellysolve B hexanes | 1,908 |
| 7 | 5% Acetone-Skellysolve B hexanes | 2,008 |
| 8 | 10% Acetone-Skellysolve B hexanes | 2,306 |
| 9 | 10% Acetone-Skellysolve B hexanes | 800 |
| 10 | Acetone | 3,443 |

Paper chromatographic analysis of fractions 4, 5, 6, 7, 8, and 10 showed the following approximate compositions, expressed as percentages of total sample applied to the chromatograms.

| Fraction | 1,5-Dione | 1,6-Dione | 1,7-Dione |
|---|---|---|---|
| 4 | 22.5 | 45 | 0 |
| 5 | 10 | 45 | 0 |
| 6 | 0 | 45 | 16 |
| 7 | 0 | 16 | 45 |
| 8 | 0 | 4 | 45 |
| 10 | 0 | 0 | 0 |

Fraction 4 was rechromatographed (see below). Fractions 7 to 9 inclusive were combined and recrystallized from acetone-Skellysolve B hexanes to give 2.32 g. of cyclododecane-1,7-dione, M.P. 132–135°. Further recrystallization of this substance from the same solvent system afforded an analytical sample of cyclododecane-1,7-dione, M.P. 134–136°.

*Analysis.*—Calcd. for $C_{12}H_{20}O_2$: C, 73.43; H, 10.27. Found: C, 73.66; H, 9.99.

Fraction 4 (see above) was rechromatographed on a 3.8 x 35 cm. column of Florisil, eluting with 335 ml. fractions, except as noted:

| Fraction | Solvent | Residue Wt., mg. |
|---|---|---|
| 1 | Skellysolve B hexanes (1 l.) | 0 |
| 2 | 1% Acetone-Skellysolve B hexanes | 11 |
| 3 | 1% Acetone-Skellysolve B hexanes | 14 |
| 4 | 1% Acetone-Skellysolve B hexanes | 232 |
| 5 | 1% Acetone-Skellysolve B hexanes | 659 |
| 6 | 1% Acetone-Skellysolve B hexanes | 530 |
| 7 | 1% Acetone-Skellysolve B hexanes | 355 |
| 8 | 2% Acetone-Skellysolve B hexanes | 266 |
| 9 | 2% Acetone-Skellysolve B hexanes | 262 |
| 10 | 2% Acetone-Skellysolve B hexanes | 139 |
| 11 | 2% Acetone-Skellysolve B hexanes | 46 |
| 12 | 2% Acetone-Skellysolve B hexanes | 23 |
| 13 | 2% Acetone-Skellysolve B hexanes | 0 |

Fractions 4, 5, and 6 of this chromatogram and fraction 5 of the earlier chromatogram were rechromatographed over alumina to obtain cyclododecane-1,5-dione.

Illustrative of this process is the chromatogram of fraction 5 on 50 g. of Merck Reagent alumina. Elution was effected with 13 fractions of 1% acetone-Skellysolve B hexanes totalling 500 ml. Fractions 4–12 were crystalline solids having melting points as follows: fraction 4, 59–62°; fraction 5, 59–63°; fraction 6, 57–58°; fraction 7, 56–62°; fraction 8, 67–75°; and fraction 11, 91–92°. Fraction 4 appeared to be mainly one component, the 1,5-dione, with later fractions containing increasing amounts of the 1,6-dione. Fractions 4–7, totalling 0.224 g., were combined for rechromatography on 25 g. of Merck alumina. Elution was effected with 0.5% acetone-Skellysolve B hexanes in fractions 1–15, totalling 100 ml. of eluting solvent, followed by elution with 1% acetone-Skellysolve B hexanes in fractions 11–21, totalling 250 ml. of eluting solvent. From this chromatogram fractions 1–6, all of which melted below 60° and which totalled 110 mg., were combined and crystallized from hexane to give 50 mg. of cyclododecane-1,5-dione, melting point 64–65°.

*Analysis.*—Calcd. for $C_{12}H_2O_2$: C, 73.42; H, 10.27. Found: C, 73.91; H, 10.19.

In the same manner the other microorganisms named in Examples 1, 2, 3, 4, and 5 can be substituted in place of *Sporotrichum sulfurescens* to give the same products, differing only in the relative amounts of the position isomers produced.

EXAMPLE 8

*Bioconversion of cyclododecanol*

A medium was prepared of 20 g. of cornsteep liquor (60% solids) and 10 g. of commercial dextrose, diluted to 1 l. and adjusted to a pH of 4.85. 1 ml. of hard oil was added as an antifoam preventive. 125 l. of this sterilized medium was inoculated with a 72-hour vegetative growth of *Sporotrichum sulfurescens* A.T.C.C. 7159, and incubated for 24 hours at a temperature of about 28° C. using a rate of aeration of 0.51 l. per minute at 300 r.p.m. After 24 hours of agitation, a solution of 25.0 g of cyclododecanol in 250 ml. of N,N-dimethylformamide was added to the inoculated medium. After an additional 72-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing the same bioconversion products as listed in Example 6, above.

The residue thus obtained was dissolved in methylene chloride and chromatographed on a 7.5 x 35 cm. column of synthetic magnesium silicate (Florisil) packed in Skellysolve B hexanes. Elution was with 2 liter portions of solvent as follows:

| Fraction | Eluting Solvent | Residue Wt., mg. |
|---|---|---|
| 1 | Skellysolve B hexanes | 275 |
| 2 | Skellysolve B hexanes | 0 |
| 3 | 2% Acetone-Skellysolve B hexanes | 0 |
| 4 | 2% Acetone-Skellysolve B hexanes | 197 |
| 5 | 2% Acetone-Skellysolve B hexanes | 3,914 |
| 6 | 2% Acetone-Skellysolve B hexanes | 1,503 |
| 7 | 5% Acetone-Skellysolve B hexanes | 334 |
| 8 | 5% Acetone-Skellysolve B hexanes | 2,285 |
| 9 | 5% Acetone-Skellysolve B hexanes | 2,384 |
| 10 | 5% Acetone-Skellysolve B hexanes | 3,262 |
| 11 | 10% Acetone-Skellysolve B hexanes | 2,772 |
| 12 | 10% Acetone-Skellysolve B hexanes | 3,274 |
| 13 | 10% Acetone-Skellysolve B hexanes | 442 |
| 14 | 10% Acetone-Skellysolve B hexanes | 161 |

Fractions 5, 6 and 7 of this chromatogram were combined and crystallized from acetone-Skellysolve B hexanes to give 2.81 g. of cyclododecane-1,6-dione, M.P. 91–95°. For analysis a sample was recrystallized twice from acetone-Skellysolve B hexanes to give cyclododecane-1,6-dione, M.P. 94.5–95.5° C.

*Analysis.*—Calcd. for $C_{12}H_{20}O_2$: C, 73.43; H, 10.27. Found: C, 73,64; H, 9.99.

EXAMPLE 9

*Bioconversion of cyclododecanol*

A medium was prepared of 20 g. of corn steep liquor (60% solids) and 10 g. of commercial dextrose, diluted to 1 l. and adjusted to a pH of 5.0. 0.2 ml. of Dow-Corning C–120 oil was added as an antifoam preventive. 10 l. of this sterilized medium was inoculated with a 96-hour vegetative growth of *Ascochyta linicola*, NRRL 2923 and incubated for 48 hours at a temperature of about 28° C. using a rate of aeration of 0.5 l. per minute at 300 r.p.m. After 48 hours of agitation, a solution of 2.5 g. of cyclododecanol in 25 ml. of N,N-dimethylformamide was added to the inoculated medium. After an additional 48-hour period of incubation, the beer and mycelium were separated by filtration. The mycelium was washed with water and the washwater was added to the beer filtrate. The thus-obtained beer filtrate was extracted 4 times with a volume of methylene chloride equal to one-fourth of the volume of the filtrate. The combined extracts were washed with one-fourth volume of distilled water and the solvent was removed by distillation to give a crude residue containing 5-hydroxycyclododecanone, 6-hydroxycyclo-dodecanone, 7-hydroxycyclododecanone, cyclododecane-1,5-diol, cyclododecane-1,6-diol and cyclododecane-1,7-diol.

The extract residue was chromatographed over Florisil. Materials eluted by 2–5% acetone-Skellysolve B hexanes and by acetone were oxidized separately with chromic acid and analyzed paper chromatographically. No appreciable amounts of cyclododecanediones were found. Material eluted by 10% acetone-Skellysolve B hexanes was recrystallized from acetone-Skellysolve B hexanes to give 0.28 g. of cyclododecanolones, M.P. 87–90°. Oxidation of this material, as well as of the mother liquor residue, afforded mixtures of 1,6- and 1,7-cyclododecanedione, as determined by paper chromatography. Vapor phase chromatography by the method described in Example 1 also showed that cyclododecanone was present in the oxidized samples, indicating that cyclododecanol was present in the bioconversion product.

Material eluted from the Florisil column with 25% acetone-Skellysolve B hexanes was recrystallized from acetone-Skellysolve B hexanes to give 0.39 g. of 1,6- and 1,7-cyclododecanediols, M.P. 122–135°, with no carbonyl absorption in the infrared spectrum. Oxidation of this material, as well as of the mother liquor residue, gave the same results as outlined above for the cyclododecanolones determined by paper strip chromatography according to the method described in Example 1, above.

In the same manner, the other microorganisms named in Examples 1, 2, 3, 4 and 5 can be substituted in place of *Ascochyta linicola*.

Example 10

Bioconversion of cyclododecanol

A medium was prepared of 20 g. of corn steep liquor (60% solids) and 10 g. of commercial dextrose, diluted to 1 l. and adjusted to a pH of 4.95. 0.2 ml. of Dow-Corning C–120 oil was added as an antifoam preventive. 10 l. of this sterilized medium was inoculated with a 72-hour vegetative growth of *Absidia glauca* A.T.C.C. 7852a and incubated for 24 hours at a temperature of about 28° C. using a rate of aeration of 0.3 l. per minute at 300 r.p.m. After 24 hours of agitation, a solution of 2.5 g. of cyclododecanol in 25 ml. of N,N-dimethylformamide was added to the inoculated medium. After an additional 48-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing the same bioconversion products as listed in Example 6, above.

The extract residue was chromatographed over Florisil. Material eluted with 10–25% acetone-Skellysolve B hexanes was recrystallized from acetone-Skellysolve B hexanes to give 0.33 g. of 6- and 7-hydroxycyclododecanones, M.P. 67–69°. An oxidized sample, analyzed by paper strip chromatography by the method described in Example 1, showed that 1,6-cyclododecanedione and 1,7-cyclododecanedione were present in about equal amounts.

All other eluates (5%, 10% and 25–100% acetone-Skellysolve B hexanes) from the Florisil column were pooled and oxidized to a mixture of 1,6- and 1,7-cyclododecanediones contaminated with cyclododecanone (analyzed by paper strip chromatograph as above).

In the same manner, the other microorganisms named in Examples 1, 2, 3, 4 and 5 can be substituted in place of *Absidia glauca* to give the same products, differing only in the relative amounts of the position isomers produced.

Example 11

Bioconversion of cyclotridecanol

A medium was prepared of 20 g. of corn steep liquor (60% solids) and 10 g. of commercial dextrose, diluted to 1 l. and adjusted to a pH of 5.0. 1 ml. of lard oil was added as an antifoam preventive. 10 l. of this sterilized medium was inoculated with a 72-hour vegetative growth of *Sporotrichum sulfurescens* A.T.C.C. 7159, and incubated for 24 hours at a temperature of about 28° C. using a rate of aeration of 0.5 l. per minute at 300 r.p.m. After 24 hours of agitation, a solution of 2.0 of cyclotridecanol in 20 ml. of N,N-dimethylformamide was added to the inoculated medium. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing cyclotridecane-1,5-dione, cyclotridecane-1,6-dione, cyclotridecane-1,7-dione, 5-hydroxycyclotridecanone, 6-hydroxycyclotridecanone, 7-hydroxycyclotridecanone, cyclotridecane-1,5-diol, cyclotridecane-1,6-diol and cyclotridecane-1,7-diol.

The extract residue thus obtained was dissolved in 15 ml. of acetone and oxidized with excess 2.57 M chromic acid (Jones reagent) keeping the temperature between 35 and 40° C. The reaction was stirred for 10 minutes and then 2 ml. of isopropanol was added. The mixture was then extracted 3 times with 20 ml. portions of methylene chloride. The extracts were combined, washed with 20 ml. of water, dried over anhydrous sodium sulfate, and distilled under vacuum to remove the solvent to give a semi-crystalline residue containing cyclotridecane-1,5-dione, cyclotridecane-1,6-dione and cyclotridecane-1,7-dione.

The extract residue thus obtained was dissolved in benzene and chromatographed over 200 g. of synthetic magnesium silicate (Florisil). The column was eluted with thirty-four 250 ml. fractions of Skellysolve B hexanes containing increasing proportions of acetone, ranging from 0 to 6%. The product fractions were crystallized from ether-hexane to give 95 mg. of product, M.P. 88–90°. The major component of this material was cyclotridecane-1,7-dione with a smaller amount of cyclotridecane-1,6-dione and cyclotridecane-1,5-dione.

*Analysis.*—Calcd. for $C_{13}H_{22}O_2$: C, 74.24; H, 10.54. Found: C, 74.09; H, 10.24.

In the same manner, the other microorganisms named in Examples 1, 2, 3, 4 and 5 can be substituted in place of *Sporotrichum sulfurescens* to give the same products, differing only in the relative amounts of the position isomers produced.

Example 12

Bioconversion of cyclotetradecanol

A medium was prepared of 20 g. of corn steep liquor (60% solids) and 10 g. of commercial dextrose, diluted to 1 l. and adjusted to a pH of 5.0. 0.2 ml. of Dow-Corning C–120 was added as an antifoam preventive. 10 l. of this sterilized medium was inoculated with a 72-hour vegetative growth of *Sporotrichum sulfurescens* A.T.C.C. 7159, and incubated for 24 hours at a temperature of about 28° C. using a rate of aeration of 0.5 l. per minute at 300 r.p.m. After 24 hours of agitation, a solution of 2.0 g. of cyclotetradecanol in 20 ml. of N,N-dimethylformamide was added to the inoculated medium. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing cyclotetradecane-1,5-dione, cyclotetradecane-1,6-dione, cyclotetradecane - 1,7-dione, cyclotetradecane-1,5-diol, cyclotetradecane-1,6-diol, cyclotetradecane-1,7-diol, 5-hydroxycyclotetradecanone, 6-hydroxycyclotetradecanone, and 7-hydroxycyclotetradecanone.

The extract residue from the bioconversion was oxidized with excess chromic acid, extracted and freed of solvent in the same manner as described in Example 5 above, and the oxidized product containing cyclotetradecane-1,5-dione, cyclotetradecane-1,6-dione and cyclotetradecane-1,7-dione was then chromatographed in benzene over 200 g. of Florisil, eluting with thirty-four 250 ml. fractions of Skellysolve B hexanes containing increasing proportions of acetone, ranging from 0–6%. Fractions 4–6 contained 0.451 g. of cyclotetradecanone resulting from unconverted starting material. Fractions 14–20 contained 0.22 g. of crystalline product that was recrystallized from acetone-hexane to give 120 mg. of cyclotetradecane-1,6-dione containing a small amount of cyclotetradecane-1,7-dione and of cyclotetradecane-1,5-dione. The melting point of the sample was 90°.

*Analysis.*—Calcd. for $C_{14}H_{24}O_2$: C, 74.95; H, 10.78. Found: C, 75.20; H, 10.94.

In the same manner, the other microorganisms named in Examples 1, 2, 3, 4 and 5 can be substituted in place of *Sporotrichum sulfurescens* to give the same products, differing only in the relative amounts of the position isomers produced.

EXAMPLE 13

*Bioconversion of cycloundecanol*

A medium was prepared of 20 g. of corn steep liquor and 10 g. of commercial dextrose, diluted to 1 l. and adjusted to a pH of 4.85. 1 ml. of lard oil was added as an antifoam preventive. 10 l. of this sterilized medium was inoculated with a 72-hour vegetative growth of *Sporotrichum sulfurescens* A.T.C.C. 7159, and incubated for 24 hours at a temperature of about 28° C. using a rate of aeration of 0.5 l. per minute at 300 r.p.m. After 24 hours of agitation, a solution of 2.0 g. of cycloundecanol in 20 ml. of N,N-dimethylformamide was added to the inoculated medium. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing cycloundecane-1,5-dione, cycloundecane-1,6-done, 5-hydroxycycloundecanone, 6-hydroxycycloundecanone, cycloundecane-1,5-diol, and cycloundecane-1,6-diol.

The crude residue thus obtained is then dissolved in acetone and oxidized with excess chromic acid (Jones reagent). The reaction mixture is stirred for about 10 minutes and then the excess chromic acid was destroyed by adding 10 ml. of isopropanol. The reaction mixture is then diluted with about 250 ml. of water and extracted with three 150 ml. portions of methylene chloride and then with four 100 ml. portions of methylene chloride. The combined extracts are washed with 150 ml. of water, dried over anhydrous sodium sulfate and the solvent removed by distillation under reduced pressure to give a semi-crystalline residue containing cycloundecane-1,5-dione and cycloundemane-1,6-dione.

This residue is then dissolved in benzene and chromatographed over a 7.5 x 35 cm. column of synthetic magnesium silicate (Florisil) and eluted with increasing proportions (2 to 10%) of acetone in Skellysolve B hexanes.

The fractions containing cycloundecane-1,5-dione (determined by infrared analysis) are combined and distilled to remove the solvent to give a residue of cycloundecane-1,5-dione which can be purified by crystallization from acetone-hexanes to give cycloundecane-1,5-dione, a light colored crystalline solid.

The fractions containing cycloundecane-1,6-dione (determined by infrared analysis) are likewise combined and distilled to remove the solvent to give a residue of cycloundecane-1,6-dione, which can be purified by crystallization from acetone-hexanes to give cycloundecane-1,6-dione, a light colored crystalline solid.

In the same manner, the other microorganisms named in Examples 1, 2, 3, 4 and 5 can be substituted in place of *Sporotrichum sulfurescens* to give the same products, differing only in the relative amounts of the position isomers produced.

EXAMPLE 14

*Oxygenation of bicyclohexyl*

Bicyclohexyl was subjected to oxygenation by exposure to a growing culture of each of the species listed in Table V below.

*Media*

For species of the classes Phycomycetes, Ascomycetes, Basidiomycetes and Deuteromycetes the following medium was employed:

(A)

2 g. cornsteep liquor (60% solids)
1 g. commercial dextrose
100 ml. tap water
0.1 ml. lard oil adjusted to a pH of 4.8 to 5.

For species of the class Schizomycetes the following medium was employed:

(B)

0.15 g. commercial dextrose
0.15 g. yeast extract
0.5 g. peptone
0.35 g. sodium chloride
0.36 g. dipotassium phosphate
100 ml. tap water adjusted to pH 7.

The appropriate medium in a 250 ml. shake flask was sterilized and inoculated with about 5 ml. of a vegetative growth of the microorganism and incubated with shaking at a temperature of about 28° C. After 24 to 48 hours, or when a moderate to heavy growth of mycelium was apparent, a solution of 20 mg. of bicyclohexyl in 0.25 ml. of N,N-dimethylformamide was added and the incubation was continued for an additional 72-hour period. Oxygenated product was separated from the fermentation beer by extracting the whole beer 4 times with a volume of methylene chloride equal to one-fourth the volume of the whole beer. The combined extracts were washed with one-fourth volume of distilled water and the solvent was removed by distillation. The residue thus obtained was assayed by paper strip chromatography and found to consist of a mixture of isomeric dioxygenated bicyclohexyls comprised mainly of 4,4'-dihydroxybicyclohexyl with smaller amounts of one or more other bicyclohexyls hydroxylated at other positions on the rings, i.e., 4,1'-, 4,2'-, and 4,3'-dihydroxybicyclohexyls;
3,1'- and 3,2'-dihydroxybicyclohexyls;
2,1'- and 2,2'-dihydroxybicyclohexyls and
1,1'-dihydroxybicyclohexyl.

The paper strip chromatography was carried out using the Bush B–3 system, in which the sheet was equilibrated overnight at 34° C. in the vapor from a mixed solvent composed of 667 ml. of Skellysolve C (isomeric hexanes), 333 ml. of benzene, 800 ml. of methanol and 200 ml. of water, and developed with the nonpolar phase. The diols were detected by treating the developed sheet with phosphomolybdic reagent [L. M. Reineke, Anal. Chem. 28, 1853–58 (1952)].

The crude residue in each of the experiments was dissolved in 1 ml. of acetone and oxidized at room temperature by the addition of a visible excess of Jones reagent (2.67 M chromic acid reagent prepared from 26.7 g. of chromium trioxide and 23 ml. of sulfuric acid diluted to 100 ml. with water). The excess oxidant was destroyed by the addition of a few drops of isopropyl alcohol and the mixture was evaporated to dryness. Water (2 ml.) was added, and the products were extracted with 2 ml. of methylene chloride. The extract was evaporated to dryness and the residue was subjected to paper chromatography by the method described above using 2,4-dinitrophenylhydrazine reagent and to gas-liquid (vapor phase) chromatography. Dioxobicyclohexyls corresponding to the above dihydroxybicyclohexyls were identified as constituents of the extract.

The gas-liquid chromatography was carried out by injecting 0.02 ml. of 1:1 ethylene dichloride-methanol solution containing 1 mg. of sample into an injection port heated at 263° C. The column was packed with 5% of a methyl silicone polymer (General Electric SE-30) on 30–60 mesh fluorinated polymer (Haloport F). The temperature was programmed at 6.4° C./minute from 90° C. to 275° C. at a helium flow rate of 35–40 ml. per minute. The detection block temperature was 265° C.

TABLE V

*Sporotrichum sulfurescens*, ATCC 7159
*Curvularia lunata*, ATCC 12017
*Ascochyta linicola*, CBS, NRRL 2923
*Wojnowicia graminis*, CBS
*Deconica coprophila*, CBS
*Cyathus poeppigii*, CBS
*Adelopus nudus*, CBS
*Rhizopus arrhizus*, ATCC 11145
*Endothia parasitica*, ATCC 9414
*Dermea libocedri*, CBS
*Rhizoctonia solani*, ATCC 6221
*Corticium microsclerotia*, NRRL 2727
*Penicillium atrovenetrum*, UC 4014
*Gloniopsis brerisaccata*, CBS
*Gibberella saubinettii*, CBS
*Glonium stellatum*, CBS
*Trichothesium roseum*, ATCC 8685
*Calonectria decora*, CBS
*Gongronella urceolifera*, CBS
*Cunninghamella blakesleeana*, ATCC 8688a
*Diplodia natalensis*, ATCC 9055
*Keratinomyces ajelloi*, CBS
*Brachysporium oryzae*, CBS
*Gongronella lacrispora*, NRRL 2643
*Corticium sasakii*, NRRL 2705
*Streptomyces mediocidicus*, ATCC 13279
Streptomyces sp., Squibb 2337
*Streptomyces mediocidicus*, ATCC 13278
*Aerobacter aerogenes*, ATCC 8724
*Rhizopus nigricans*, ATCC 6227b(−)
Corynebacterium sp., ATCC 184
*Cladosporium resinae*, NRRL 2778
*Aspergillus niger*, ATCC 9142
*Penicillium patulum*, ATCC 10120
*Hypomyces haematococcus*, CBS
*Cylindrocarpon didymum*, CBS
*Boletus luteus*, CBS
*Alnicola escharoides*, CBS
*Dermea balsamea*, CBS
*Cenangium abietis*, CBS
Boletus sp., Peck 168 (Ohio State University)
*Cylindrocarpon radicicola*, ATCC 11011
*Glonium clavisporum*, CBS
*Hysterium angustatum*, CBS
*Hysterium insidens*, CBS
*Mytilidion tortile*, CBS
*Absidia cylindrospora*, NRRL 2796
*Absidia cylindorspora* var. *rhizamorpha*, NRRL 2815
*Absidia pseudocylindrospora*, NRRL 2770
*Circinella angarensis*, NRRL 2410
*Circinella angarensis*, NRRL 2628

In the same manner other species of microorganisms of Subphylum 2 of Phylum III can be substituted in place of those used above to give essentially identical results.

EXAMPLE 15

*Oxygenation of bicyclohexyl*

A medium was prepared of 20 g. of cornsteep liquor (60% solids), 10 g. of commercial dextrose and 1 l. of tap water and adjusted to a pH between 4.8 and 5. One ml. of lard oil was added as an antifoam preventive. Ten l. of this sterilized medium was inoculated with a 72-hour vegetative growth of *Sporotrichum sulfurescens*, ATCC 7159, and incubated at a temperature of about 28° C. using a rate of aeration of 1 l. per minute and agitation at 300 r.p.m. After 48 hours of incubation the substrate, a solution of 2.5 g. of bicyclohexyl in 25 ml. of dimethylformamide, was added to the inoculated medium and the incubation was continued for an additional 72-hour period. The beer and mycelium were then separated by filtration. The mycelium was washed with water, and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a product which was shown by paper chromatographic analysis to be a mixture of dihydroxybicyclohexyls. The product thus obtained was triturated with 70 ml. of ether to give 0.52 g. of a solid from which was isolated by recrystallization from acetone 0.36 g. of 4,4'-dihydroxybicyclohexyl, identical to the products obtained in Example 17; the infrared spectrum confirmed the structure.

EXAMPLE 16

*Oxygenation of bicyclohexyl*

The bioconversion and extraction procedures of Example 15 were repeated using 10 l. of sterilized medium of the same composition, 2 g. of bicyclohexyl as the substrate, and the organism *Deconica coprophila*, CBS. The residue thus obtained was chromatographed on Florisil (synthetic magnesium silicate, hereinafter referred to as Florisil) to give a crystalline material containing a mixture of dihydroxybicyclohexyls from which by recrystallization from acetone 0.33 g. of 4,4'-dihydroxybicyclohexyl was obtained. Infrared and paper chromatographic analysis showed the product to be identical to that obtained in Example 4.

EXAMPLE 17

*Oxygenation of bicyclohexyl*

The bioconversion and extraction procedures of Example 15 were repeated using 10 l. of sterilized medium of the same composition, 2 g. of bicyclohexyl as the substrate, and the microorganism *Cyathus poeppigii*, CBS. The residue thus obtained was chromatographed on Florisil. Elution with 25% acetone-Skellysolve B (isomeric hexanes, hereinafter referred to as Skellysolve B) gave a material shown by chromatographic analysis to be a mixture of dihydroxybicyclohexyls; further elution with acetone gave 853 mg. of crude 4,4'-dihydroxybicyclohexyl which was recrystallized from acetone to give 0.60 g. of 4,4'-dihydroxybicyclohexyl, M.P. 217–219° C.

Example 18

Oxygenation of bicyclohexyl

The bioconversion and extraction procedures of Example 15 were repeated using 10 ml. of sterilized medium of the same composition, 5 g. of bicyclohexyl as the substrate, and the organism *Wojnowicia graminis*, CBS. The residue thus obtained was chromatographed on Florisil to give material shown by chromatographic analysis to be a mixture of dihydroxybicyclohexyls.

Example 19

Oxygenation of bicyclohexyl

A medium was prepared containing the following ingredients:

| | |
|---|---|
| Glucose _____ g__ | 50.0 |
| Sodium nitrate _____ g__ | 2.0 |
| Potassium dihydrogen phosphate ($KH_2PO_4$) __g__ | 1.0 |
| Potassium chloride _____ g__ | 0.5 |
| Magnesium sulfate heptahydrate ($MgSO_4 \cdot 7H_2O$) _____ g__ | 0.5 |
| Ferrous sulfate ($FeSO_4 \cdot 7H_2O$) _____ g__ | 0.1 |
| Zinc sulfate solution (10 mg./ml.) _____ ml__ | 1.0 |
| Copper sulfate solution (5 mg./ml.) _____ ml__ | 1.0 |
| Water _____ liter__ | 1 |

Ten liters of this sterilized medium was inoculated with a 144-hour vegetative growth of *Ascochyta linicola*, NRRL 2923, and incubated at a temperature of about 28° C. using a rate of aeration of 1 l. per minute and agitation at 300 r.p.m. After 48 hours of incubation, a solution of 2.5 g. of bicyclohexyl in 25 ml. of dimethylformamide was added and incubation was continued for an additional 72-hour period. The beer and mycelium were then separated by filtration and extracted in the same manner as described in Example 15. The residue thus obtained which was a mixture of dihydroxybicyclohexyls was chromatographed on Florisil. Elution with 25% acetone-Skellysolve B gave 127 mg. of crystalline product, identified as 4,4'-dihydroxybicyclohexyl by its infrared spectrum.

Example 20

Oxygenation of bicyclohexyl

The bioconversion and extraction procedures of Example 15 were repeated on a larger scale using 100 l. of sterilized medium of the same composition, the microorganism *Curvularia lunata*, ATCC 12017, and 25 g. of bicyclohexyl as the substrate. The residue thus obtained was chromatographed on Florisil giving a mixture of dihydroxybicyclohexyls. At least three dihydroxybicyclohexyls were shown to be present by papergram analysis.

Example 21

Oxygenation of bicyclohexyl

The bioconversion and extraction procedures of Example 15 were repeated using 100 l. of sterilized medium of the same composition, 30 g. of bicyclohexyl as the substrate, and the microorganism *Sporotrichum sulfurescens*, ATCC 7159. The residue thus obtained, containing a mixture of dihydroxybicyclohexyls, was triturated with 510 ml. of ether and filtered, giving 10.25 g. of 4,4'-dihydroxybicyclohexyl. One recrystallization from acetone gave 6.85 g. of 4,4'-dihydroxybicyclohexyl, M.P. 212–217° C., which can be further purified by additional recrystallization from the same solvent.

Evaporation of the acetone mother liquor and trituration of the residue with 25 ml. of acetone gave 1.63 g. of material shown by papergram analysis to be a mixture of dihydroxybicyclohexyls, M.P. 192–205° C.

Evaporation of the ether filtrate, followed by trituration of the residue with acetone, gave 0.53 g. of material which was also shown by papergram analysis to be a mixture of dihydroxybicyclohexyls, M.P. 128–133° C. Oxidation with chromic acid of the filtrate from this trituration gave more than 10 g. of a mixture of dioxobicyclohexyls.

Example 22

Oxygenation of bicyclohexyl

Following the bioconversion and extraction procedures of Example 15 and substituting the microorganism *Septomyxa affinis*, ATCC 6737, for *Sporotrichum sulfurescens* is productive of a mixture of dihydroxybicyclohexyls which can be separated into its various oxygenated components by chromatography, giving 4,4'-dihydroxybicyclohexyl as the major component.

Example 23

Oxygenation of bicyclohexyl

Following the bioconversion and extraction procedures of Example 15 and substituting the microorganism *Chaetomium globosum*, ATCC 6205, for *Sporotrichum sulfurescens* is productive of a mixture of dihydroxybicyclohexyls which can be separated into its various oxygenated components by chromatography, giving 4,4'-dihydroxybicyclohexyl as the major component.

Example 24

Oxygenation of bicyclohexyl

A medium was prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate and 1 liter of tap water and adjusted to about pH 7. One ml. of lard oil was added as an antifoam preventive. Ten l. of this sterilized medium was inoculated with a 72-hour vegetative growth of *Nocardia gardneri*, ATCC 9604, and incubated at a temperature of about 28° C. using a rate of aeration of 0.5 l. per minute and agitation of 300 r.p.m. After 48 hours of incubation a solution of 2.5 g. of bicyclohexyl in 25 ml. of dimethylformamide was added to the fermentation. After an additional 72-hour period of incubation, the beer was extracted in the same manner as described in Example 15 giving a residue containing a mixture of dihydroxybicyclohexyls. The residue was dissolved in about 25 ml. of methylene chloride, chromatographed on Florisil, and eluted with Skellysolve B containing increasing proportions of acetone to give a mixture of dihydroxybicyclohexyls, comprised mainly of 4,4'-dihydroxybicyclohexyl.

Other species of the class Schizomycetes can be substituted in place of *Nocardia gardneri* to give essentially identical results, for example

*Pseudomonas aeruginosa*, ATCC 8689
*Mycobacterium rhodochrous*, ATCC 4276 and
*Mycococcus cinnabareus*, ATCC 11890.

Example 25

Oxygenation of 4-hydroxylbicyclohexyl (I)

4-hydroxybicyclohexyl was subjected to oxygenation by exposure to a growing culture of each of the species listed in Table VI below.

Media

For species of the classes Phycomycetes, Ascomycetes, Basidiomycetes and Deuteromycetes the following medium was employed:

(A)

2 g. cornsteep liquor (60% solids)
1 g. commercial dextrose
100 ml. tap water
0.1 ml. lard oil adjusted to pH 4.8–5.

For species of the class Schizomycetes the following medium was employed:

(B)

0.15 g. commercial dextrose
0.15 g. yeast extract
0.5 g. peptone
0.35 g. sodium chloride
0.36 g. dipotassium phosphate
100 ml. tap water adjusted to pH 7.

The appropriate medium in a 250 ml. shake flask was sterilized and inoculated with about 5 ml. of a vegetative growth of the microorganism and incubated with shaking at a temperature of about 28° C.

After 24 to 48 hours, or when a moderate to heavy growth of mycelium was apparent, a solution of 20 mg. of 4-hydroxybicyclohexyl in 0.25 ml. of N,N-dimethylformamide was added and the incubation was continued for an additional 72-hour period. Oxygenated product was separated from the fermentation beer by extracting the whole beer 4 times with a volume of methylene chloride equal to one-fourth the volume of the whole beer. The combined extracts were washed with one-fourth volume of distilled water and the solvent was removed by distillation. The residue thus obtained was assayed by paper strip chromatography and found to consist of a mixture of isomeric dihydroxybicyclohexyls.

The paper strip chromatography was carried out using the Bush B–3 system in which the sheet was equilibrated overnight at 34° C. in the vapor from a mixed solvent composed of 667 ml. of Skellysolve C (isomeric hexanes), 333 ml. of benzene, 800 ml. of methanol and 200 ml. of water, and developed with the nonpolar phase. The hydroxy ketones were detected by spraying the developed sheet with 2,4-dinitrophenylhydrazine reagent, or phosphomolybdic reagent, and the diols were detected by treating the developed sheet in phosphomolybdic reagent [L. M. Reineke, Anal. Chem., 28, 1853–58 (1952)].

The crude residue in each of the experiments was dissolved in 1 ml. of acetone and oxidized at room temperature by the addition of a visible excess of Jones reagent (2.67 M chromic acid reagent prepared from 26.7 g. of chromium trioxide and 23 ml. of sulfuric acid diluted to 100 ml. with water). The excess oxidant was destroyed by the addition of a few drops of isopropyl alcohol and the mixture was evaporated to dryness. Water (2 ml.) was added, and the products were extracted with 2 ml. of methylene chloride. The extract was evaporated to dryness and the residue was subjected to paper chromatography by the method described above and to gas-liquid (vapor phase) chromatography; the products were identified as dioxobicyclohexyls corresponding to the dihydroxybicyclohexyls and the hydroxyketones produced in the bioconversion.

The gas-liquid chromatography was carried out by injecting 0.02 ml. of 1:1 ethylene dichloride-methanol solution containing 1 mg. of sample into an injection port heated at 263° C. The column was packed with 5% of a methyl silicone polymer (General Electric SE·30) on 30–60 mesh fluorinated polymer (Haloport F). The temperature was programmed at 6.4° C./minute from 90° C. to 275° C. at a helium flow rate of 35–40 ml. per minute. The detection block temperature was 265° C.

TABLE VI

Achlya americana, ATCC 10977
Achlya bisexualis, ATCC 11397
Achlya crenulata, ATCC 11315, CBS
Absidia cylindrospora, ATCC 11516
Absidia cylindrospora, NRRL 2796
Absidia cylindrospora, var. rhizamorpha, NRRL 2815
Absidia pseudocylindrospora, NRRL 2770
Absidia glauca, ATCC 7852a, 7852b
Circinella spinosa, ATCC 9025, CBS
Cunninghamella blakesleeana, ATCC 8688a
Gongronella butleri, CBS
Mucor griseocyanus, ATCC 1207a
Rhizopus arrhizus, ATCC 11145
Rhizopus nigricans, ATCC 6227b
Calonectria decora, CBS
Gibberella saubinettii, CBS
Hypomyces haematococcus, CBS
Chaetomium globosum ATCC 6205
Endothia parasiticus, ATCC 9414
Guignardia bidwellii, ATCC 9559
Corticium sasakii, NRRL 2705
Corticium microsclerotia, NRRL 2727
Deconica coprophila, CBS
Cyathus poeppigii, CBS
Cyathus olla, CBS
Sphaerobolus stellatus, CBS
Aspergillus nidulans, ATCC 11267
Aspergillus niger, ATCC 9027
Aspergillus niger, ATCC 9142
Aspergillus niger, ATCC 10579
Aspergillus niger, ATCC 8740
Aspergillus proliferans, CBS
Aspergillus ruber, ATCC 9481
Brachysporium oryzae, ATCC 11571, CBS
Cladosporium resinate, NRRL 2778
Curvularia lunata, ATCC 12017
Curvularia pallescens, ATCC 12017, NRRL 2381
Fusarium culmorum, ATCC 12656
Helicodendron tubulosum, CBS
Helicosporium lumbricopsis, CBS
Helicosporium phragmitis, CBS
Keratinomyces ajelloi, CBS
Penicillium atrovenetum, CBS
Penicillium aurantio-virens, ATCC 10413, NRRL 2138
Penicillium patulum, NRRL 994
Sepedonium ampullosporum, CBS
Septomyxa affinis, ATCC 6737
Sporotrichum sulfurescens, ATCC 7159
Trichothecium roseum, ATCC 8685
Ascochyta linicola, NRRL 2923
Diplodia natalensis, ATCC 9055
Wojnowicia graminis, CBS
Mycobacterium rhodochrous, ATCC 4273
Micrococcus flavoroseus, ATCC 397
Micrococcus cerolyticus, ATCC 12559
Micrococcus cinnabareus, ATCC 11890
Micrococcus rubens, ATCC 186
Nocardia corallina, ATCC 4273
Nocardia erythropolis, ATCC 4277
Nocardia gardneri, ATCC 9604
Pseudomonas aeruginosa, ATCC 8689
Pseudomonas fluorescens, ATCC 949
Corynebacterium sp., ATCC 184
Streptomcyes roseochromogenus, ATCC 3347
Streptomyces argenteolus, ATCC 11009
Streptomcyes olivaceus, ATCC 12019

EXAMPLE 26

The procedure of Example 25 was repeated using 2-hydroxybicyclohexyl as the substrate, medium A and the following microorganisms:

Achlya americana, ATCC 10977
Achlya crenulata, ATCC 11315
Helicosporium lumbricopsis, CBS
Helicosporium phramitis, CBS
Helicodendron tubulosum, CBS
Aspergillus niger, ATCC 9142
Aspergillus niger, ATCC 9029 to obtain a mixture of isomeric dioxygenated bicyclohexyls the major components of which were usually 2,4'-dihydroxybicyclohexyl and 2,3'-dihydroxybicyclohexyl accompanied in certain instances by other dihydroxybicyclohexyls and by the corresponding hydroxyketones.

The other species listed in Table II can likewise be used for the oxygenation of 2-hydroxybicyclohexyl to give similar results.

In the same manner other bicyclohexyls, e.g., 3-hydroxybicyclohexyl, 1-hydroxybicyclohexyl, the 2-, 3- and 4-oxobicyclohexyls, the corresponding ketal and oxime derivatives thereof and the 1, 2, 3 and 4 heterocyclicamino substituted bicyclohexyls, are likewise oxygenated in accordance with the procedure of Example 25 to give mixtures of the corresponding oxygenated bicyclohexyls.

EXAMPLE 27

*Oxygenation of 4-hydroxybicyclohexyl*

A medium was prepared of 20 g. of cornsteep liquor (60% solids), 10 g. of commercial dextrose, and 1 l. with tap water and adjusted to a pH between 4.8 and 5. One ml. of lard oil antifoam agent was added as an antifoam preventive. Ten l. of this sterilized medium was inoculated with a 72-hour vegetative growth of *Cunninghamella blakesleeana* (ATCC 8688A) and after incubation for 24 hours at a temperature of about 28° C. using a rate of aeration of 0.5 l. per minute at 300 r.p.m. a solution of 2.5 g. of 4-hydroxybicyclohexyl in 25 ml. of dimethylformamide was then added to the fermentation. After an additional 72-hour period of incubation, the beer and mycelium were separated by filtration. The mycelium was washed with water and the wash-water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue comprising a mixture of oxygenated 4-hydroxybicyclohexyls. This residue was dissolved in about 25 ml. of methylene chloride, chromatographed on Florisil and eluted with Skellysolve B containing increasing proportions of acetone. The eluate fractions containing the desired materials (determined by I.R.) were evaporated to dryness and the residues were recrystallized first from acetone-Skellysolve B and then from acetone. There were thus obtained 4-hydroxy-4'-oxobicyclohexyl, M.P. 115–122° C., and 4,4'-dihydroxybicyclohexyl, M.P. 214–219° C.

The 4-hydroxy-4'-oxobicyclohexyl was characterized by oxidation with chromic acid to 4,4'-dioxobicyclohexyl, M.P. 114–116.5° C., and by benzoylation to 4-hydroxy-4'-oxobicyclohexyl benzoate, M.P. 144–149° C.

EXAMPLE 28

*Oxygenation of 4-hydroxybicyclohexyl*

The bioconversion and extraction procedures of Example 27 were repeated on a larger scale using 100 l. of sterilized medium of the same composition, the microorganism *Rhizopus arrhizus*, ATCC 11145, an aeration rate of 5 l. per minute and 25 g. of 4-hydroxybicyclohexyl as the substrate. The product obtained by solvent extraction was shown by chromatographic analysis to contain a mixture of oxygenated 4-hydroxybicyclohexyls. This product was chromatographed on Florisil and eluted as in Example 25. The appropriate fractions were combined and evaporated to give 11.3 g. of product which was processed further in a Craig countercurrent distribution apparatus using ethyl acetate:cyclohexane:methanol:water (75:25:44:56) as a solvent system. Crystallization from acetone of the main fractions thus obtained gave (A) 493.2 mg. of 4,4'-dihydroxybicyclohexyl, M.P. 175–177° C. characterized by I.R. and oxidation with chromic acid to 4,4'-dioxobicyclohexyl.

(B) 534 mg. of 4,1'-dihydroxybicyclohexyl, M.P. 160–161° C. Calcd. for $C_{12}H_{22}O_2$: C, 72.68; H, 11.18. Found: C, 72.58; H, 11.21.

(C) 0.46 g. of 4,4'-dihydroxybicyclohexyl, M.P. 213–215° C., isomeric to (A), above. Infrared analysis confirmed the structure.

(D) 0.36 g. of 4,2'-dihydroxybicyclohexyl, M.P. 103–105° C.

EXAMPLE 29

*Oxygenation of 4-hydroxybicyclohexyl*

The bioconversion and extraction procedures of Example 27 were repeated using 10 l. of sterilized medium of the same composition, the microorganism *Sporotrichum sulfurescens*, ATCC 7159, a rate of aeration of 1 l. per minute and 2.5 g. of 4-hydroxybicyclohexyl as the substrate. The crude residue thus obtained was triturated with ether to give 1.40 g. of crystalline product which was recrystallized from acetone to give 0.86 g. of 4,4'-dihydroxybicyclohexyl, M.P. 214–216° C.

EXAMPLE 30

*Oxygenation of 4-hydroxybicyclohexyl*

A medium was prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil was added as an antifoam preventive. Ten l. of this medium was sterilized and inoculated with a 72-hour vegetative growth of *Pseudomonas* species designated as PM–1 by M. H. Rogoff, U.S. Department of Interior, Bureau of Mines, Region V, Pittsburgh, Penna. and incubated for 48 hours at a temperature of about 28° C. using a rate of aeration of 0.5 l. per minute at 300 r.p.m. After 48 hours of incubation, a solution of 2.5 g. of 4-hydroxybicyclohexyl in 25 ml. of dimethylformamide was added to the fermentation. After an additional 72-hour period of incubation, the whole beer was extracted in the same manner as described in Example 27. The crude residue thus obtained was shown by chromatographic analysis to contain a mixture of oxygenated 4-hydroxybicyclohexyls (II). This residue was dissolved in about 25 ml. of methylene chloride, chromatographed on Florisil and eluted with Skellysolve B containing increasing proportions of acetone. Material eluted with 25% acetone-Skellysolve B gave a mixture a diols which were recrystallized from acetone to give as the major product 4,4'-dihydroxybicyclohexyl, identified by its infrared spectrum.

The additional isomeric oxygenated 4-hydroxybicyclohexyls contained in the mother liquors and eluates can be recovered by conventional methods.

EXAMPLE 31

*Oxygenation of 4-oxobicyclohexyl*

The procedures of Example 27 were repeated using the microorganism *Sporotrichum sulfurescens*, ATCC 7159, and 2.5 g. of 4-oxobicyclohexyl as the substrate giving 4-oxo-4'-hydroxybicyclohexyl as the major product together with lesser amounts of isomeric 4-oxo-hydroxybicyclohexyls.

EXAMPLE 32

*Oxygenation of 2-hydroxybicyclohexyl*

The bioconversion and extraction procedures of Example 27 were repeated using 100 l. of sterilized medium of the same composition, the microorganism *Sporotrichum sulfurescens*, ATCC 7159, an aeration rate of 5 l. per minute and 25 g. of 2-hydroxybicyclohexyl as the substrate to give a mixture of oxygenated 2-hydroxybicyclohexyl as the substrate to give a mixture of oxygenated 2-hydroxybicyclohexyls. Chromatographic analysis showed 2,3'-dihydroxybicyclohexyl and 2,4'-dihydroxybicyclohexyl to be the major products.

The mixture thus obtained was subjected to liquid-liquid countercurrent distribution using a system of chloroform:methanol:water—10:3:7. Oxidation of the products thus obtained with chromic acid gives 2,3'-dioxobicyclohexyl and 2,4'-dioxobicyclohexyl.

EXAMPLE 33

Oxygenation of 2-hydroxybicyclohexyl

The bioconversion and extraction procedures of Example 27 were repeated using the same microorganism, *Cunninghamella blakesleeana*, and 2 g. of 2-hydroxybicyclohexyl as the substrate. The product thus obtained was assayed by papergram and found to be a mixture of oxygenated 2-hydroxybicyclohexyls, the major components of which were 2,3'-dihydroxybicyclohexyl and 2,4'-dihydroxybicyclohexyl.

EXAMPLE 34

Oxygenation of 2-oxobicyclohexyl

The procedures of Example 27 were repeated using the microorganism *Sporotrichum sulfurescens*, ATCC 7159, and 3 g. of 2-oxobicyclohexyl as the substrate to give a mixture of oxygenated 2-oxobicyclohexyls. Chromatographic analysis showed 2-oxo-3'-hydroxybicyclohexyl and 2-oxo-4'-hydroxybicyclohexyl to be the major products.

EXAMPLE 35

Oxygenation of 3-hydroxybicyclohexyl

The procedures of Example 27 were repeated using the microorganism *Sporotrichum sulfurescens*, ATCC 7159, and 2.0 g. of 3-hydroxybicyclohexyl as the substrate to give a mixture of oxygenated 3-hydroxybicyclohexyls comprised mainly of 3,3'-dihydroxybicyclohexyl and 3,4'-dihydroxybicyclohexyl.

Oxidation with chromic acid gave 0.86 g. of a mixture of the corresponding dioxobicyclohexyls containing 3,3'-dioxobicyclohexyl and 3,4'-dioxobicyclohexyl as the major products.

EXAMPLE 36

Oxygenation of 1-hydroxybicyclohexyl

The procedures of Example 27 were repeated using the microorganism *Sporotrichum sulfurescens*, ATCC 7159, and 2.0 g. of 1-hydroxybicyclohexyl as the substrate to give a mixture of oxygenated 1-hydroxybicyclohexyls. Chromatographic analysis showed the major product to be 1,4'-dihydroxybicyclohexyl.

EXAMPLE 37

Oxygenation of 3-hydroxybicyclohexyl

The procedures of Example 27 were repeated using the microorganism *Alnicola escharoides*, CBS, and 3-hydroxybicyclohexyl as the substrate to give a mixture of oxygenated 3-hydroxybicyclohexyls, the major components of which were 3,3'-dihydroxybicyclohexyl and 3,4'-dihydroxybicyclohexyl.

EXAMPLE 38

Oxygenation of 2-oxobicyclohexyl

The procedures of Example 27 were repeated using the microorganism *Cyathus peoppigii*, CBS, and 2-oxobicyclohexyl as the substrate to give a mixture of oxygenated 2-oxobicyclohexyls, the major components of which were 2-oxo-3'-hydroxybicyclohexyl and 2-oxo-4'-hydroxybicyclohexyl.

EXAMPLE 39

Oxygenation of 4-oxobicyclohexyl oxime

The bioconversion and extraction procedures of Example 27 were repeated using the microorganism *Sporotrichum sulfurescens*, ATCC 7159, and 2 g. of 4-oxobicyclohexyl oxime as the substrate. The product thus obtained was shown by chromatographic analysis to contain as the major product 4-oxo-4'-hydroxybicyclohexyl oxime together with other isomeric oxygenated 4-oxobicyclohexyl oximes. Hydrolysis of the 4-oxo-4'-hydroxybicyclohexyl oxime followed by chromic acid oxidation gave a semi-crystalline product which was recrystallized from acetone-Skellysolve B to give 0.19 g. of 4,4'-dioxobicyclohexyl, identified by its infrared spectrum.

EXAMPLE 40

Oxygenation of 3-oxobicyclohexyl oxime

The bioconversion and extraction procedures of Example 5 were repeated using the microorganism *Nocardia corallina*, CBS, and 3-oxobicyclohexyl oxime as the substrate to give a mixture of oxygenated 3-oxobicyclohexyl oximes comprising 3-oxo-4'-hydroxybicyclohexyl oxime as the major component.

EXAMPLE 41

Oxygenation of 2-oxobicyclohexyl oxime

The bioconversion and extraction procedures of Example 27 were repeated using the microorganism *Adelopus nudus*, CBS, and 2-oxobicyclohexyl oxime as the substrate to give a mixture of oxygenated 2-oxobicyclohexyl oximes, the major component of which was 2-oxo-4'-hydroxybicyclohexyl oxime.

In the same manner following the procedures of Examples 38, 39 or 40, other carbonyl group derivatives, for example, the hydrazones, lower-alkylhydrazones, phenylhydrazones, semicarbazones and thiosemicarbazones, can be used as the substrate in place of the oximes to give the corresponding oxygenated products.

EXAMPLE 42

Oxygenation of 4-oxobicyclohexyl cyclic ethylene ketal

The procedures of Example 27 were repeated using 10 l. of sterilized medium of the same composition, the microorganism *Sporotrichum sulfurescens*, ATCC 7159, and 2.5 g. of 4-oxobicyclohexyl cyclic ethylene ketal as the substrate. The eluate fractions containing the desired products (determined by I.R.) were combined, evaporated to dryness and triturated with acetone:Skellysolve B (1:6) to give 0.13 g. of 4-oxo-4'-hydroxybicyclohexyl cyclic ethylene ketal, M.P. 113–117° C.; a sample after two recrystallizations from acetone-Skellysolve B melted at 118.5°–119.5° C.

*Analysis.*—Calcd. for $C_{14}H_{24}O_3$: C, 69.96; H, 10.07. Found: C, 70.01; H, 9.84.

The 4-oxo-4'-hydroxybicyclohexyl oxime was hydrolyzed with dilute hydrochloric acid and the product recrystallized from acetone:Skellysolve B to give 4-oxo-4'-hydroxybicyclohexyl, M.P. 127–129° C.; the infrared spectrum corresponded to that of an authentic specimen.

Other oxygenated 4-oxobicyclohexyl oximes were present in the various eluate fractions obtained by elution of the chromatographic column.

EXAMPLE 43

Oxygenation of 4-oxobicyclohexyl cyclic trimethylene ketal

The procedures of Example 27 were repeated using the microorganism *Sporotrichum sulfurescens*, ATCC 7159, and 2.5 g. of 4-oxobicyclohexyl cyclic trimethylene ketal as the substrate to give 0.57 g. of 4-oxo-4'-hydroxybicyclohexyl cyclic trimethylene ketal, M.P. 93–100° C. as the major component; a sample after two recrystallizations from acetone:Skellysolve B melted at 108–109° C.

*Analysis.*—Calcd. for $C_{15}H_{26}O_3$: C, 70.83; H, 10.30. Found: C, 70.81; H, 10.12.

A sample of the 4-oxo-4'-hydroxybicyclohexyl cyclic trimethylene ketal was hydrolyzed with dilute hydrochloric acid to 4-oxo-4'-hydroxybicyclohexyl which after recrystallization from acetone-Skellysolve B melted at 131.5–133° C. The infrared spectrum of the latter compound was identical to that of an authentic specimen.

In the same manner, the other cyclic alkylene ketals prepared in Preparations 2 and 3 above, are substituted as starting material in Examples 42 and 43, to produce the corresponding oxygenated products. Likewise, other organisms, e.g., those listed in Table II, can be substituted for *Sporotrichum sulfurescens*. The following conversions showing the major products obtained are representative:

3-oxobicyclohexyl cyclic ethylene ketal with *Hysterium augustatum*, CBS, to 3-oxo-4'-hydroxybicyclohexyl cyclic ethylene ketal;
2-oxobicyclohexyl cyclic ethylene ketal with *Glonium stellatum*, CBS, to 2-oxo-4'-hydroxybicyclohexyl cyclic ethylene ketal;
3-oxobicyclohexyl cyclic trimethylene ketal with *Rhizoctonia solani*, ATCC 6221, to 3-oxo-4'-hydroxybicyclohexyl cyclic trimethylene ketal;
2-oxobicyclohexyl trimethylene ketal with *Mytilidion tortile*, CBS, to 2-oxo-4'-hydroxybicyclohexyl cyclic trimethylene ketal.

EXAMPLE 44

Oxygenation of 4-morpholinobicyclohexyl

The bioconversion and extraction procedures of Example 27 were repeated using the microorganism *Sporotrichum sulfurescens*, ATCC 7159, and 2 g. of 4-morpholinobicyclohexyl as the substrate. The product thus obtained was stirred with about 100 ml. of 3 N hydrochloric acid and extracted five times with about 50 ml. volumes of ether. The aqueous acid solution was then chilled with ice and made basic by the addition of 50% sodium hydroxide solution. A precipitate separated which was recovered by filtration, washed with a little ice water and dried; yield 0.325 g. of 4-morpholino-4'-hydroxybicyclohexyl, M.P. 151–167° C., which on recrystallization from acetone-Skellysolve B melted at 194° C.

*Analysis.*—Calcd. for $C_{16}H_{29}NO_2$: C, 71.86; H, 10.93; N, 5.24. Found: C, 71.34; H, 10.54; N, 5.36.

Chromatographic analysis showed the presence of other oxygenated 4-morpholinobicyclohexyls in the mother liquors.

EXAMPLE 45

Bioconversion of 4-piperidinobicyclohexyl

The procedure of Example 20 are repeated using the microorganism *Boletus* sp., Peck 168, (Ohio State University) and 2.0 g. of 4-piperidinobicyclohexyl as the substrate to give a mixture of oxygenated 4-piperidinobicyclohexyls comprised mainly of 4-piperidino-4'-hydroxybicyclohexyl.

In the same manner, other heterocyclic amines e.g., morpholines, piperidines, pyrrolidines, thiomorpholines, piperazines, N-acyl piperazines and the like, can be substituted for the substrate of Example 44 to produce mixtures of the corresponding oxygenated amines comprised mainly of the corresponding 4'-hydroxy compounds. The following conversions showing the major products obtained and the use of other species of microorganisms are representative:

3-piperidinobicyclohexyl with *Dermea balsama*, CBS, to 3-piperidino-4'-hydroxybicyclohexyl;
2-morpholinobicyclohexyl with *Cenangium abietis*, CBS, to 2-morpholino-4'-hydroxybicyclohexyl;
3-(4-acetyl-1-piperazinyl)bicyclohexyl with *Gloniopsis brevisaccata*, CBS, to 3-(4-acetyl-1-piperazinyl)-4'-hydroxybicyclohexyl;
4-thiomorpholinobicyclohexyl with *Cylindrocarpon radicicola*, ATCC 11811, to 4-thiomorpholino-4'-hydroxybicyclohexyl.

In Examples 26–45, above, other species of microorganisms of Phylum III, Subphylum 2, for example, those species listed in Table II above can be substituted in place of the one named in each of the above examples to give the same products but differing in the relative amounts of the microbially oxygenated products obtained in each.

EXAMPLE 46

Oxygenation of phenylcyclohexane

A medium was prepared of 20 g. of cornsteep liquor (60% solids), 10 g. of commercial dextrose, 1 l. of tap water and adjusted to a pH between 4.8 and 5. One ml. of lard oil was added as an antifoam preventive. Ten liters of this sterilized medium was inoculated with a 72-hour vegetative growth of *Sporotrichum sulfurescens*, ATCC 7159, and incubated at a temperature of about 28° C. with aeration at the rate of 1 l. per minute and stirring at 300 r.p.m. After 48 hours of incubation, a solution of 2 g. of phenylcyclohexane in 25 ml. of dimethylformamide was added to the fermentation. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue shown by chromatographic analysis to comprise a mixture of microbially oxygenated phenylcyclohexanes of which the major component was 4-phenylcyclohexanol. The residue was stirred with Skellysolve B (isomeric hexanes hereinafter referred to as Skellysolve B) and the filtrate was saved for chromatography. The remainder of the residue was then stirred with ether, and the product obtained by evaporation of the ether was recrystallized from Skellysolve B to give 0.39 g. of crude 4-phenylcyclohexanol, M.P. 95–117°; chromatography on Florisil synthetic magnesium silicate (hereinafter referred to as Florisil) gave 0.21 g. of 4-phenylcyclohexanol, M.P. 115–120° C. The mother liquors from the Skellysolve B recrystallization were combined with the Skellysolve B filtrate and chromatographed on Florisil giving 928 mg. of 4-phenylcyclohexanol, M.P. 110–120°.

Chromatographic analysis showed the presence of other oxygenated phenylcyclohexanes in the mother liquors and eluates.

EXAMPLE 47

Oxygenation of (p-methoxyphenyl)cyclohexane

The bioconversion and extraction procedures of Example 46 were repeated using 10 l. of sterilized medium having the same composition, the same microorganism, *Sporotrichum sulfurescens*, ATCC 7159, and 2.0 g. of p-methoxyphenylcyclohexane as the substrate to give a residue shown by chromatographic analysis to be a mixture of oxygenated p-methoxyphenylcyclohexanes of which the major component was 4-(p-methoxyphenyl)cyclohexanol. This mixture was chromatographed on Florisil and eluted with Skellysolve B containing increasing proportions of acetone to give 0.1 g. of crystalline 4-(p-methoxyphenyl)cyclohexanol, M.P. 142–144° C.

In the same manner, other alkoxyphenylcyclohexanes can be substituted as the substrate for phenylcyclohexane and (p-methoxyphenyl)cyclohexane in Examples 46 and 47, above, using the same species of microorganism or other species of Subphylum 2 of Phylum III, for example, those listed in Table II above, to produce the corresponding (alkyloxyphenyl)cyclohexanols. The following conversions using representative species are typical:

(o-methoxyphenyl)cyclohexane with *Gongronella bulteri*, CBS, to 4-(o-methoxyphenyl)cyclohexanol;
(m-methoxyphenyl)cyclohexane with *Gloniopsis brerisaccata*, CBS, to 4-(m-methoxyphenyl)cyclohexanol;
(o-ethoxyphenyl)cyclohexane with *Absidia glauca*, ATCC 7852a, to 4-(o-ethoxyphenyl)cyclohexanol;
(m-ethoxyphenyl)cyclohexane with *Glonium clavisporiem*, CBS, to 4-(m-ethoxyphenyl)cyclohexanol;
(p-ethoxyphenyl)cyclohexane with *Hysterium angustatum* to 4-(p-ethoxyphenyl)cyclohexanol;

(o-propoxyphenyl)cyclohexane with *Calonectria decora*, CBS to 4-(o-propoxyphenyl)cyclohexanol;

(p-propoxyphenyl)cyclohexane with *Mytilidion tortile*, CBS to 4-(p-propoxyphenyl)cyclohexanol;

(m-isopropoxyphenyl)cyclohexane with *Hypomyces haematoccocus*, CBS, to 4-(m-isopropoxyphenyl) cyclohexanol;

(p-isopropoxyphenyl)cyclohexane with *Corticium sasakii*, NRRL 2705, to 4-(p-isopropoxyphenyl) cyclohexanol;

(p-butoxyphenyl)cyclohexane with *Brachysporium oryzae*, ATCC 11571, to 4-(p-butoxyphenyl) cyclohexanol;

(m-isobutoxyphenyl)cyclohexane with *Adelopus nudus*, CBS, to 4-(m-isobutoxyphenyl)cyclohexanol;

(o-tert-butoxyphenyl)cyclohexane with *Boletus* sp., Peck 168 (Ohio State University) to 4-(o-tert-butoxyphenyl)cyclohexanol;

(p-pentyloxyphenyl)cyclohexane with *Penicillum atroventum*, CBS, to 4-(p-pentyloxyphenyl) cyclohexanol;

(m-isopentyloxyphenyl)cyclohexane with *Alnicola escharoides*, CBS, to 4-(m-isopentyloxyphenyl) cyclohexanol;

(o-neopentyloxyphenyl)cyclohexane with *Diplodia natalensis*, ATCC 9055, to 4-(o-neopentyloxyphenyl) cyclohexanol;

(p-tert-pentyloxyphenyl)cyclohexane with *Septomyxa affinis*, ATCC 6737, to 4-(p-tert-pentyloxyphenyl) cyclohexanol;

(p-hexyloxyphenyl)cyclohexane with *Mycobacterium rhodochrous*, ATCC 4277, at pH 6.5–7.0 to 4-(p-hexyloxyphenyl)cyclohexanol;

(m-isohexyloxyphenyl)cyclohexane with *Keratinomyces ajelloi*, CBS, to 4-(m-isohexyloxyphenyl)cyclohexanol;

phenylcyclohexane with *Trichothecium roseum*, ATCC 8685, to 4-phenylcyclohexanol;

(p-methoxyphenyl)cyclohexane with *Cladosporium resinae*, NRRL 2778, to 4-(p-methoxyphenyl) cyclohexanol and (p-ethoxyphenyl)cyclohexane with *Curvularia lunata*, ATCC 12017, to 4-(p-ethoxyphenyl)cyclohexanol.

Although the 4-hydroxy compound is shown as the major product in each of the above conversions, it is to be understood that lesser amounts of the 1-, 2- and 3-hydroxy compounds are also obtained.

EXAMPLE 48

*Oxygenation of phenylcyclohexane*

The bioconversion and extraction procedures of Example 46 were repeated using 10 liters of sterilized medium having the same composition, the microorganism *Rhizopus arrhizus*, ATCC 11145, and 2.0 g. of phenylcyclohexane to give a mixture of microbially oxgenated phenylcyclohexanes, the major component of which was 3-phenylcyclohexanol. The mixture thus obtained was chromatographed on Florisil and eluted with Skellysolve B containing increasing proportions of acetone. The fractions containing the desired product were combined and triturated with Skellysolve B to give 3-phenylcyclohexanol, M.P., 78–80° C.

In the same manner, the (alkoxyphenyl)cyclohexanes, for example, those named and listed in Examples 46 and 48, above, can be substituted for phenylcyclohexane in Example 48 to give mixtures of the corresponding oxygenated compounds, comprised mainly of 3-(alkoxyphenyl)cyclohexanols.

EXAMPLE 49

*Oxygenation of 4-cyclohexylphenyl methylcarbamate*

The bioconversion and extraction procedures of Example 46 were repeated using 10 liters of sterilized medium of the same composition, the microorganism *Sporotrichum sulfurescens*, ATCC 7159, and 2.0 g. of 4-cyclohexylphenyl methylcarbamate as the substrate to give a mixture of oxygenated 4-cyclohexylphenyl methylcarbamates, the major component of which was 4-(4-hydroxycyclohexyl)phenyl methylcarbamate. The mixture thus obtained was chromatographed on Florisil and eluted with Skellysolve B containing increasing proportions of acetone. The fractions containing the desired product as determined by chromatographic analysis were stirred with ether to give 0.29 g. of 4-(4-hydroxycyclohexyl)phenyl methylcarbamate, M.P. 143–150° C.

Other oxygenated 4-cyclohexylphenyl methylcarbamates were present in the mother liquors.

In the same manner, other cyclohexylphenyl alkylcarbamates and cyclohexylphenyl arylcarbamates can be used as the substrate in place of 4-cyclohexylphenyl methylcarbamate in Example 49 with the same species of microorganism or other species of Subphylum 2 of Phylum III, e.g., those listed in Table II above. The following conversions using representative species are typical:

2-cyclohexylphenyl carbamate with *Cunninghamella blakesleeana*, ATCC 8688a, to 2-(4-hydroxycyclohexyl)phenyl carbamate;

2-cyclohexylphenyl carbamate with *Ascochyta linicola* NRRL 2923 to 2-(4-hydroxycyclohexyl)phenyl carbamate;

2-cyclohexylphenyl methylcarbamate with *Circinella spinosa*, ATCC 9025, to 2-(4-hydroxycyclohexyl)phenyl methylcarbamate;

4-cyclohexylphenyl dimethylcarbamate with *Gibberella saubinettii*, CBS, to 4-(4-hydroxycyclohexyl)phenyl dimethylcarbamate;

4-cyclohexlphenyl ethylcarbamate with *Guignardia bidwelli*, ATCC 9560, to 4-(4-hydroxycyclohexyl)phenyl ethylcarbamate;

3-cyclohexylphenyl ethylcarbamate with *Chaetomium globosum*, ATCC 6205, to 3-(4-hydroxycyclohexyl)phenyl ethylcarbamate;

4-cyclohexylphenyl diethylcarbamate with *Endothia parasiticus*, ATCC 9414, to 4-(4-hydroxycyclohexyl)phenyl diethylcarbamate;

3-cyclohexylphenyl propylcarbamate with *Cylindrocarpon radicicola*, ATCC 11011, to 3-(4-hydroxycyclohexyl)phenyl propylcarbamate;

2-cyclohexylphenyl butylcarbamate with *Deconica caprophila*, CBS, to 2-(4-hydroxycyclohexyl)phenyl butylcarbamate;

3-cyclohexylphenyl isobutylcarbamate with *Micrococcus rubens*, ATCC 186 at pH 6.5–7.0 to 3-(4-hydroxycyclohexyl)phenyl isobutylcarbamate;

4-cyclohexylphenyl tert-butylcarbamate with *Cyathus peoppigii*, CBS, to 4-(4-hydroxycyclohexyl)phenyl tert-butylcarbamate;

4-cyclohexylphenyl phenylcarbamate with *Dermea balsama*, CBS, to 4-(4-hydroxycyclohexyl)phenyl phenylcarbamate;

2-cyclohexylphenyl phenylcarbamate with *Cenangium abietis*, CBS, to 2-(4-hydroxycyclohexyl)phenyl phenylcarbamate;

4-cyclohexylphenyl (p-nitrophenyl)carbamate with *Aspergillus niger*, ATCC 9027, to 4-(4-hydroxycyclohexyl) phenyl (p-nitrophenyl)carbamate;

2-cyclohexylphenyl o-biphenylylcarbamate with *Wojnowicia graminis*, CBS, to 2-(4-hydroxycyclohexyl)phenyl o-biphenylylcarbamate;

4-cyclohexylphenyl p-tolylcarbamate with *Nocardia corallina*, CBS, at pH 6.5–7.0 to 4-(4-hydroxycyclohexyl) phenyl p-tolylcarbamate;

2-cyclohexylphenyl o-tolylcarbamate with *Pseudomonas aeruginosa*, ATCC 8689, to 2-(4-hydroxycyclohexyl) phenyl o-tolylcarbamate, and 3-cyclohexylphenyl m-xylylcarbamate with *Rhizoctonia solani*, ATCC 6221, to 3-(4-hydroxycyclohexyl)phenyl m-xylylcarbamate;

Although the 4-hydroxy compound is shown as the major product in each of the above representative conversions it is to be understood that lesser amounts of the corresponding 1-, 2- and 3-hydroxy compounds are also obtained.

EXAMPLE 50

Oxygenation of 4-cyclohexylphenyl methylcarbamate

The bioconversion and extraction procedures of Example 46 are repeated using 10 l. of sterilized medium of the same composition, the microorganism *Rhizopus arrhizus*, ATCC 11145, and 2.0 g. of 4-cyclohexylphenyl methylcarbamate as the substrate to give a mixture of microbially oxygenated 4-cyclohexylphenyl methylcarbamates. Chromatographic analysis showed the chief component to be 4-(3-hydroxycyclohexyl) phenyl methylcarbamate. The mixture thus obtained was chromatographed on Florisil and eluted with Skellysolve B containing increasing proportions of acetone. The fractions containing the desired product, as determined by chromatographic analysis, were stirred with Skellysolve B to give 4-(3-hydroxycyclohexyl)phenyl methylcarbamate.

In the same manner other cyclohexylphenyl carbamates, cyclohexylphenyl alkylcarbamates and cyclohexylphenyl arylcarbamates, for example, those named in the last paragraph of Example 49, can be used as the substrate in Example 50 to produce the corresponding oxygenated carbamates in which the 3-hydroxy isomer predominates.

EXAMPLE 51

Oxygenation of phenylcyclohexane

A medium is prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium and 1 liter of tap water and adjusted to about pH 7. One ml. of lard oil is added as an antifoam preventive. Ten l. of this sterilized medium is inoculated with a 72-hour vegetative growth of *Streptomyces mediocidicus*, ATCC 13279, and incubated at a temperature of about 28° C. with aeration at the rate of 0.5 l. per minute and stirring at 300 r.p.m. After 48 hours of incubation, a solution of 2.5 g. of phenylcyclohexane in 25 ml. of dimethylformamide is added to the fermentation. After an additional 72-hour period of incubation, the beer and mycelium are separated by filtration and extracted in the same manner as described in Example 46. The residue thus obtained is chromatographed on Florisil and eluted with Skellysolve B containing increasing proportions of acetone to give a mixture of oxygenated phenylcyclohexanes, the major component of which is 4-phenylcyclohexanol.

EXAMPLE 52

Oxygenation of cyclohexyl sulfone

A medium was prepared of 20 g. of cornsteep liquor (60% solids), 10 g. of commercial dextrose and 1 l. of tap water and adjusted to a pH between 4.8 and 5. One ml. of lard oil was added as an antifoam preventive. One hundred liters of this sterilized medium was inoculated with a 72-hour vegetative growth of *Sporotrichum sulfurescens*, ATCC 7159, and incubated for 48 hours at a temperature of about 28° C. with aeration at the rate of 5 l. per minute and stirring at 300 r.p.m. A solution of 25 g. of cyclohexyl sulfone in 250 ml. of dimethylformamide was then added to the fermentation. After an additional 72-hour period of incubation, the beer and mycelium were separated by filtration. The mycelium was washed with water and the wash water was added to the beer filtrate. The thus-obtained beer filtrate was extracted 4 times with a volume of methylene chloride equal to one-fourth the volume of the filtrate. The combined extracts were washed with one-fourth volume of distilled water and the solvent was removed by distillation to give a crude residue containing oxygenated cyclohexyl sulfones, comprised mostly of cyclohexyl sulfones oxygenated at the 3- and 4-positions.

The residue was chromatographed on silica gel packed in ethyl acetate and developed with the same solvent to give:

(A) 1.20 g. of a mixture of hydroxycyclohexyl cyclohexyl sulfones, M.P. 108–110.5° C., which after two recrystallizations from acetone-Skellysolve B gave 4-hydroxycyclohexyl cyclohexyl sulfone, M.P. 109–111° C.

*Analysis.*—Calcd. for $C_{12}H_{22}O_3S$: C, 58.51; H, 9.00; S, 13.0. Found: C, 59.22; H, 9.52; S, 12.97.

(B) 2.82 g. of a mixture of hydroxycyclohexyl cyclohexyl sulfones, M.P. 120–122.5° C., which after two recrystallizations from acetone-Skellysolve B gave 3-hydroxycyclohexyl cyclohexyl sulfone, M.P. 124–125.5° C.

*Analysis.*—Calcd. for $C_{12}H_{22}O_3S$: C, 58.51; H, 9.00; S, 13.0. Found: C, 57.41; H, 8.38; S, 13.04.

EXAMPLE 53

Oxygenation of cycloheptyl cyclohexyl sulfone

The bioconversion and extraction procedures of Example 52 were repeated using 20 l. of sterilized medium having the same composition, the microorganism, *Sporotrichum sulfurescens*, ATCC 7159, and 5.0 g. of cycloheptyl cyclohexyl sulfone as the substrate to give a residue which was shown by chromatographic analysis to contain a mixture of microbially oxygenated cycloheptyl cyclohexyl sulfones. The residue thus obtained was chromatographed on silica gel packed in ethyl acetate and eluted with the same solvent. Two products were obtained. One was 4-oxocycloheptyl cyclohexyl sulfone, which after recrystallization from acetone-Skellysolve B melted at 143–148° C.; yield, 0.86 g. The other was 4-hydroxycycloheptyl cyclohexyl sulfone, which after recrystallization from acetone-Skellysolve B melted at 78–83° C.; yield, 0.92 g.

EXAMPLE 54

Oxygenation of cyclopentyl sulfone

Following the procedure of Example 52, substituting cyclopentyl sulfone for cyclohexylsulfone and using the microorganism *Rhizopus arrhizus*, ATCC 11145, there is obtained a mixture of oxygenated cyclopentyl sulfones which can be separated into its various components by chromatography giving 3-hydroxycyclopentyl cyclopentyl sulfone as the major product.

EXAMPLE 55

Oxygenation of cyclohexyl cyclophentyl sulfone

Following the procedure of Example 52, substituting cyclohexyl cyclopentyl sulfone for cyclohexyl sulfone and using the microorganism *Deconica coprophilia*, CBS, there is obtained a mixture of oxygenated cyclohexyl cyclopentyl sulfones which can be separated into its various components by chromatography giving 3-hydroxycyclopentyl cyclohexyl sulfone, 3-hydroxycyclohexyl cyclopentyl sulfone and 4-hydroxycyclohexyl cyclopentyl sulfone as the major products.

EXAMPLE 56

Oxygenation of cycloheptyl sulfone

Following the procedure of Example 52, substituting cycloheptyl sulfone for cyclohexylsulfone and using the microorganism *Calonectria decora*, CBS, there is obtained a mixture of oxygenated cycloheptyl sulfones which can be separated into its various components by chromatography giving 4-hydroxycycloheptyl cycloheptyl sulfone as the major product.

EXAMPLE 57

Oxygenation of cyclooctyl cyclopentyl sulfone

Following the procedure of Example 52, substituting cyclopentyl cyclooctyl sulfone for cyclohexylsulfone and using the microorganism *Curvularia lunata*, ATCC 12017, there is obtained a mixture of oxygenated cyclopentyl cyclooctyl sulfones which can be separated into its various components by chromatography giving 3-hydroxycyclopentyl cyclooctyl sulfone and 5-hydroxycyclooctyl cyclopentyl sulfone as the major products.

EXAMPLE 58

*Oxygenation of cyclohexyl cyclooctyl sulfone*

Following the procedure of Example 52, substituting cyclohexyl cyclooctyl sulfone for cyclohexylsulfone and using the microorganism *Aspergillus niger*, ATCC 8740, there is obtained a mixture of oxygenated cyclohexyl cyclooctyl sulfones which can be separated into its various components by chromatography giving 3-hydroxycyclohexyl cyclooctyl sulfone, 4-hydroxycyclohexyl cyclooctyl sulfone and 5-hydroxycyclooctyl cyclohexyl sulfone as the major products.

EXAMPLE 59

*Oxygenation of cyclododecyl cyclohexyl sulfone*

Following the procedure of Example 52, substituting cyclododecyl cyclohexyl sulfone for cyclohexyl sulfone and using the microorganism *Cunninghamella blakesleeana*, ATCC 8688a, there is obtained a mixture of oxygenated cyclododecyl cyclohexyl sulfones which can be separated into its various components by chromatography giving 3-hydroxycyclohexyl cyclododecyl sulfone, 4-hydroxycyclohexyl cyclododecyl sulfone and 6-hydroxycyclododecyl cyclohexyl sulfone as the major products.

EXAMPLE 60

*Oxygenation of cyclohexyl cyclopentadecyl sulfone*

Following the procedure of Example 52, substituting cyclohexyl cyclopentadecyl sulfone for cyclohexylsulfone and using the microorganism *Gibberella saubinettii*, CBS, there is obtained a mixture of oxygenated cyclohexyl cyclopentadecyl sulfones which can be separated into its various components by chromatography giving 3-hydroxycyclohexyl cyclopentadecyl sulfone and 4-hydroxycyclohexyl cyclopentadecyl sulfone as the major products.

EXAMPLE 61

*Oxygenation of cyclodecyl cyclononyl sulfone*

Following the procedure of Example 52, substituting cyclodecyl cyclononyl sulfone for cyclohexylsulfone and using the microorganism *Cyathus poppigii*, CBS, there is obtained a mixture of oxygenated cyclopentyl sulfones which can be separated into its oxygenated components by chromatography giving 6-hydroxycyclodecyl cyclononyl sulfone as the major product.

EXAMPLE 62

*Oxygenation of cyclopentadecyl cyclotetradecyl sulfone*

Following the procedure of Example 52, substituting cyclopentadecyl cyclotetradecyl sulfone for cyclohexylsulfone and using the microorganism *Ascochyta linicola*, NRRL 2923, there is obtained a mixture of oxygenated cyclopentadecyl cyclotetradecyl sulfones which can be separated into its various components by chromatography giving 7-hydroxycyclotetradecyl cyclopentadecyl sulfone as the major product.

EXAMPLE 63

*Oxygenation of cyclopentylsulfone*

A medium is prepared of 1.5 g. of beef extract, 1.5 g. of yeast extract, 5 g. of peptone, 1.0 g. of dextrose, 3.5 g. of sodium chloride, 3.58 g. of dipotassium phosphate and 1.32 g. of monopotassium phosphate, 1 liter with tap water and adjusted to about pH 7. One ml. of lard oil is added as a foam preventive. Ten liters of this sterilized medium is inoculated with a 72-hour vegetative growth of *Mycobacterium rhodochrous*, ATCC 4276 and incubated for 48 hours at a temperature of about 28° C. with aeration at the rate of 0.5 l. per minute and stirring at 300 r.p.m. After about 48 hours of agitation, a solution of 2.5 g. of cyclopentylsulfone in 25 ml. of dimethylformamide is added and incubation is continued for additional 72-hour period. The beer and mycelium are separated by filtration and extracted in the same manner as described in Example 52 to give a mixture of oxygenated cyclopentyl sulfones, which can be separated into its various components by chromatography giving 3-hydroxycyclopentyl cyclopentyl sulfone as the major product.

In examples 52–63, inclusive, above, other species of Subphylum 2 of Phylum III, for example, those species listed in Table II, above, can be used in each of the said examples with similar results. The procedure of Example 63 is preferred for species of the class Schizomycetes. The following are representative:

*Absidia cylindrospora*, NRRL 2796
*Circinella spinosa*, ATCC 9025
*Gongronella lacrispora*, NRRL 2643
*Gloniopsis brerisaccata*, CBS
*Glonium clavisporum*, CBS
*Hysterium angustatum*, CBS
*Mytilidion tortile*, CBS
*Hypomyces haematococcus*, CBS
*Dermea libocedri*, CBS
*Cenangium abietis*, CBS
*Adelopus nudus*, CBS
*Chaetomium globosum*, ATCC 6205
*Endothia parasiticus*, ATCC 9414
*Guignardi bidwelli*, ATCC 9559
*Boletus luteus*, CBS
*Alnicola escharoides*, CBS
*Corticium microsclerotia*, NRRL 2727
*Diplodia natalensis*, ATCC 9055
*Wojnowicia graminis*, CBS
*Septomyxa affinis*, ATCC 6737
*Aspergillus versicolor*, ATCC 9577
*Keratinomyces ajelloi*, CBS
*Penicillium patulum*, ATCC 9260
*Trichothecum roseum*, NRRL 1665
*Brachysporium oryzae*, ATCC 11571
*Cladosporium resinae*, NRRL 2778
*Cylindrocarpon didymum*, CBS
*Rhizoctonia solani*, ATCC 6221
*Pseudomonas fluorescens*, ATTC 949
*Micrococcus cerolyticus*, ATCC 12559
*Nocardia erythropolis*, ATCC 4277
*Streptomyces roseochromogenus*, ATCC 7159

EXAMPLE 64

*Oxygenation of N-cyclododecylacetamide*

N-cyclododecylacetamide was subjected to oxygenation by exposure to a growing culture of each of the species listed in Table VII below.

*Media*

For species of the classes Phycomycetes, Ascomycetes, Basidiomycetes and Deuteromycetes the following medium was employed:

(A)

2 g. cornsteep liquor (60% solids)
1 g. commercial dextrose
100 ml. tap water
0.1 ml. lard oil
adjusted to pH 4.8 to 5

For species of the class Schizomycetes the following medium was employed:

(B)

0.15 g. commercial dextrose
0.15 g. yeast extract
0.5 g. peptone
0.35 g. sodium chloride
100 ml. tap water
adjusted to pH 7

The appropriate medium in a 250 ml. shake flask was sterilized and inoculated with about 5 ml. of a vegetative growth of the microorganism and incubated with shaking at a temperature of about 28° C. After 24 to 48 hours, or when a moderate to heavy growth of mycelium was apparent, a solution of 25 ml. of N-cyclododecylacetamide in 0.25 ml. of N,N-dimethylformamide was added to each and the incubation was continued for an additional 72-hour period. In each of the runs the oxygenated products were separated from the fermentation beer by extracting the whole beer 4 times with a volume of methylene chloride equal to about one-fourth the volume of the whole beer. The combined extracts were washed with one-fourth volume of distilled water and the solvent was removed by distillation. The residue thus obtained was assayed by paper strip chromatography, thin-layer chromatography on silica gel, or gas chromatography, in accordance with methods known in the art, e.g., L. M. Reineke, Anal. Chem., 28, 1853-58 (1952) and Heftman, Chromatography (1961), Reinholt Publishing Co., New York, New York, and found to consist of a mixture of N-(hydroxycyclododecyl) and (oxocyclododecyl) acetamides, the major components being N-(5-, 6- and 7-hydroxycyclododecyl)acetamides and N-(5-, 6- and 7-oxocyclododecyl)acetamides.

TABLE VII

Aerobacter aerogenes, ATCC 8724
Absidia cylindrospora, NRRL 2796
Absidia cylindrospora var. rhizomorpha, NRRL 2815
Absidia pseudocylindrospora, NRRL 2770
Adelopus nudus, CBS
Alnicola escharoides, CBS
Alternaria tenuis, ATCC 6663
Aspergillus nidulans, ATCC 11267
Aspergillus versicolor, ATCC 9577
Chaetomium globosum, ATCC 6205
Cenangium abietis, CBS
Calonecteria decora, CBS
Clithris quercina, CBS
Cylindrocarpon radicicola, ATTC 11011
Cylindrocarpon didymum, CBS
Clavaria stricta, CBS
Cunninghamella blakesleeana, ATCC 8688b
Cunninghamella baineri, ATCC 6794b
Circinella angarensis, NRRL 2410, 2628
Cyathus poeppigii, CBS
Cylindrium suaveloens, CBS
Coprinus narcoticus, CBS
Curvularia lunata, ATCC 12017
Deconica atrorufa, CBS
Dermea balsamea, CBS
Endothia parasitica, ATCC 9414
Gongronella lacrispora, NRRL 2643
Guignardia bidwelli, ATCC 9559
Helminthosporium carbonum, ATCC 9627
Hysterium angustatum, CBS
Hypocrea rosellus, ATCC 6676
Mytilidion australe, CBS
Mytilidion kastenii, CBS
Mytilidion tortile, CBS
Norcardia corallina, ATCC 4273
Nocardia restrictus, CBS
Nocardia gardneri, ATCC 9604
Penicillium aurantiovirens
Pleurotus passeckerianus, ATCC 9416
Pholiota adiposa, ATCC 9393
Poria ambigua, ATCC 9408
Sphaeropsis visoi, CBS
Streptomyces mediocidicus, ATCC 13278
Zythia resinae, CBS
Septomyxa affinis, ATCC 6737
Penicillium atrovenetum, CBS
Sporotrichum sulfurescens, ATCC 7159
Aspergillus niger, ATCC 9142

In the same manner, other species of Subphylum 2 of Phylum III, for example, those listed in Table II, can be substituted for those listed above and give similar results but varying ratios of hydroxy compounds to oxo compounds as well as varying amounts of the different isomeric N-(hydroxycyclododecyl)acetamides and N-(oxocyclododecyl)acetamides.

EXAMPLE 65

Oxygenation of N-cyclododecylacetamide

A medium was prepared of 20 g. of cornsteep liquor (60% solids), 10 g. of commercial dextrose and 1 l. of tap water adjusted to a pH of between 4.8 and 5.0. One ml. of lard oil was added as an antifoam preventive. Ten l. of this sterilized medium was inoculated with a 72-hour vegetative growth of Sporotrichum sulfurescens, ATCC 7159, and incubated at a temperature of about 28° C. with aeration at the rate of 0.5 l. per minute and stirring at 300 r.p.m. After 24 to 48 hours, or when a moderate to heavy growth of mycelium was apparent, a solution of 2.5 g. of N-cyclododecylacetamide in 25 ml. of N,N-dimethylformamide was added to the fermentation. After an additional 72-hour period of incubation, the beer and cycelium were separated by filtration. The mycelium was washed with water and the wash water was added to the beer filtrate. The beer filtrate was then extracted 4 times with a volume of methylene chloride equal to about one-fourth the volume of the whole culture. The combined extracts were washed with one-fourth volume of distilled water and the solvent was removed by distillation. The residue thus obtained, containing a mixture of N-(oxocyclododecyl)acetamides and N-(hydroxycyclododecyl)acetamides as shown by chromatographic analysis, was chromatographed on Florisil and eluted with Skellysolve B containing increasing proportions of acetone. N-(6-oxocyclododecyl)acetamide was eluted by 25% acetone-Skellysolve B and N-(7-oxocyclododecyl)acetamide by 50% acetone-Skellysolve B and by acetone. The appropriate fractions were combined and rechromatographed as above giving two crops of N-(6-oxocyclododecyl)acetamide: 5.06 g., M.P. 143–148° C. and 3.23 g., M.P. 145–147° C.; and two crops of N-(7-oxocyclododecyl)acetamide: 1.53 g., M.P. 195–197° C. and 0.50 g., M.P. 191–193° C. A sample of N-(6-oxocyclododecyl)acetamide was recrystallized from acetone for analysis, M.P. 150.5–151.5° C.

Analysis.—Calcd. for $C_{14}H_{25}NO_2$: C, 70:25; H, 10.53. Found: C, 70.26; H, 10.49.

A sample of N-(7-oxocyclododecyl)acetamide was recrystallized from acetone for analysis, M.P. 196.5–198° C.

Analysis.—Calcd. for $C_{14}H_{25}NO_2$: C, 70.25; H, 10.53; N, 5.85. Found: C, 69.11; H, 10.35; N, 5.71.

EXAMPLE 66

Oxygenation of N-cyclododecylacetamide

The procedures of Example 65 were repeated, using the microorganism Rhizopus arrhizus, ATCC 11145, and 2 g of N-cyclododecylacetamide as the substrate to give a product shown by chromatographic analysis to be a mixture of oxygenated N-cyclododecylacetamides. This mixture was chromatographed on Florisil and eluted with Skellysolve B containing increasing proportions of acetone, giving N-(6-oxocyclododecyl)acetamide as the major components, identical to the products obtained in Example 65.

EXAMPLE 67

Oxygenation of N-cyclododecylacetamide

The bioconversion and extraction procedures of Example 65 were repeated, using the microorganism Cyathus poeppigii, CBS, and 3 g. of N-cyclododecylacetamide as the substrate to give a product shown by chromatographic analysis to be a mixture of oxygenated N-cyclododecylacetamides. This mixture was chromatographed on Florisil and eluted with 25 to 50% acetone-Skellysolve B giving in the earliest eluate fractions material containing N-(6-oxocyclododecyl)acetamide as the major component, followed by fractions containing increasing amounts of N-(7-oxocyclododecyl)acetamide, N-(6-hydroxycyclododecyl)acetamide and N-(7-hydroxycyclododecyl)acetamide, identical to the products obtained in Example 68.

Example 68

Oxygenation of N-cyclododecylamine

One-hundred and twenty-five liters of sterilized medium of the same composition as used in Example 2 were inoculated with a 72-hour vegetative growth of *Sporotrichum sulfurescens*, ATCC 7159, and incubated for 19 hours at a temperature of about 28° C. using an aeration rate of 7.5 l. of air per minute with stirring at 300 r.p.m. A solution of 25 g. of N-cyclododecylamine in 250 ml. of N,N-dimethylformamide was then added to the inoculated medium and after an additional 72-hour period of incubation, the beer was filtered through Celite. The cake was washed with 12.5 l. of water and the wash was pooled with the filtered beer. The cake was discarded. The filtered beer was extracted 4 times with 30 l. portions of methylene chloride. The combined extracts were washed with 30 l. of deionized water and then concentrated at reduced pressure to about 2% of the original volume. The concentrate was allowed to dry in air and the crystalline residue thus obtained was dissolved in a minimum volume (approximately 50 ml.) of methylene chloride and chromatographed on Florisil. Elution with 25% acetone-Skellysolve B afforded N-(6-oxocyclododecyl)acetamide in the early eluate fractions and mixtures of this material with N-(7-oxocyclododecyl)acetamide in the latter eluation fractions. Elution with 50% acetone-Skellysolve B afforded N-(7-oxocyclododecyl)acetamide in the early fractions and a mixture of N-(5-hydroxycyclododecyl)acetamide, N-(6-hydroxycyclododecyl)acetamide and N-(7-hydroxycyclododecyl)acetamide in the later eluate fractions.

Recrystallization of the N-(6-oxocyclododecyl)-acetamide fractions from acetone gave 3.20 g. of N-(6-oxocyclododecyl)acetamide, M.P. 143–145° C.

Recrystallization of the N-(7-oxocyclododecyl)acetamide fractions from acetone afforded 1.43 g. of N-(7-oxocyclododecyl)acetamide, M.P. 200–201° C.

The fractions containing mixed N-(hydroxycyclododecyl)acetamides were recrystallized from acetone to give 0.51 g. of product, M.P. 147–155° C. The infrared spectrum showed no cycloketone absorption. Oxidation of this mixture with chromic acid gave mixtures of N-(5-oxocyclododecyl)acetamide, N-(6-oxocyclododecyl)acetamide and N-(7-oxocyclododecyl)acetamide of which N-(5-oxocyclododecyl)acetamide was the major component. The bulk of the N-(7-oxocyclododecyl)acetamide was removed by crystallization from acetone and the mother liquor was chromatographed on Florisil to give N-(5-oxocyclododecyl)acetamide in the early 20% acetone-Skellysolve B eluates. Recrystallization from acetone-Skellysolve B and then from ether gave an analytical sample of N-(5-oxocyclododecyl)acetamide, M.P. 128–129° C.

*Analysis.*—Calcd. for $C_{14}H_{25}NO_2$: C, 70.25; H, 10.53; N, 5.85. Found: C, 70.60; H, 10.75; N, 6.19.

Example 69

Oxygenation of N-cyclododecylpropionamide

The bioconversion and extraction procedures of Example 65 were repeated using the same microorganism, *Sporotrichum sulfurescens*, ATCC 7159, and 2 g. of N-cyclododecylpropionamide as the substrate to give a product shown by chromatographic analysis to be a mixture of oxygenated N-cyclododecylpropionamides. The mixture thus obtained was chromatographed on Florisil giving as the major component 0.11 g. of N-(6-oxocyclododecyl)propionamide, M.P. 133.5–135° C., which after 2 recrystallizations from acetone-Skellysolve B melted at 138–139° C.

*Analysis.*—Calcd. for $C_{15}H_{27}NO$: C, 71.10; H, 10.74; N, 5.53. Found: C, 71.08; H, 10.56; N, 5.45.

Example 70

Oxygenation of N-cyclodecylacetamide

The bioconversion and extraction procedures of Example 65 were repeated using the same microorganism, *Sporotrichum sulfurescens*, ATCC 7159, and 2 g. of N-cyclodecylacetamide as the substrate to give a product shown by chromatographic analysis to be a mixture of oxygenated N-cyclododecylacetamides. The mixture thus obtained was chromatographed on Florisil to give a mixture of N-(oxocyclodecyl)acetamides, identified by infrared spectra, of which the major components were N-(6-oxocyclodecyl)acetamide and N-(5-oxocyclodecyl)acetamide; N-(6-oxocyclodecyl)acetamide was the predominant isomer.

Example 71

Oxygenation of N-cyclodecylacetamide

Following the bioconversion and extraction procedures of Example 64, N-cyclodecylacetamide was subjected to bioconversion by the microorganisms listed below. The bioconversion products thus obtained were assayed by gas chromatography and thin-layer chromatography as described in Example 64 and found to comprise a mixture of N-(oxocyclodecyl)acetamides and N-(hydroxycyclodecyl)acetamides, the major components being N-(5- and 6-hydroxycyclodecyl)acetamides and N-(5- and 6-oxocyclodecyl)acetamides.

*Cyathus poeppigii*, CBS
*Rhizopus arrhizus*, ATCC 11145
*Cunninghamella blakesleeana*, ATCC 8688a
*Deconica coprophila*, CBS
*Streptomyces roseochromogenus*, ATCC 3347

Example 72

Oxygenation of N-cyclopentadecylacetamide

The bioconversion and extraction procedures of Example 65 were repeated using the microorganism *Cyathus poeppigii*, CBS, and 2 g. of N-cyclopentyldecylacetamide as the substrate to give a product shown by chromatographic analysis to a mixture of oxygenated N-cyclopentadecylacetamides. The mixture thus obtained was chromatographed on Florisil to give about 800 mg. of a mixture of N-(oxocyclopentadecyl)acetamides, identified by infrared spectra, of which the major component was N-(6-oxocyclopentadecyl)acetamide.

Example 73

Oxygenation of N-cyclopentadecylacetamide

Following the bioconversion and extraction procedures of Example 64, N-cyclopentadecylacetamide was subjected to bioconversion by the microorganisms listed below. The bioconversion products thus obtained were assayed by gas chromatography and thin-layer chromatography as described in Example 64 and found to comprise a mixture of N-(oxocyclopentadecyl)acetamides and N-(hydroxycyclopentadecyl)acetamides, the major components being N-(6-, 7- and 8-oxocyclopentadecyl)acetamides and N-(6-, 7- and 8-oxocyclopentadecyl)acetamides.

*Rhizopus arrhizus*, ATCC 11145
*Deconica coprophila*, CBS
*Sporotrichum sulfurescens*, ATCC 7159

Example 74

Oxygenation of N-cyclohexylcyclohexanecarboxamide

The bioconversion and extraction procedures of Example 65 were repeated using the same microorganism, *Sporotrichum sulfurescens*, ATCC 7159, and 2 g. of N- cyclohexylcyclohexanecarboxamide as the substrate to give a product shown by chromatographic analysis to be a mixture of oxygenated N-cyclohexylcyclohexanecarboxamides. The mixture was dissolved in boiling acetone, filtered, and boiled down to 100 ml. volume. Cooling afforded 0.50 g. of crystalline N-(4-hydroxycyclohexyl)-cyclohexanecarboxamide, M.P. 226.5–227.5° C., as the major product.

*Analysis.*—Calcd. for $C_{13}H_{23}NO_2$: C, 69.29; H, 10.29; N, 6.22. Found: C, 69.63; H, 10.64; N, 6.00.

EXAMPLE 75

*Oxygenation of N-cyclohexylcyclohexanecarboxamide*

A medium was prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil was added as an antifoam preventive. 10 l. of this sterilized medium was inoculated with a 72-hour vegetative growth of *Mycobacterium rhodochrous*, ATCC 4273, and incubated for 48 hours at a temperature of about 28° C. with a rate of aeration of 0.5 l. per minute and stirring at 300 r.p.m. After 48 hours of incubation a solution of 2.5 g. of N-cyclohexylcyclohexanecarboxamide in 25 ml. of dimethylformamide was added to the fermentation. After an additional 72-hour period of incubation, the beer and mycelium were separated by filtration and extracted in the same manner as described in Example 65 give a product shown by chromatographic analysis to be a mixture of oxygenated N-cyclohexylcyclohexanecarboxamides. The mixture thus obtained was dissolved in boiling acetone, filtered, and boiled down to 100 ml. of volume. Cooling gave the major component, crystalline N-(4-hydroxycyclohexyl)-cyclohexanecarboxamide, identical to that obtained in Example 74.

EXAMPLE 76

*Oxygenation of N-cyclohexylbenzamide*

The bioconversion and extraction procedures of Example 65 were repeated using the microorganism *Sporotrichum sulfurescens*, ATCC 7159, and 2 g. of N-cyclohexylbenzamide as the substrate to give a residue shown by chromatographic analysis to be a mixture of oxygenated N-cyclohexylbenzamides. The product thus obtained was stirred with methylene chloride to give as the major component 0.46 g. of N-(4-hydroxycyclohexyl)-benzamide. The filtrate was chromatographed on Florisil, giving additional N-(4-hydroxycyclohexyl)benzamide. The combined product was recrystallized from acetone-Skellysolve B to give 0.64 g. of N-(4-hydroxycyclohexyl)-benzamide, M.P. 213.4–214° C.

*Analysis.*—Calcd. for $C_{13}H_{17}NO_2$: C, 71.20; H, 7.82; N, 6.39. Found: C, 70.83, H, 7.91; N, 6.47.

EXAMPLE 77

*Oxygenation of N-cyclohexylbenzamide*

The procedure of Example 75 was repeated, using the same substrate but substituting the microorganism *Rhizopus arrhizus*, ATCC 11145, for *Mycobacterium rhodochrous* to give a mixture of oxygenated N-cyclohexyl-benzamides of which the major component, N-(3-hydroxycyclohexyl)benzamide, was converted by oxidation with chromic acid to crystalline N-(3-oxocyclohexyl)-benzamide.

EXAMPLE 78

*Oxygenation of N-cycloheptylbenzamide*

The bioconversion and extraction procedures of Example 65 were repeated using the same microorganism, *Sporotrichum sulfurescens*, ATCC 7159, and 2 g. of N-cycloheptylbenzamide as the substrate. Chromatographic analysis showed that the product thus obtained was a mixture of N-(oxocycloheptyl)benzamides and N-(hydroxycycloheptyl)benzamides. This mixture was chromatographed on Florisil and eluted with Skellysolve B containing increasing proportions of acetone, giving as the major components N-(4-oxocycloheptyl)benzamide and N-(4-hydroxycycloheptyl)benzamide. The eluates containing primarily N-(4-hydroxycycloheptyl)benzamide were combined, evaporated to dryness, and the residue was oxidized with chromic acid. The thus obtained N-(4-oxocycloheptyl)benzamide was combined with that obtained directly from the fermentation and chromatographed on Florisil in the same manner, giving 0.98 g. of N-(4-oxocycloheptyl)benzamide which after recrystallization from acetone-Skellysolve B melted at 143–145° C. A sample of N-(4-oxocycloheptyl)benzamide, recrystallized from acetone-Skellysolve B for analysis, melted at 145–147° C.

*Analysis.*—Calcd. for $C_{14}H_{17}NO_2$: C, 72.70; H, 7.41; N, 6.06. Found: C, 72.42; H, 7.61; N, 6.05.

EXAMPLE 79

*Oxygenation of N,N-dicyclohexylbenzamide*

The bioconversion and extraction procedures of Example 65 were repeated on a larger scale, using 100 l. of sterilized medium of the same composition, the same microorganism, *Sporotrichum sulfurescens*, ATCC 7159, and 25 g. of N,N-dicyclohexylbenzamide as the substrate to give a residue shown by chromatographic analysis to be a mixture of oxygenated N,N-dicyclohexylbenzamides. This residue was chromatographed on Florisil and eluted with Skellysolve B containing increasing proportions of acetone to give 11 g. of the major component, N-cyclohexyl-N-(4-hydroxycyclohexyl)benzamide, which was recrystallized from acetone-Skellysolve B to give 9.57 g., melting at 160–163° C. A sample of N-cyclohexyl-N-(4-hydroxycyclohexyl)benzamide recrystallized from the same solvents for analysis melted at 161–163° C.

*Analysis.*—Calcd. for $C_{19}H_{27}NO_2$: C, 75.71; H, 9.03; N, 4.65. Found: C, 76.74; H, 10.57; N, 4.22.

Elution of the Florisil column with acetone gave 10.59 g. of crude N,N-bis-(4-hydroxycyclohexyl)benzamide which was recrystallized from acetone-Skellysolve B to give 6.39 g. melting at 185–187° C. Several recrystallizations from the same solvent pair gave an analytical sample of N,N-bis-(4-hydroxycyclohexyl)benzamide, M.P. 196–198° C.

*Analysis.*—Calcd. for $C_{19}H_{27}NO_3$: C, 71.89; H, 8.57; N, 4.41. Found: C, 72.21; H, 8.84; N, 4.71.

EXAMPLE 80

*Oxygenation of N,N-dicyclohexylacetamide*

The bioconversion and extraction procedures of Example 68 were carried out using the same microorganism, *Sporotrichum sulfurescens*, ATCC 7159, and 25 g. of N,N-dicyclohexylacetamide as the substrate to give a product which was shown by chromatographic analysis to be a mixture of oxygenated N,N-dicyclohexylacetamides of which the major component was N-cyclohexyl-N-(4-hydroxycyclohexyl)acetamide. The mixture was dissolved in boiling acetone, filtered hot, concentrated to 225 ml. volume and then refrigerated for 2 hours. The precipitated product thus obtained was recovered by filtration, washed with 2–10 ml. portions of ice-cold acetone and recrystallized from acetone to give 7.85 g. of N-cyclohexyl-N-(4-hydroxycyclohexyl)acetamide, M.P. 172–173.5° C.; for analysis a sample was twice recrystallized from acetone to M.P. 177–178° C.

*Analysis.*—Calcd. for $C_{14}H_{25}NO_2$: C, 70.25; H, 10.53; N, 5.85. Found: C, 70.19; H, 10.27; N, 5.52.

EXAMPLE 81

*Oxygenation of N,N-dicyclohexylacetamide*

The bioconversion and extraction procedures of Example 65 were repeated using the microorganism *Calonectria decora*, CBS, and 2.5 g. of N,N-dicyclohexylacetamide as the substrate to give a product shown by chromatographic analysis to be a mixture of oxygenated N,N-dicyclohexylacetamides of which the major component was N-cyclohexyl - N - (4 - hydroxycyclohexylacetamide). The mixture was chromatographed on Florisil and eluted with Skellysolve B containing increasing proportions of acetone to give 1.14 g. of N-cyclohexyl-N-(4-hydroxycyclohexyl)acetamide, identical to the product obtained in Example 80.

EXAMPLE 82

*Oxygenation of N,N-dicyclohexylacetamide*

A medium was prepared of 50 g. of cornsteep liquor (60% solids), 200 g. of commercial lactalbumin digest (Edamine), 500 g. of commercial dextrose and 10 l. of tap water adjusted to a pH of between 4.8 and 5.0. This sterilized medium was inoculated with a 72-hour vegetative growth of *Rhizopus arrhizus*, and incubated for 24 hours at a temperature of about 28° C. with aeration at a rate of 0.5 l. per minute and stirring at 300 r.p.m. A solution of 5.0 g. of N,N-dicyclohexylacetamide in 15 ml. of N,N-dimethylformamide was then added to the fermentation. After an additional 72-hour period of incubation, oxygenated product was extracted in the same manner as disclosed in Example 64 which chromatographic analysis showed to be a mixture of the same oxygenated products as obtained in Example 81. This product was chromatographed on Florisil and eluted with Skellysolve B containing increasing proportions of acetone giving in the 25% acetone-Skellysolve B eluates N-cyclohexyl-N-(3-hydroxycyclohexyl)acetamide. Recrystallization from acetone gave 3.24 g. of N-cyclohexyl-N-(3-hydroxycyclohexyl)acetamide, M.P. 152–154° C. which after another recrystallization from acetone melted at 155–158° C.

*Analysis.*—Calcd. for $C_{14}H_{25}NO_2$: C, 70.25; H, 10.53; N, 5.85. Found: C, 70.18; H, 10.73; N, 5.77.

EXAMPLE 83

*Oxygenation of N,N-dicycloheptylacetamide*

The bioconversion and extraction procedures of Example 65 were repeated using the same microorganism, *Sporotrichum sulfurescens*, ATCC 7159, and 2.5 g. of N,N-dicycloheptylacetamide as the substrate to give a product shown by chromatographic analysis to be a mixture of oxygenated N,N-dicycloheptylacetamides of which the major component was N-cycloheptyl-N-(4-hydroxycycloheptyl)acetamide. The mixture was chromatographed on Florisil. Elution by the gradient method starting with Skellysolve B followed by Skellysolve B containing increasing proportions of acetone from 0 to 30% gave 0.914 g. of N-cycloheptyl-N-(4-hydroxycycloheptyl)acetamide which was oxidized with chromic acid to give 0.43 g. of N-cycloheptyl - N - (4-oxocycloheptyl)acetamide, M.P. 99–101° C. which after treatment with activated charcoal in acetone and recrystallization from acetone-Skellysolve B melted at 106–108° C.

*Analysis.*—Calcd. for $C_{16}H_{27}NO_2$: C, 72.41; H, 10.26; N, 5.28. Found: C, 72.29; H, 10.49; N, 5.51.

EXAMPLE 84

*Oxygenation of N-cyclohexyl-N-cyclopentylacetamide*

The bioconversion and extraction procedures of Example 65 were carried out on a larger scale using 100 liters of the sterilized medium of the same composition, the same microorganism, *Sporotrichum sulfurescens*, ATCC 7159, and 15 g. of N-cyclohexyl-N-cyclopentylacetamide as the substrate to give a product shown by chromatographic analysis to be a mixture of oxygenated N-cyclohexyl-N-cyclopentylacetamides of which the major component was N-cyclopentyl-N-(4-hydroxycyclohexyl)acetamide. The product thus obtained was chromatographed on Florisil and eluted by the gradient method using 10 l. of Skellysolve B containing increasing proportions of acetone from 0 to 30%. The fractions containing the desired product were combined, dissolved in methylene chloride, concentrated to a small volume and diluted with ether while concentrating until a heavy precipitate separated. The mixture was chilled and the product was isolated by filtration, washed with cold ether, and dried; the yield of N-cyclopentyl-N-(4-hydroxycyclohexyl)acetamide was 5.99 g., M.P. 144–146° C.

*Analysis.*—Calcd. for $C_{13}H_{23}NO_2$: C, 69.29; H, 10.29; N, 6.22. Found: C, 69.21; H, 10.18; N, 6.37.

EXAMPLE 85

*Oxygenation of N-cycloheptyl-N-cyclohexylacetamide*

The bioconversion and extraction procedures of Example 65 were repeated using the same microogranism, *Sporotrichum sulfurescens*, ATCC 7159, and 2 g. of N-cycloheptyl-N-cyclohexylacetamide as the substrate to give a product shown by chromatographic analysis to be a mixture of oxygenated N-cycloheptyl-N-cyclohexylacetamides. The product thus obtained was chromatographed on Florisil and developed by the gradient method using Skellysolve B containing increasing proportions of acetone from 0 to 25%. The eluate fractions containing N-cyclohexyl - N - (4-hydroxycycloheptyl)acetamide were combined and evaporated to dryness. The oily residue thus obtained was dissolved in 25 ml. of acetone. A portion of this solution was oxidized by treating dropwise with an excess of chromic acid (Jones' reagent). After standing at room temperature for 10 minutes, the mixture was diluted with water, extracted 4 times with 30 ml. portions of methylene chloride-ether (3:1). The extract was washed once with water and dried over anhydrous sodium sulfate, and the solvent was removed to give an oil (Paper gram analysis showed this to be essentially one product with minor traces of impurities). The oil thus obtained was chromatographed on Florisil; elution with Skellysolve B containing increasing proportions of acetone gave N-cyclohexyl-N-(4-oxocycloheptyl)acetamide as an oil which crystallized on standing, M.P. 76–79° C. Recrystallization from Skellysolve B gave N-cyclohexyl-N-(4-oxocycloheptyl)acetamide, M.P. 80–82° C.

*Analysis.*—Calcd. for $C_{15}H_{25}NO_2$: C, 71.67; H, 10.03; N, 5.57. Found: C, 71.90; H, 10.04; N, 5.76.

The 2,4-dinitrophenylhydrazone derivative was prepared, M.P. 221–223° C.

*Analyis.*—Calcd. for $C_{21}H_{29}N_5O_5$: C, 58.45; H, 6.77; N, 16.23. Found: C, 58.25; H, 6.39; N, 16.49.

EXAMPLE 86

*Bioconversion of N-cyclohexyl-N-cyclooctylacetamide*

The bioconversion and extraction procedures of Example 65 were repeated using the microorganism, *Sporotrichum sulfurescens*, ATCC 7159, and 5 g. of N-cyclohexyl-N-cyclooctylacetamide as the substrate. Paper chromatography and gas chromatography of the product showed the presence of three hydroxylated N-cyclohexyl-N-cyclooctylacetamides. Oxidation of the mixture of hydroxy compounds with chromic acid and chromatography on Florisil afforded two ketones. The less polar ketone, N-cyclohexyl - N - (5 - oxocyclooctyl)acetamide, was obtained as an oil. The more polar ketone, N-cyclohexyl-N-(4-oxocyclooctyl)acetamide, was recrystallized from ether, M.P. 87–88° C.

*Analysis.*—Calcd. for $C_{16}H_{27}NO_2$: C, 72.41; H, 10.26; N, 5.28. Found: C, 72.13; H, 10.51; N, 5.28.

EXAMPLE 87

*Oxygenation of benzyl cyclohexylcarbamate*

The bioconversion and extraction procedures of Example 65 were repeated using the same microorganism, *Sporotrichum sulfurescens*, ATCC 7159, and 2.0 g. of benzyl cyclohexylcarbamate as the substrate to give a product shown by chromatographic analysis to contain a mixture of oxygenated benzyl cyclohexylcarbamates of which the major component was benzyl 4-hydroxycyclohexylcarbamate. The mixture thus obtained was dissolved in 200 ml. of methylene chloride and chromatographed on 100 g. of Florisil. The column was developed with Skellysolve B containing increasing proportions of acetone from 5% to 35%. The residue from the fractions containing primarily the major component was recrystallized from acetone-Skellysolve B to yield 0.56 g. of benzyl 4-hydroxycyclohexylcarbamate, M.P. 161° C.

EXAMPLE 88

Oxygenation of benzyl cycloheptylcarbamate

The bioconversion and extraction procedures of Example 65 were repeated using the same microorganism, *Sporotrichum sulfurescens*, ATCC 7159, and 2.0 g. of benzyl cycloheptylcarbamate as the substrate to give a product shown by chromatographic analysis to be a mixture of oxygenated benzyl cycloheptylcarbamates. The major components of the mixture thus obtained were recovered by chromatography on Florisil and elution with Skellysolve B containing increasing proportions of acetone. Unchanged benzyl cycloheptylcarbamate was eluted first, followed by benzyl 4-oxocycloheptylcarbamate and then by benzyl 4-hydroxycycloheptylcarbamate, both of which were obtained as oils.

EXAMPLE 89

Oxygenation of N-cyclohexyl-p-toluenesulfonamide

The bioconversion and extraction procedures of Example 65 were repeated using the same microorganism *Sporotrichum sulfurescens*, ATCC 7159, and 2 g. of N-cyclohexyl-p-toluenesulfonamide as the substrate to give a product shown by chromatographic analysis to be a mixture of oxygenated N-cyclohexyl-p-toluenesulfonamides of which the major component was N-(4-hydroxycyclohexyl)-p-toluenesulfonamide. The mixture thus obtained was chromatographed on Florisil and developed with Skellysolve B containing increasing proportions of acetone from 0% to 30%. The major component, N-(4-hydroxycyclohexyl)-p-toluenesulfonamide, was eluted as an oil which was oxidized with chromic acid to give 0.627 g. of N-(4-oxocyclohexyl)-p-toluenesulfonamide, M.P. 111–112° C.; a sample crystallized from ether melted at 116–117° C.

*Analysis.*—Calcd. for $C_{13}H_{17}NO_3S$: C, 58.40; H, 6.41; N, 5.24; S, 12.00. Found: C, 58.53; H, 6.63; N, 5.00; S, 12.06.

EXAMPLE 90

Oxygenation of N-cycloheptyl-p-toluenesulfonamide

The bioconversion and extraction procedures of Example 65 were repeated using the same microorganism, *Sporotrichum sulfurescens*, ATCC 7159, and 2 g. of N-cycloheptyl-p-toluenesulfonamide as the substrate to give a product shown by chromatographic analysis to be a mixture of N-(oxocycloheptyl)-p-toluenesulfonamides and N-(hydroxycycloheptyl)-p-toluenesulfonamides, the major components of which were oxygenated at the 4-position. The mixture thus obtained was chromatographed on Florisil and eluted by gradient elution with Skellysolve B containing increasing proportions of acetone from 0% to 30%, giving A. 0.287 g. of N-(4-oxocycloheptyl)-p-toluenesulfonamide B. 0.628 g. of a mixture of N-(4-oxocycloheptyl)-p-toluenesulfonamide and N-(4-hydroxycycloheptyl)-p-toluenesulfonamide and C. 0.455 g. of N-(4-hydroxycycloheptyl)-p-toluenesulfonamide.

(B) and (C) were combined and oxidized with chromic acid to yield ca. 0.80 g. of N-(4-oxocycloheptyl)-p-toluenesulfonamide, which on recrystallization from ether melted at 110–112° C.

*Analysis.*—Calcd. for $C_{14}H_{19}NO_3S$: C, 59.75; H, 6.81; N, 4.98; S, 11.40. Found: C, 59.80; H, 6.94; N, 4.80; S, 11.36.

In Examples 65–90, inclusive, above, other species of microorganisms of Subphylum 2 of Phylum III, for example, those species listed in Table II, can be substituted in place of the organism used in each of the said examples to give the same microbially oxygenated products in each but differing in the relative amounts of the various oxygenated products produced. The bioconversion procedure of Example 75 is preferred for species of the class Schizomycetes. The following microorganisms are representative:

*Chaetomium globosum*, ATCC 6205
*Gloniopsis brerisaccata*, CBS
*Hypomyces haematococcus*, CBS
*Boletus luteus*, CBS
*Cyathus olla*, CBS
*Sphaerobolus stellatus*, NRRL 2922
*Cladosporium resinae*, NRRL 2778
*Brachysporium oryzae*, ATCC 11571
*Keratinomyces ajelloi*, CBS
*Rhizoctonia microsclerotia*, ATCC 10187
*Achlya bisexualis*, ATCC 10977
*Circinella spinosa*, ATCC 9025
*Ascochyta linicola*, NRRL 2923
*Mucor griseocyanus*, ATCC 1207a
*Micrococcus flavoroseus*, ATCC 397
*Corynebacterium fascians*, ATCC 12974
*Pseudomonas aeruginosa*, ATCC 8689

In the same manner as described in Examples 64 to 90, inclusive, above, other acyl derivatives of cycloalkylamines, for example, the N-cycloalkylamides, N,N-dicycloalkylamides, aralkyl cycloalkylcarbamates and aralkyl dicycloalkylcarbamates, such as those prepared and named in Preparations 10–19, above, can likewise be microbially oxygenated using a species of Subphylum 2 of Phylum III, e.g., those listed in Table II, to give the corresponding oxygenated products.

The following conversions using representative species and showing the major products produced are typical:

N-cyclooctylacetamide with *Wojnowicia graminis*, CBS, to N-(5- and 6-hydroxycyclooctyl)acetamide and N-(5- and 6-oxocyclooctyl)acetamides;

N-cyclohexylpropionamide with *Gibberella saubinettii*, CBS, to N-(3- and 4-hydroxycyclohexyl)propionamides and N-(3- and 4-oxocyclohexyl)propionamides;

N-cyclohexylbutyramide with Boletus sp., Peck 168 (Ohio State University) to N-(3- and 4-hydroxycyclohexyl) butyramides and N-(3- and 4-oxocyclohexyl) butyramides.

EXAMPLE 91

Oxygenation of 1-(p-tolylsulfonyl)-3-cycloheptylurea

A medium was prepared of 10 g. of cornsteep liquor (60% solids), 5 g. of commercial dextrose and 1 l. of tap water and adjusted to a pH of 4.84. One hundred twenty-five liters of this medium was sterilized and inoculated with a 74-hour vegetative growth of *Sporotrichum sulfurescens*, ATCC 7159, and incubated at a temperature of about 28° C. with aeration at the rate of 7.5 l. per minute and stirring at 300 r.p.m. After 19 hours, or when a moderate to heavy growth of mycelium was apparent, a solution of 25 g. of 1-(p-tolylsulfonyl)-3-cycloheptylurea in 150 ml. of N,N-dimethylformamide was added to the fermentation. After an additional 72-hour period of incubation, the whole beer was filtered and the filtered beer was adjusted to pH 1 by addition of concentrated sulfuric acid, and extracted 4 times with a volume of methylene chloride equal to about one-fourth the volume of the filtered beer. The combined extracts were washed with one-fourth volume of distilled water and the solvent was removed by distillation to give a mixture of oxygenated 1-(p-tolylsulfonyl)-3-cycloheptylureas, the major component of which was 1-(p-tolylsulfonyl)-3-(4-hydroxycycloheptyl)urea. Other components were 1-(p - tolylsulfonyl)-3-(3 - hydroxycycloheptyl)urea, 1-(p-tolylsulfonyl-3-(4-oxocycloheptyl)urea and 1-(p-tolylsulfonyl)-3-(3-oxocycloheptyl)urea. The mixture thus obtained was chromatographed on silica gel packed as an ethyl acetate slurry. Development of the column was with 0.3% acetic acid in ethyl acetate. Eluate fractions of 335 ml. volume were collected and analyzed by thin-layer chromatography on silica gel. The fractions containing 1-(p-tolylsulfonyl)-3-(4-hydroxycycloheptyl)urea were combined and the solvent was evaporated. The residue thus obtained was stirred with ethyl acetate to give 4.45 g. of a mixture of the cis and trans forms of 1-(p-tolylsulfonyl)-3-(4-hydroxycycloheptyl)urea, M.P. 116–123° C. The pure trans isomer was obtained by recrystallization of the mixture from ethyl acetate-Skellysolve B (isomeric hexanes hereinafter referred to as Skellysolve B), M.P. 134–136° C.

Analysis.—Calcd. for $C_{15}H_{22}N_2O_4S$: C, 55.2; H, 6.8; N, 8.6; S, 9.8. Found: C, 55.2; H, 7.1; N, 8.4; S, 9.9.

The cis isomer was isolated from the mixture by recrystallization from acetone-Skellysolve B, M.P. 178–180° C.

Analysis.—Calcd. for $C_{15}H_{22}N_2O_4S$: C, 55.2; H, 6.8; N, 8.6; S, 9.8; O, 19.6. Found: C, 55.6; H, 6.4; N, 8.3; S, 9.7; O, 20.0.

EXAMPLE 92

*Oxygenation of 1-(p-tolylsulfonyl)-3-cyclopentylurea*

The procedures of Example 91 were repeated using 10 l. of sterilized medium of the same composition, 2 g. of 1-(p-tolylsulfonyl)-3-cyclopentylurea as the substrate and a rate of aeration of 0.5 l. of air per minute. The residues from each of the eluate fractions thus obtained were assayed by thin-layer chromatography and found to be comprised chiefly of two components which were designated A and B. The fractions comprised essentially of component A were triturated with ethyl acetate to give 0.30 g. of 1 - (p - tolylsulfonyl)-3-(3-cis-hydroxycyclopentyl)urea, M.P. 153–156° C.

The fractions comprised essentially of component B were combined and triturated with ethyl acetate to give 0.14 g. of 1-(p-tolylsulfonyl)-3-(3-trans-hydroxycyclopentyl)urea, M.P. 137–141° C.

EXAMPLE 93

*Oxygenation of 1-(p-acetylbenzenesulfonyl)-3-cyclohexylurea*

The procedures of Example 91 were repeated as in Example 92 using 2 g. of 1-(p-acetylbenzenesulfonyl)-3-cyclohexylurea as the substrate to give 1-(p-acetylbenzenesulfonyl)-3-(4-hydroxycyclohexyl)urea as the major product and 1-(p-acetylbenzenesulfonyl)-3-(3-hydroxycyclohexyl)urea as the minor product. The eluate fractions containing the bulk of the bioconversion product were combined and recrystallized from acetone-Skellysolve B to give 0.31 g. of 1-(p-acetylbenzenesulfonyl)-3-(4-hydroxycyclohexyl)urea, M.P. 170–173° C.

1 - (p-acetylbenzenesulfonyl)-3-(3-hydroxycyclohexyl)urea can be isolated from the mother liquor by additional chromatography.

EXAMPLE 94

*Oxygenation of 1-(p-tolylsulfonyl)-3-cyclododecylurea*

The bioconversion and extraction procedures of Example 91 were repeated using 10 l. of sterilized medium of the same composition, 2 g. of 1-(p-tolylsulfonyl)-3-cyclododecylurea as the substrate, a rate of aeration of 0.5 l. per minute and stirring at 200 r.p.m. The product thus obtained was assayed by paper strip chromatography and found to consist of a mixture of oxygenated 1-(p-tolylsulfonyl)-3-cyclododecylureas of which the major components were 1-(p-tolylsulfonyl)-3-(5-hydroxycyclododecyl)urea, 1-(p-tolylsulfonyl)-3-(6-hydroxycyclododecyl)urea and 1-(p-tolylsulfonyl)-3-(7-hydroxycyclododecyl)urea.

EXAMPLE 95

*Oxygenation of 1-(p-tolylsulfonyl)-3-cyclohexylurea*

Following the procedures of Example 91 and substituting 1-(p-tolylsulfonyl)-3-cyclohexylurea for 1-(p-tolylsulfonyl)-3-cycloheptylurea and *Rhizopus arrhizus*, ATCC 11145, in place of *Sporotrichum sulfurescens* is productive of 1-(p-tolylsulfonyl)-3-(4-hydroxycyclohexyl)urea and 1 - (p - tolylsulfonyl)-3-(3-hydroxycyclohexyl)urea which can be separated by chromatography.

In the same manner following the procedure of Example 91 other 1-arylsulfonyl-3-cycloalkylureas are likewise oxygenated on the cycloalkane ring with a species of microorganism of Subphylum 2 of Phylum III, for example, those species listed in Table II above, to produce the corresponding oxygenated compounds. The following conversions showing the major products produced in each are representative:

1 - (m - ethoxybenzenesulfonyl) - 3 - cyclopentylurea using *Cladosporium resinae*, NRRL 2728, to give 1-(m-ethoxybenzenesulfonyl) - 3 - (3 - hydroxycyclopentyl) urea;

1-(o-butylbenzene-sulfonyl)-3-cyclopentylurea using *Circinella angarensis*, NRRL 2628, to give 1-(o-butylbenzenesulfonyl)-3-(3-hydroxycyclopentyl)urea;

1-(p-chlorobenzenesulfonyl)-3-cyclopentylurea using *Absidia glauca*, ATCC 7852a, to give 1-(p-chlorobenzenesulfonyl)-3-(3-hydroxycyclopentyl)urea;

1-(o-butylbenzenesulfonyl)-3-cycloheptylurea using *Gongronella butleri*, CBS, to give 1-(o-butylbenzenesulfonyl)-3-(4-hydroxycycloheptyl)urea and 1-(o-butylbenzenesulfonyl)-3-(3-hydroxycycloheptyl)urea;

1-(p-chlorobenzenesulfonyl)-3-cycloheptylurea using *Cunninghamella blakesleeana*, ATCC 8688a, to give 1-(p-chlorobenzenesulfonyl) - 3 - (4 - hydroxycycloheptyl) urea and 1-(p-chlorobenzenesulfonyl)-3-(3-hydroxycycloheptyl)urea;

1-(3,4-xylylsulfonyl)-3-cycloheptylurea using *Endothia parasiticus*, ATCC 9414, to give 1-(3,4-xylylsulfonyl)--3-(4-hydroxycycloheptyl)urea and 1-(3,4-xylylsulfonyl)-3-(3-hydroxycycloheptyl)urea;

1-benzenesulfonyl-3-cyclohexylurea using *Guignardia bidwelli*, ATCC 9559, to give 1-benzenesulfonyl-3-(4-hydroxycyclohexyl)urea and 1-benzenesulfonyl-3-(3-hydroxycyclohexyl)urea;

1-(m-tolylsulfonyl)-3-cyclohexylurea using *Calonectria decora*, CBS, to give 1-(m-tolylsulfonyl)-3-(4-hydroxycyclohexyl)urea and 1-(m-tolylsulfonyl)-3-(3-hydroxycyclohexyl)urea;

1-(2,4-xylylsulfonyl)-3-cyclohexylurea using *Chaetomium globosum*, ATCC 6205, to give 1-(2,4-xylylsulfonyl)-3-(4-hydroxycyclohexyl)urea and 1-(2,4-xylylsulfonyl)-3-(3-hydroxycyclohexyl)urea;

1-(p-isopropylbenzenesulfonyl)-3-cyclohexylurea using *Corticum sasakii*, NRRL 2705, to give 1-(p-isopropylbenzenesulfonyl)-3-(4-hydroxycyclohexyl)urea and 1-(p-isopropylbenzenesulfonyl)-3-(3-hydroxycyclohexyl)urea;

1-(p-bromobenzenesulfonyl)-3-cyclooctylurea using *Deconica coprophila*, CBS, to give 1-(p-bromobenzenesulfonyl) - 3 - (5 - hydroxycyclooctyl)urea, 1 - (p - bromobenzenesulfonyl)-3-(4-hydroxycyclooctyl)urea and 1-(p - bromobenzenesulfonyl) - 3 - (3 - hydroxycyclooctyl)urea;

1 - (m - methoxybenzenesulfonyl) - 3 - cyclooctylurea using *Cyathus poeppigii*, CBS, to give 1-(m-methoxybenzenesulfonyl) - 3 - (5 - hydroxycyclooctyl)urea, 1 - (m-methoxybenzenesulfonyl)-3-(4-hydroxycyclooctyl)urea and 1 - (m - methoxybenzenesulfonyl) - 3 - (3 - hydroxycyclooctyl)urea;

1-(3,4-diethylbenzenesulfonyl)-3-cyclooctylurea using *Aspergillus niger*, ATCC 9027, to give 1-(3,4-diethylbenzenesulfonyl)-3-(5-hydroxycyclooctyl)urea, 1-(3,4-diethylbenzenesulfonyl) - 3 - (4 - hydroxycyclooctyl)urea and 1 - (3,4-diethylbenzenesulfonyl) - 3 - (3 - hydroxycyclooctyl)urea;

1-(3-butyrylbenzenesulfonyl)-3-cyclononylurea using *Septomyxa affinis*, ATCC 6737, to give 1-(3-butyrylbenzenesulfonyl)-3-(5-hydroxycyclononyl)urea, 1-(3-butyrylbenzenesulfonyl) - 3 - (4 - hydroxycyclononyl)urea and 1-(3-butyrylbenzenesulfonyl)-3-(3-hydroxycyclononyl)urea;

1-(p-ethylbenzenesulfonyl)-3-cyclononylurea using *Curvularia lunata*, ATCC 12,017, to give 1-(p-ethylbenzenesulfonyl)-3-(5-hydroxynonlyl)urea, 1-(p-ethylbenzenesulfonyl)-3-(4-hydroxynonyl)urea and 1-(p-ethylbenzenesulfonyl)-3-(3-hydroxynonyl)urea;

1 - (p - hexyloxybenzenesulfonyl) - 3- cyclononylurea using *Cylindrocarpon radicola*, ATCC 1101, to give 1-p-hexyloxybenzenesulfonyl) - 3 - (5 - hydroxycyclononyl)urea, 1-(p-hexyloxybenzenesulfonyl)-3-(4-hyroxycyclononyl)urea and 1-(p-hexyloxybenzenesulfonyl)-3-(3-hydroxycyclononyl)urea;

1-(2,4-dichlorobenzenesulfonyl)-3-cyclodecylurea using *Wojnowicia graminis*, CBS, to give 1-(2,4-dichlorobenzenesulfonyl) - 3 - (5 - hydroxycyclodecyl)urea, 1-(2,4-dichlorobenzenesulfonyl)-3-(4-hydroxycyclodecyl)urea and 1 - (2,4 - dichlorobenzenesulfonyl) - 3 - (3-hydroxycyclodecyl)urea;

1-benzenesulfonyl-3-cycloundecylurea using *Penicillium patulum*, ATCC 9260, to give 1-benzene-sulfonyl-3-(6-hydroxycycloundecyl)urea, 1-benzenesulfonyl-3-(5-hydroxycycloundecyl)urea and 1-benzenesulfonyl-3-(4-hydroxycycloundecyl)urea;

and 1-(m-chlorobenzenesulfonyl)-3-cyclododecylurea using *Ascochyta linicola*, NRRL 2923, to give 1-(m-chlorobenzenesulfonyl) - 3 - (7 - hydroxycyclododecyl)urea, 1-(m-chlorobenzenesulfonyl)-3-(6-hydroxycyclododecyl)urea and 1-(m-chlorobenzenesulfonyl)-3-(5-hydroxycyclododecyl)urea.

When species of the class Schizomycetes are employed in the procedures of Example 91, a pH of about 7 is preferably maintained during the bioconversion. The following conversions showing the major products produced in each are representative:

1-(o-tolylsulfonyl)-3-cyclohexylurea using *Nocardia corallina*, ATCC 4273, to give 1-(o-tolylsulfonyl)-3-(4-hydroxycyclohexyl)urea and 1-(o-tolylsulfonyl)-3-(3-hydroxycyclohexyl)urea;

1-(2,3-diacetylbenzenesulfonyl)-3-cycloheptylurea using *Pseudomonas aeruginosa*, ATCC 8689, to give 1-(2,3-diacetylbenzenesulfonyl) - 3 - (4 - hydroxycycloheptyl)urea and 1-(2,3-diacetylbenzenesulfonyl)-3-(3-hydroxycycloheptyl)urea.

EXAMPLE 96

*Oxygenation of 1-(3,4-dichlorobenzenesulfonyl)-3-cycloheptylurea*

A medium is prepared of 1.5 g. of beef extract, 1.5 g. of yeast extract, 5 g. of peptone, 1.0 g. of dextrose, 3.5 g. of sodium chloride, 3.58 g. of dipotassium phosphate, 1.32 g. of monopotassium phosphate, and 1 liter of tap water and adjusted to about pH 7. One ml. of lard oil is added as a foam preventive. Ten l. of this sterilized medium is inoculated with a 72-hour vegetative growth of *Mycobacterium rhodochrous*, ATCC 4276, and incubated for 48 hours at a temperature of about 28° C. with aeration at the rate of 0.5 l. per minute and stirring at 300 r.p.m. At the end of this period, a solution of 2.5 g. of 1-(3,4-dichlorobenzenesulfonyl)-3-cycloheptylurea in 25 ml. of dimethylformamide is added to the inoculated medium. After an additional 72-hour period of incubation, the beer and mycelium are separated by filtration and extracted in the same manner as described in Example 91 to give a residue containing a mixture of microbially oxygenated 1-(3,4-dichlorobenzenesulfonyl)-3-cycloheptylureas of which the major components are 1-(3,4-dichlorobenzenesulfonyl)-3-(4-hydroxycycloheptyl)urea and 1-(3,4 - dichlorobenzenesulfonyl) - 3- (3 - hydroxycycloheptyl)urea. The oxygenated products are separated by chromatography and purified by recrystallization.

In the manner following the procedure of Examples 91–96, 1-arylsulfonyl-3-cycloalkylureas can be microbially oxygenated using a species of Subphyllum 2 of Phylum III, for example, those species listed in Table II above, to give as the major components the corresponding 1-arylsulfonyl-3-(hydroxycycloalkyl)ureas. The procedure of Example 96 is preferred for species of the class Schizomycetes.

The following species are typical:

*Adelopus nudus*, CBS
*Gloniopsis brerisaccata*, CBS
*Glonium stellatum*, CBS
*Hysterium angustatum*, CBS
*Mytillidion kastenii*, CBS
*Gibberella saubinettii*, CBS
*Hypomyces haematococcus*, CBS
*Dermea balsama*, CBS
*Cenangium abietus*, CBS
Boletus sp. Peck 168 (Ohio State Univ.)
*Alnicola escharoides*, CBS
*Corticium microsclerotia*, NRRL 2727
*Sphaerobolus stellatus*, NRRL 2922
*Diplodia natalensis*, ATCC 9055
*Keratinomyces ajelloi*, CBS
*Trichothecium roseum*, NRRL 1665
*Brachysporium oryzae*, ATCC 11571
*Rhizoctonia solani* ATCC 6221
*Achlya americana*, ATCC 10977
*Mucor griseocyanus*, ATCC 1207a
*Rhizopus nigrincans*, ATCC 11145
*Micrococcus cerolyticus*, ATCC 12559
*Streptomyces olivaceus*, ATCC 12019 and the like.

EXAMPLE 97

*Oxygenation of cyclohexylmethyl N-methylcarbamate*

The bioconversion and extraction procedures of Example 91 were repeated using 10 l. of sterilized medium of the same composition, the microorganism *Sporotrichum sulfurescens*, ATCC 7159, and 1 g. of cyclohexylmethyl N-methylcarbamate as the substrate to give a product shown by chromatographic analysis to be a mixture of oxygenated cyclohexylmethyl N-methylcarbamates, the major component of which was 4-hydroxycyclohexylmethyl N-methylcarbamate. This mixture was chromatographed on Florisil and eluted with Skellysolve B containing increasing proportions of acetone. The product eluted with 25% acetone-Skellysolve B was recrystallized from acetone-Skellysolve B to give 0.16 g. of 4-hydroxycyclohexylmethyl N-methylcarbamate, M.P. 106–108° C., which after two additional recrystallizations from the same solvent combination melted at 107–107.5° C.

*Analysis.*—Calcd. for $C_9H_{17}NO_3$: C, 57.73; H, 9.15; N, 7.48. Found: C, 57.71; H, 9.10; N, 7.24.

EXAMPLE 98

*Oxygenation of cyclohexylmethyl N-methylcarbamate*

The bioconversion and extraction procedures of Example 91 were repeated using 10 l. of sterilized medium of the same composition, the microorganism *Rhizopus arrhizus*, ATCC 11145, and 1 g. of cyclohexylmethyl N-methylcarbamate as the substrate to give a product shown by chromatographic analysis to be a mixture of oxygenated cyclohexylmethyl N-methylcarbamates, the major components of which were 4-hydroxycyclohexylmethyl N-methylcarbamate and 3-hydroxycyclohexylmethyl N- methylcarbamate. This mixture was chromatographed on Florisil and eluted with Skellylsolve B containing increasing proportions of acetone to give 0.05 g. of 3-hydroxycyclohexylmethyl N-methylcarbamate, M.P. 102–103.5° C.

*Analysis.*—Calcd. for $C_9H_{17}NO_3$: C, 57.75; H, 9.15; N, 7.48. Found: C, 57.38; H, 9.16; N, 7.33.

EXAMPLE 99

*Oxygenation of cycloundecanecarboxamide*

The bioconversion and extraction procedures of Example 91 were repeated using 10 l. of sterilized medium of the same composition, the microorganism *Sporotrichum sulfurescens*, ATCC 7159, and 5 g. of cycloundecanecarboxamide as the substrate to give a product shown by chromatographic analysis to be a mixture of oxygenated cycloundecanecarboxamides, the major component of which was 6-oxocycloundecanecarboxamide. This mixture was chromatographed on Florisil and eluted with Skellysolve B containing increasing proportions of acetone (0 to 100%) giving 0.7 g. of 6-oxocycloundecanecarboxamide in the acetone eluate. Recrystallization from acetone-Skellysolve B gave 6-oxocycloundecanecarboxamide, M.P. 153–154° C.

EXAMPLE 100

*Oxygenation of α-cyclohexyl-α-phenylacetonitrile*

The bioconversion and extraction procedures of Example 91 were repeated using 100 l. of sterilized medium of the same composition, the microorganism *Sporotrichum sulfurescens*, ATCC 7159, and 40 g. of α-cyclohexyl-α-phenylacetonitrile as the substrate to give a product shown by chromatographic analysis to be a mixture of oxygenated cyclohexyl phenyl acetonitriles, the major components of which were 3- and 4-hydroxycyclohexyl-α-phenyl acetonitriles. This mixture was chromatographed on Florisil and eluted with Skellysolve B containing increasing proportions of acetone (2 to 25%). The fractions containing hydroxylated product (determined by infrared analysis) were combined to give 28.62 g. of a mixture comprising 3-hydroxycyclohexyl-α-phenylacetonitrile and 4-hydroxycyclohexyl-α-phenylacetonitrile.

A portion of the mixture thus obtained (23.78 g.) was dissolved in 700 ml. of acetone and oxidized with 35 ml. of 2.67 M chromic acid (Jones reagent) to give 22.9 g. of a mixture comprising 3-oxocyclohexyl-α-phenylacetonitrile and 4-oxocyclohexyl-α-phenylacetonitrile.

We claim:

1. The process which comprises subjecting to the oxygenating activity of a species of an order selected from the group consisting of Mucorales, Eurotiales, Helotiales, Hypocreales, Hysteriales, Sphaeriales, Agaricales, Nidulariales, Melanconiales, Moniliales, Mycelia Sterilia, Sphaeropsidales, Pseudomonadales and Actinomycetales, a non-fused cycloalkane having the formula:

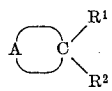

wherein A is the residue of a cycloalkane ring containing from 5 to 15 carbon atoms, inclusive, $R^1$ and $R^2$ taken individually are selected from the class consisting of hydrogen; hydroxy; aryl of 6 to 12 carbon atoms, inclusive; aryl of 6 to 12 carbon atoms, inclusive, substituted by at least one group selected from the class consisting of lower-alkoxy of 1 to 8 carbon atoms, inclusive, carbamoyloxy, (lower-alkyl)carbamoyloxy, di-(lower-alkyl)carbamoyloxy and arylcarbamoyloxy, wherein the lower-alkyl substituents contain from 1 to 8 carbon atoms, inclusive, and the aryl substituent contains from 6 to 12 carbon atoms, inclusive; cycloalkyl of 5 to 15 carbon atoms, inclusive; cycloalkyl of 5 to 15 carbon atoms, inclusive, substituted by at least one group selected from the class consisting of 5 to 9 ring atom heterocyclic amino, hydroxy, keto, and functionally substituted keto and hydroxy; acyl- amino wherein acyl is derived from an acid selected from the class consisting of hydrocarbon carboxylic acids of 1 to 12 carbon atoms, inclusive, and hydrocarbon sulfonic acids of 1 to 12 carbon atoms, inclusive; cycloalkylsulfonyl of 5 to 15 carbon atoms, inclusive;

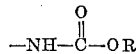

wherein R is selected from the class consisting of lower-alkyl of 1 to 8 carbon atoms, inclusive, aralkyl of 7 to 13 carbon atoms, inclusive, and aryl of 6 to 12 carbon atoms, inclusive; —$C_nH_{2n}$—$R^3$ wherein $C_nH_{2n}$ is alkylene of 1 to 6 carbon atoms, inclusive, and $R^3$ is selected from the class consisting of hydroxy, carbamoyloxy, (lower-alkyl)carbamoyloxy, di-(lower-alkyl)carbamoyloxy and arylcarbamoyloxy wherein the lower-alkyl and aryl substituents have the meanings given above;

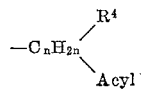

wherein $C_nH_{2n}$ has the meaning given above, Acyl is acyl as defined above and $R^4$ is selected from the class consisting of hydrogen, lower-alkyl of 1 to 8 carbon atoms, inclusive, aralkyl of 7 to 13 carbon atoms, inclusive, and aryl of 6 to 12 carbon atoms, inclusive;

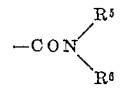

wherein $R^5$ and $R^6$ are selected from the class consisting of hydrogen, lower-alkyl of 1 to 8 carbon atoms, inclusive, aralkyl of 7 to 13 carbon atoms, inclusive, and aryl of 6 to 12 carbon atoms, inclusive;

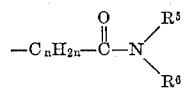

wherein $C_nH_{2n}$, $R^5$ and $R^6$ have the meanings given above; and arylsulfonylureido wherein the aryl substituent contains from 6 to 12 carbon atoms, inclusive; provided that $R^1$ and $R^2$ do not represent hydrogen simultaneously and $R^1$ and $R^2$ taken together represent carbonyl, to obtain the corresponding oxygenated non-fused cycloalkane having the formula:

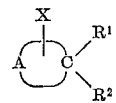

wherein A, $R^1$ and $R^2$ have the meanings given above and X is at least one oxygen-containing substituent selected from the class consisting of hydroxy and keto.

2. The process of claim 1 wherein the species is of a family selected from the group consisting of Mucoraceae, Cunninghamellaceae, Eurotiaceae, Hysteriaceae, Nectreaceae, Clavicipitaceae, Melanconiaceae, Moniliaceae, Dematiaceae, Tuberculariaceae, Psuedomonadaceae, Mycobacteriaceae, Actinomycetaceae, and Streptomycetaceae.

3. The process of claim 1 wherein the species is of a genus selected from the group consisting of Absidia, Circinella, Gongronella, Rhizopus, Cunninghamella, Eurotium, Gloniopsis, Glonium, Hysterium, Mytilidion, Calonectria, Gibberella, Hypomyces, Dermea, Cenangium, Adelopus, Chaetomium, Endothia, Guignardia, Boletus, Alnicola, Deconica, Corticium, Cyathus, Ascochyta, Diplodia, Wojnowicia, Septomyxa, Aspergillus, Keratinomyces, Penicillium, Sporotrichum, Trichothecium, Brachysporium, Cladosporium, Curvularia, Cylindrocarpon, Rhizoctonia, Pseudomonas, Mycobacterium, Micrococcus, Nocardia, and Streptomyces.

4. The process of claim 1 wherein the oxygenation is carried out in an aqueous nutrient medium under submerged aerobic fermentation conditions.

5. The process of claim 2 wherein the oxygenation is carried out in an aqueous nutrient medium under submerged aerobic fermentation conditions.

6. The process of claim 3 wherein the oxygenation is carried out in an aqueous nutrient medium under submerged aerobic fermentation conditions.

7. The process of claim 1 wherein the oxygenation is carried out in an aqueous nutrient medium under submerged aerobic fermentation conditions, the fermentation is continued until a substantial amount of oxygenated cycloalkane is produced and the oxygenated products thus obtained, are recovered from the fermentation medium.

8. The process of claim 2 wherein the oxygenation is carried out in aqueous nutrient medium under submerged aerobic fermentation conditions, the fermentation is continued until a substantial amount of oxygenated cycloalkane is produced and the oxygenated products thus obtained, are recovered from the fermentation medium.

9. The process of claim 3 wherein the oxygenation is carried out in an aqueous nutrient medium under submerged aerobic fermentation conditions, the fermentation is continued until a substantial amount of oxygenated cycloalkane is produced and the oxygenated products thus obtained, are recovered from the fermentation medium.

10. The process of claim 1, wherein the compound subjected to oxygenation is a non-fused cycloalkane having the formula, wherein A is the residue of a cycloalkane ring containing from 11 to 14 carbon atoms, inclusive, $R^1$ is hydrogen and $R^2$ is hydroxy, to obtain the corresponding non-fused cycloalkane having the formula, wherein A, $R^1$ and $R^2$ have the meanings given above and X is selected from the class consisting of hydroxy and keto.

11. The process of claim 1, wherein the compound subjected to oxygenation is a non-fused cycloalkane having the formula, wherein A is the residue of a cycloalkane ring containing 6 carbon atoms, $R^1$ is hydrogen and $R^2$ is cyclohexyl, to obtain the corresponding oxygenated non-fused cycloalkane having the formula, wherein A and $R^1$ have the meanings given above, $R^2$ is cyclohexyl substituted by hydroxy and X is hydroxy.

12. The process of claim 1, wherein the compound subjected to oxygenation is a non-fused cycloalkane having the formula, wherein A is the residue of a cycloalkane ring containing 6 carbon atoms, $R^1$ is hydrogen and $R^2$ is cyclohexyl substituted by one group selected from the class consisting of 5 to 9 ring atom heterocyclic amino, hydroxy, keto and functionally substituted keto and hydroxy, to obtain the corresponding oxygenated non-fused cycloalkane having the formula, wherein A, $R^1$ and $R^2$ have the meanings given above and X is selected from the class consisting of hydroxy and keto.

13. The process of claim 1, wherein the compound subjected to oxygenation is a non-fused cycloalkane having the formula, wherein A is the residue of a cycloalkane ring containing 6 carbon atoms, $R^1$ is hydrogen and $R^2$ is phenyl, or phenyl substituted by at least one group selected from the class consisting of lower-alkoxy of 1 to 8 carbon atoms, inclusive, carbamoyloxy, (lower-alkyl)carbamoyloxy, di-(lower-alkyl)carbamoyloxy and arylcarbamoyloxy, wherein the lower-alkyl substituents contain from 1 to 8 carbon atoms, inclusive, and the aryl substituent contains from 6 to 12 carbon atoms, inclusive, to obtain the corresponding oxygenated non-fused cycloalkane having the formula, wherein A, $R^1$ and $R^2$ have the meanings given above, and X is selected from the class consisting of hydroxy and keto.

14. The process of claim 1, wherein the compound subjected to oxygenation is a non-fused cycloalkane having the formula, wherein A is the residue of a cycloalkane ring containing from 5 to 15 carbon atoms, inclusive, $R^1$ is hydrogen and $R^2$ is cycloalkylsulfonyl of 5 to 15 carbon atoms, inclusive, to obtain the corresponding non-fused cycloalkane having the formula wherein A, $R^1$ and $R^2$ have the meanings given above, and X is selected from the class consisting of hydroxy and keto.

15. The process of claim 1, wherein the compound subjected to oxygenation is a non-fused cycloalkane having the formula, wherein A is the residue of a cycloalkane ring containing 5 to 15 carbon atoms, inclusive, $R^1$ is hydrogen and $R^2$ is acylamino, wherein acyl is derived from an acid selected from the class consisting of hyrocarbon carboxylic acids of 1 to 12 carbon atoms, inclusive, and hydrocarbon sulfonic acids of 1 to 12 carbon atoms, inclusive, to obtain the corresponding oxygenated non-fused cycloalkane having the formula, wherein A, $R^1$ and $R^2$ have the meanings given above and X is selected from the class consisting of hydroxy and keto.

16. The process of claim 1, wherein the compound subjected to oxygenation is a non-fused cycloalkane having the formula wherein A is the residue of a cycloalkane ring containing from 5 to 12 carbon atoms, inclusive; $R^1$ is hydrogen and $R^2$ is arylsulfonylureido, wherein the aryl substituent contains from 6 to 12 carbon atoms, inclusive, to obtain the corresponding oxygenated non-fused cycloalkane having the formula, wherein A, $R^1$ and $R^2$ have the meanings given above, and X is selected from the class consisting of hydroxy and keto.

References Cited by the Examiner

UNITED STATES PATENTS

| | | | |
|---|---|---|---|
| 1,833,716 | 11/1931 | Kluyver et al. | 195—51 |
| 2,649,401 | 8/1953 | Haines et al. | 195—51 |
| 3,057,784 | 10/1962 | Davis et al. | 195—28 |
| 3,140,239 | 7/1964 | Tanner et al. | 195—101 |

A. LOUIS MONACELL, *Primary Examiner.*

DAREN M. STEPHENS, *Assistant Examiner.*

UNITED STATES PATENT OFFICE
CERTIFICATE OF CORRECTION

Patent No. 3,281,330                      October 25, 1966

Gunther S. Fonken et al.

It is hereby certified that error appears in the above numbered patent requiring correction and that the said Letters Patent should read as corrected below.

Column 9, in TABLE III, second column, line 45 thereof, for "7-hydroxy cylododecanone" read -- 7-hydroxycyclododecanone --; same column 9, same TABLE III, same second column, line 46 thereof, for "6-hydroxcyclodecanone" read -- 6-hydroxycyclododecanone --; column 18, line 69, for "cycloheptylohexyl" read -- cycloheptylcyclohexyl --; column 19, line 1, for "0.4-05 torr." read -- 0.4-0.5 torr. --; column 20, line 27, for " cyclodedcylcyclododecylamine" read -- cyclodecylcyclododecylamine --; line 67, for "$C_{16}H_{33}NO$" read -- $C_{17}H_{33}NO$ --; column 22, lines 10 and 11, for "cyclodecylclododecyl amine" read -- cyclodecylcyclododecyl amine --; line 30, for "N-cyclododecyl-" read -- N-cyclodecyl- --; column 32, line 3, for "$C_{12}H_2O_2$" read -- $C_{12}H_{20}O_2$ --; column 56, line 63, after "acetamide" insert -- and N-(7-oxocyclododecyl)-acetamide --.

Signed and sealed this 7th day of November 1967.

(SEAL)
Attest:

EDWARD M. FLETCHER, JR.                    EDWARD J. BRENNER
Attesting Officer                           Commissioner of Patents